(12) United States Patent
Fukasawa et al.

(10) Patent No.: US 7,345,982 B2
(45) Date of Patent: Mar. 18, 2008

(54) OPTICAL PICKUP DEVICE, OPTICAL DISK DRIVE, OPTICAL DEVICE AND COMPOSITE OPTICAL ELEMENT

(75) Inventors: Norio Fukasawa, Kanagawa (JP); Junichi Suzuki, Kanagawa (JP); Kiyoshi Toyota, Tokyo (JP); Tetsu Tanaka, Tokyo (JP); Satoru Ishii, Chiba (JP); Takeshi Kubo, Kanagawa (JP); Masahiro Saito, Kanagawa (JP)

(73) Assignee: Sony Corporation (JP)

( * ) Notice: Subject to any disclaimer, the term of this patent is extended or adjusted under 35 U.S.C. 154(b) by 639 days.

(21) Appl. No.: 10/494,304

(22) PCT Filed: Nov. 19, 2002

(86) PCT No.: PCT/JP02/12080

§ 371 (c)(1),
(2), (4) Date: May 3, 2004

(87) PCT Pub. No.: WO03/044785

PCT Pub. Date: May 30, 2003

(65) Prior Publication Data

US 2005/0162995 A1    Jul. 28, 2005

(30) Foreign Application Priority Data

Nov. 22, 2001 (JP) ............ P2001-368244
Aug. 2, 2002 (JP) ............ P2002-226764

(51) Int. Cl.
*G11B 7/00* (2006.01)

(52) U.S. Cl. ............ 369/112.09; 369/112.14; 369/112.28

(58) Field of Classification Search ........... 369/112.04, 369/112.05, 112.09, 112.1, 112.14, 112.15, 369/112.22, 112.28, 44.12, 44.23, 44.24, 369/118, 112.07, 112.12

See application file for complete search history.

(56) References Cited

U.S. PATENT DOCUMENTS 6,072,579 A * 6/2000 Funato ............... 369/112.15

(Continued)

FOREIGN PATENT DOCUMENTS

JP    2002-298423 A    10/2002

(Continued)

*Primary Examiner*—Thang V. Tran
(74) *Attorney, Agent, or Firm*—Rader Fishman & Grauer PLLC; Ronald P. Kananen

(57) ABSTRACT

An optical pickup device is provided which includes a double-wavelength objective lens (34) that collects a light beam selectively emitted from a light-emitting/-detecting element (31) that selectively emits a plurality of light beams different in wavelength from each other, and also return light from an optical disk (2), a first diffraction grating (45) that splits the light beam emitted from a light-emitting/-detecting element (31) into three beams including a zero-order light beam and positive and negative first-order light beams, a second diffraction grating (46) that diffracts the return light for traveling along a light path separate from that of the outgoing light, and a third diffraction grating (47) that corrects a light-path deviation by diffracting the positive first-order light beam diffracted by the second diffraction grating (46). The light-emitting/-detecting element (31) provides a focusing error signal FE by detecting the negative first-order light beam diffracted by the third diffraction element (47), and a tracking error signal by detecting return portions of the positive and negative first-order light beams from the first diffraction grating (45).

50 Claims, 30 Drawing Sheets

U.S. PATENT DOCUMENTS

| | | |
|---|---|---|
| 6,487,016 B1 | 11/2002 | Shiono et al. |
| 6,560,188 B1 * | 5/2003 | Kyoya et al. .......... 369/112.03 |
| 6,868,055 B2 * | 3/2005 | Ueyama et al. ........ 369/112.15 |
| 6,952,389 B2 * | 10/2005 | Kyoung et al. ........ 369/112.07 |

FOREIGN PATENT DOCUMENTS

| | | |
|---|---|---|
| JP | 2002-311220 A | 10/2002 |
| JP | 2002-311221 A | 10/2002 |

* cited by examiner

FE>0

FE=0

FE<0

OPTICAL PICKUP DEVICE, OPTICAL DISK DRIVE, OPTICAL DEVICE AND COMPOSITE OPTICAL ELEMENT

TECHNICAL FIELD

The present invention relates to an optical pickup device used to write and read information optically to and from an optical disk to and from which information is optically written and read, such as magneto-optical disk, phase-change optical disk or the like, and an optical disk drive using the optical pickup device, and also to an optical device used in these optical pickup device and optical disk drive, and a composite optical element having the optical device formed integrally therein.

This application claims the priority of the Japanese Patent Application No. 2001-358244 filed on Nov. 22, 2001 and No. 2002-226764 filed on Aug. 2, 2002, the entirety of which is incorporated by reference herein.

BACKGROUND ART

Conventionally, there are known optical pickup devices used to play back an optical disk having information signals recorded therein in different recording formats, such as CD (compact disk), DVD (digital versatile disk) or the like. Such an optical pickup device includes a light source capable of emitting a light beam having a wavelength corresponding to each recording format, and an optical system.

As a typical one of the optical pickup devices of the above type, there will be described below a conventional optical pickup device including an optical system, generally indicated with a reference 201 and configured as in FIG. 1. As shown in FIG. 1, the optical system 201 includes, in the order following the light path, a double-wavelength light source 211 that selectively emits a plurality of light beams different in wavelength from each other for irradiation to an optical disk 204 set in place, a three-beam generating diffraction grating 212 that splits the light beam emitted from the double-wavelength light source 211 into three beams, a beam splitter 213 that separates the outgoing light and return light from the optical disk 204 from each other, a limiting aperture 214 that limits the outgoing light to a predetermined numerical aperture NA, a double-wavelength objective lens 215 that focuses the outgoing light onto the optical disk 204, and a photodetector assembly 216 that detects the return light from the optical disk 204. It should be noted here that the "laser beam emitted from the light source" or "light beam emitted from the light source" will also be referred to as "outgoing light" wherever appropriate hereinafter.

The above double-wavelength light source 211 uses a semiconductor laser. It selectively emits a laser beam having a wavelength of about 785 nm in wavelength and a laser beam having a wavelength of about 655 nm, for example, from a light-emitting point 211a thereof.

The three-beam generating diffraction grating 212 splits the light beam emitted from the double-wavelength light source 211 into three beams including a zero-order light beam and positive and negative first-order light beams to provide a tracking error signal by the so-called three-beam method.

The beam splitter 213 includes a half mirror 213a that reflects the light beam emitted from the double-wavelength light source 211 toward the optical disk 204. It separates the light paths of the outgoing light and return light from each other by reflecting the light beam emitted from the double-wavelength light source 211 toward the optical disk 204 while allowing the return light from the optical disk 204 to pass through and directing it to the photodetector assembly 216.

The photodetector assembly 216 includes a main-beam photodetector 221 that detects a zero-order light beam as a result of splitting of the return light by the three-beam generating diffraction grating 212, and a pair of side-beam photodetectors (not shown) that detect positive and negative first-order light beams, respectively, resulted from splitting of the return light by the three-beam generating diffraction grating 212.

The optical system 201 uses the so-called astigmatism to detect a focusing error signal. On this account, a main-beam photodetector 221 included in the photodetector assembly 216 has a generally square light-detecting surface whose split pattern is quadrisected into four light-detecting areas $a_5$, $b_5$, $c_5$ and $d_5$ by a set of parting lines passing by the center of the light-detecting surface and perpendicular to each other as shown in FIGS. 2A, 2B and 2C. The light-detecting surface detects return light from the optical disk 204. The side-beam photodetectors (not shown) are disposed across the main-beam photodetector 221 oppositely to each other.

In the optical system 201, optical parts are disposed along the forward light path from the double-wavelength light source 211 to the optical disk 204 in such a manner that an image point that is a conjugate point of the light-emitting point 211a or 211b, as object point, of the double-wavelength light source 211 will be positioned on a recording layer 205 in the optical disk 204, as shown in FIG. 1.

Also, in the optical system 201, the optical parts are disposed along the backward light path from the optical disk 204 to the photodetector assembly 216 in such a manner that the image point that is conjugate point of a point, as object point, on the recording layer 205 in the optical disk 204 will be positioned on the light-detecting surface of the main-beam photodetector 221 of the photodetector assembly 216.

Therefore, in the optical system 201, the light-emitting point of the double-wavelength light source 211 is also in a conjugate relation with the point on the light-detecting surface of the main-beam photodetector 221 of the photodetector assembly 216.

A focusing error signal is detected by the light-detecting areas $a_5$, $b_5$, $c_5$ and $d_5$ of the above-mentioned main-beam photodetector 221 as will be described below.

First, when the double-wavelength objective lens 215 is placed in an optimum position, namely, in a so-called just-in-focus position, in relation to the recording layer 205 in the optical disk 204, a beam spot defined on the light-detecting surface of the main-beam photodetector 221 will be circular as shown in FIG. 2B.

However, if the double-wavelength objective lens 215 is excessively close to the recording layer 205 in the optical disk 204, it will be off the just-in-focus position, and return light split by the beam-splitter diffraction grating 212b and passing by the composite optical element 212 will cause astigmatism that will cause the beam spot defined on the light-detecting surface of the main-beam photodetector 221 to have the form of an ellipse whose major axis extends over the light-detecting areas $a_5$ and $c_5$ as shown in FIG. 2A.

Further, if the double-wavelength objective lens 215 is excessively apart from the recording layer 205 in the optical disk 204, it will also be off the just-in-focus position, and return light split by the beam-splitter diffraction grating 212b and passing by the composite optical element 212 will also cause astigmatism that will cause the beam spot defined on the light-detecting surface of the main-beam photodetector 221 to have the form of an ellipse whose major axis extends over the light-detecting areas $b_5$ and $d_5$ as shown in FIG. 2C, namely, an ellipse whose major axis is inclined 90 deg. in relation to that of the beam spot shown in FIG. 2A.

Given that return-light detection outputs from the light-detecting areas $a_5$, $b_5$, $c_5$ and $d_5$ of the main-beam photodetector 221 are $Sa_5$, $Sb_5$, $Sc_5$ and $Sd_5$, respectively, a focusing error signal FE can be calculated using the following formula (1):

$$FE=(Sa_5+Sc_5)-(Sb_5+Sd_5) \quad (1)$$

More specifically, in the main-beam photodetector 221, when the double-wavelength objective lens 215 is in the in-focus position, namely, in the so-called just-in-focus position, as shown in FIG. 2B, the focusing error signal FE given by the formula (1) will be zero.

Also in the main-beam photodetector 221, if the double-wavelength objective lens 215 is excessively close to the recording layer 205 in the optical disk 204, the focusing error signal FE will be positive. On the contrary, if the double-wavelength objective lens 215 is excessively apart from the recording layer 205 in the optical disk 204, the focusing error signal FE will be negative.

A tracking error signal TE is provided by calculating a difference between outputs from the side-beam photodetectors having detected positive and negative first-order light beams, respectively, from the three-beam generating diffraction grating 212a.

In the optical pickup device using the optical system 201 configured as above, the double-wavelength objective lens 215 is moved to the in-focus position in relation to the recording layer 205 in the optical disk 204 according to the focusing error signal FE from the main-beam photodetector 221 of the photodetector assembly 216 and tracking error signal TE from the side-beam photodetectors, the outgoing light is focused on the recording layer 205 in the optical disk 204 and information is read from the optical disk 204.

Note here that generally, the double-wavelength light source 211, such as semiconductor laser, emits a laser beam whose wavelength depends upon the ambient temperature. Given that the ambient temperature is T, the wavelength of the laser beam emitted from the semiconductor laser at the ambient temperature T can be expressed approximately as given by the following formula (2):

$$\lambda_T=\lambda_0+c \cdot \Delta T \quad (2)$$

where $\lambda_T$ is a wavelength of a light beam emitted at the ambient temperature T, $\lambda_0$ is a wavelength at the normal temperature, $\Delta T$ is a temperature deviation from the normal temperature, and c is a temperature coefficient.

Also, in case the laser beam is incident at an angle $\theta$ upon the diffraction grating such as the aforementioned beam-splitter diffraction grating 212b in which it is diffracted at an angle $\theta'$, the relation between the incident angle $\theta$ and diffraction angle $\theta'$ can be expressed as given by the following formula (3):

$$n' \cdot \sin \theta' - n \cdot \sin \theta = m \cdot \lambda/d \quad (3)$$

where $\lambda$ is the wavelength of the laser beam, d is the grating constant of the diffraction grating, m is the grating order of the diffraction grating, n is the refractive index of incident-side medium of the diffraction grating and n' is the refractive index of an outgoing-side medium of the diffraction grating.

For separation of the return-light path by diffracting return light by the diffraction grating, for example, the return light is diffracted with a refractive index of n=1 at an incident angle of $\theta=0$ with respect to the main beam. So, the following formula (4) can be derived from the formula (3) on the assumption that the diffraction order m is +1:

$$n' \cdot \sin \theta' = \lambda/d \quad (4)$$

In case the ambient temperature around the optical system varies, the following formula (5) can be derived by placing the formula (2) in the formula (4) with the diffraction angle at the ambient temperature T being taken as $\theta'_T$:

$$n' \cdot \sin \theta'_T = (\lambda_0 + c \cdot \Delta T)/d \quad (5)$$

Further, the following formula (6) can be derived from the above formula (5) with the diffraction angle at the normal temperature given as $\theta'_0$:

$$n' \cdot \sin \theta'_T = n' \cdot \sin \theta'_0 + c \cdot \Delta T/d \quad (6)$$

Based on the above formula (6), the diffraction angle $\theta'_T$ at the ambient temperature T can be expressed as given by the following formula (7):

$$'_T = \theta'_0 + \sin^{-1}((c \cdot \Delta T)/(d \cdot n')) \quad (7)$$

It will be known from the above formula (7) that the diffraction angle $\theta'_T$ of return light at the ambient temperature T depends upon the deviation $\Delta T$ from the normal temperature, that is, on the ambient temperature around the optical system 201.

The optical pickup device is produced at the normal temperature. Therefore, the position of the photodetector assembly 216 is adjusted on the assumption that return light is diffracted at an angle $\theta'_0$. If the ambient temperature varies after the position of the photodetector assembly 216 is adjusted, however, the return light will be diffracted at an angle that varies as given by the formula (3), and the center of a beam spot defined on the light-detecting surface of the main-beam photodetector 221 of the photodetector assembly 216 will be off a predetermined position as shown in FIG. 3, for example.

In the aforementioned optical system 201 provided in the optical pickup device, when the photodetector assembly 216 provides a focusing error signal FE, if the center of a beam spot defined on the light-detecting surface of the mea-beam photodetector 221 is even slightly off that of the main-beam photodetector 221 in any direction, the output from the main-beam photodetector 221, which would be when the objective lens 215 is in the just-in-focus position, will not be zero. Consequently, the focusing error signal FE will be offset.

As above, in the optical pickup device, since the focus is controlled for the focusing error signal FE to be zero so the double-wavelength objective lens 215 cannot be driven to move precisely to any in-focus position.

Also, in the optical pickup device, the photodetector assembly 216 has to be disposed accurately in relation to a reference position for its own package. Because of a strict requirement for the accuracy of positioning, the optical pickup device cannot be produced with a high productivity.

DISCLOSURE OF THE INVENTION

Accordingly, the present invention has an object to overcome the above-mentioned drawbacks of the related art by providing an optical device, composite optical element, pickup device and optical disk drive, in which return light from an optical disk can be directed to an appropriate position to provide a more reliable focusing error signal.

The above object can be attained by providing an optical pickup device including according to the present invention:

a light source that selectively emits a plurality of light beams different in wavelength from each other;

an objective lens that focuses the light beam emitted from the light source onto an optical disk and collects return light from the optical disk;

a composite optical element including a first diffraction element that allows the light beam emitted from the light source to pass through, while diffracting the return light from the optical disk, and at least one light-path deviation correcting means disposed in a position where the return light diffracted by the first diffraction element is incident to correct a light-path deviation of the return light, caused in the first diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means.

In the optical pickup device configured as above according to the present invention, the light beam emitted from the light source is focused by the objective lens onto the optical disk, and the return light from the optical disk is diffracted by the first diffraction element included in the composite optical element to travel along a light path separate from that along which the outgoing light travels. Also in the optical pickup device, a light-path deviation of the return light, caused in the first diffraction element by a variation in wavelength of the light beam emitted from the light source, is corrected by the light-path deviation correcting means to direct the return light to a predetermined position on the light-detecting means, and the return light directed to the predetermined position is detected at the plurality of light-detecting areas of the light-detecting means, to thereby provide an appropriate focusing error signal.

Also the above object can be attained by providing an optical pickup device including according to the present invention:

a light source that selectively emits a plurality of light beams different in wavelength from each other;

an objective lens that focuses the light beam emitted from the light source onto an optical disk and collects the return light from the optical disk;

a beam splitter that makes the light beam emitted from the light source travel along a light path and return light from the optical disk travel along another light path;

a light-path synthesis means for correcting a light-path deviation between outgoing light having one wavelength and outgoing light having the other wavelength, caused by a displacement between light-emitting points of the light source, from which there is emitted the plurality of light different in wavelength from each other;

a return-light splitting means disposed in a position where the return light split by the beam splitter and having a light-path deviation thereof corrected by the light-path deviation correcting means is incident to split the return light into a plurality of light beam; and a light-detecting means for detecting, at a plurality of light-detecting areas thereof, the plurality of light beam resulted from splitting of the return light by the return-light splitting means, the return-light splitting means being a prism having a plurality of flat or curved surfaces.

In the optical pickup device configured as above according to the present invention, the light beam emitted from the light source is directed to the optical disk, return light from the optical disk is made by the beam splitter to travel along a light path different from that of the outgoing light, and the light-path deviation, caused by the displacement between the light-emitting points, of the outgoing light having the other wavelength from the outgoing light having the one wavelength is corrected, to thereby adjust the light path of the return light for the return light to be incident upon a predetermined position in the return-light splitting means.

Also the above object can be attained by providing an optical disk drive including an optical pickup that writes and/or reads information to and/or from an optical disk, and a disk rotation driving means that drives to rotate the optical disk, the optical pickup including according to the present invention:

a light source that emits a selected one of a plurality of light beams different in wavelength from each other;

an objective lens that focuses the light beam emitted from the light source onto the optical disk and collects return light from the optical disk;

a composite optical element including a first diffraction element that allows the light beam emitted from the light source to pass through, while diffracting the return light from the optical disk, and at least a light-path deviation correcting means disposed in a position where the return light diffracted by the first diffraction element is incident to correct a light-path deviation of the return light, caused in the first diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means.

In the optical disk drive configured as above according to the present invention, the optical disk is rotated by the disk rotation driving means and information is written and/or read to and/or from the optical disk by the optical pickup device. During this operation of information write or read, the light beam emitted from the light source is focused onto the optical disk by the objective lens, and the return light from the optical disk is diffracted by the first diffraction element included in the composite optical element to travel along a light path separate from that of the outgoing light. Also in the optical pickup device included in the optical disk drive, a light-path deviation of the return light, caused in the first diffraction element by a variation in wavelength of the light beam emitted from the light source, is corrected by the light-path deviation correcting means to direct the return light to a predetermined position on the light-detecting means, and the return light directed to the predetermined position is detected at the plurality of light-detecting areas of the light-detecting means, to thereby provide an appropriate focusing error signal.

Also the above object can be attained by providing an optical disk drive including an optical pickup that writes and/or reads information to and/or from an optical disk, and a disk rotation driving means that drives to rotate the optical disk, the optical pickup including according to the present invention:

a light source that emits a selected one of a plurality of light beams different in wavelength from each other;

an objective lens that focuses the light beam emitted from the light source onto the optical disk and collects the return light from the optical disk;

a beam splitter that makes the light beam emitted from the light source travel along a light path and return light from the optical disk travel along another light path;

a light-path synthesis means for correcting a light-path deviation between outgoing light having one wavelength and outgoing light having the other wavelength, caused by a displacement between light-emitting points of the light source, from which there is emitted the plurality of light different in wavelength from each other;

a return-light splitting means disposed in a position where the return light split by the beam splitter and having a light-path deviation thereof corrected by the light-path deviation correcting means is incident to split the return light into a plurality of light beam; and a light-detecting means for detecting, at a plurality of light-detecting areas thereof, the plurality of light beam resulted from splitting of the return light by the return-light splitting means, the return-light splitting means being a prism having a plurality of flat or curved surfaces.

In the optical disk drive configured as above according to the present invention, the light beam emitted from the light source is directed to the optical disk, return light from the optical disk is made by the beam splitter to travel along a light path different from that of the outgoing light, and the light-path deviation, caused by the displacement between the light-emitting points, of the outgoing light having the other wavelength from the outgoing light having the one wavelength is corrected, to adjust the light path of the return light for the return light to be incident upon a predetermined position in the return-light splitting means.

Also the above object can be attained by providing an optical device including according to the present invention:

a first diffraction element that allows a selected one, of a plurality of light beams different in wavelength from each other, emitted from the light source to pass through, while diffracting return light from an optical disk; and at least a light-path deviation correcting means disposed in a position where the return light diffracted by the diffraction element is incident to correct a light-path deviation of the return light diffracted by the first diffraction element, caused in the first diffraction element by a variation in wavelength of the light beam emitted from the light source, and direct the return light to a predetermined position.

In the above optical device, the light beam emitted from the light source is directed to the optical disk, return light from the optical disk is diffracted by the first diffraction element to travel along a light path different from that of the outgoing light, and a light-path deviation of the return light, caused in the first diffraction element by a variation in wavelength of the light beam emitted from the light source, is corrected by the light-path deviation correcting means, to thereby direct the return light to an appropriate position on the light-detecting means having a plurality of light-detecting areas for providing a focusing error signal for use in an optical pickup device.

Also the above object can be attained by providing an optical device including according to the present invention:

a beam splitter that makes a selected one, of a plurality of light beams different in wavelength from each other, emitted from a light source travel along a light path and return light from an optical disk travel along another light path;

a return-light splitting means disposed in a position where the return light split by the beam splitter to split the return light into a plurality of light beam and direct the split return light beams to a light-detecting means having a plurality of light-detecting areas; and a light-path synthesis means disposed between the beam splitter and return-light splitting means to correct a light-path deviation between outgoing light having one wavelength and outgoing light having the other wavelength, caused by a displacement between light-emitting points of the light source, from which there is emitted the plurality of light different in wavelength from each other, the return-light splitting means being a prism having a plurality of flat or curved surfaces.

In the optical device configured as above, the light beam emitted from the light source is directed to the optical disk, return light from the optical disk is made by the beam splitter to travel along a light path different from that of the outgoing light, and a light-path deviation between outgoing light having the one wavelength and outgoing light having the other wavelength, caused by a displacement between light-emitting points of the light source, is appropriately corrected, to thereby adjust the light path of the return light for the return light to be incident upon a predetermined position in the return-light splitting means.

Also the above object can be attained by providing a composite optical element including according to the present invention:

a first diffraction element that allows a selected one, of a plurality of light beams difference in wavelength from each other, emitted from a light source to pass through, while diffracting return light from an optical disk; and at least a light-path deviation correcting means disposed in a position where the return light diffracted by the first diffraction element is incident to correct a light-path deviation of the return light, caused in the first diffraction element by a variation in wavelength of the light beam emitted from the light source, and direct the return light to a predetermined position.

In the above composite optical element, the light beam emitted from the light source is directed to the optical disk, return light from the optical disk is diffracted by the first diffraction element to travel along a light path different from that of the outgoing light, and the light-path deviation of the return light, caused in the first diffraction element by a variation in wavelength of the light beam emitted from the light source, is corrected by the light-path deviation correcting means, to thereby direct the return light to an appropriate position on the light-detecting means having a plurality of light-detecting areas for providing a focusing error signal for use in an optical pickup device.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 2A to 2C show together an beam spot in each light-detecting surface of a main-beam photodetector provided in the optical system of the conventional optical pickup device, in which FIG. 2A shows a beam spot formed when the objective lens is close to the optical disk, FIG. 2B shows a beam spot formed when the objective lens is in the in-focus position and FIG. 2C shows a beam spot formed when the objective lens is apart from the optical disk.

FIGS. 10A to 10C show together a beam spot in each light-detecting surface of the main-beam photodetector provided in the optical pickup according to the present invention, in which FIG. 10A shows a beam spot formed when the objective lens is close to the optical disk, FIG. 10B shows a beam spot formed when the objective lens is in the in-focus position and FIG. 10C shows a beam spot formed when the objective lens is apart from the optical disk.

FIGS. 17A to 17C show together diffracted lights incident upon the beam-splitting prism included in the composite optical element in the optical pickup in FIG. 11, in which FIG. 17A shows an incident diffracted light when the objective lens is close to the optical disk, FIG. 17B shows an incident diffracted light when the objective lens is in the in-focus position and FIG. 17C shows an incident diffracted light when the objective lens is apart from the optical disk.

FIGS. 18A to 18C show together a beam spot in each light-detecting surface of the main-beam photodetector provided in the optical pickup in FIG. 11, in which FIG. 18A shows a beam spot formed when the objective lens is close to the optical disk, FIG. 18B shows a beam spot formed when the objective lens is in the in-focus position and FIG. 18C shows a beam spot formed when the objective lens is apart from the optical disk.

FIGS. 24A to 24C show together beam spots of diffracted lights incident upon the beam-splitting prism included in the composite optical element in the optical pickup shown in FIG. 19, in which FIG. 24A shows a beam spot formed when the objective lens is close to the optical disk, FIG. 24B shows a beam spot formed when the objective lens is in the in-focus position and FIG. 24C shows a beam spot formed when the objective lens is apart from the optical disk.

FIGS. 25A to 25C show together the beam spot in each light-detecting surface of the main-beam photodetector provided in the optical pickup in FIG. 19, in which FIG. 25A shows a beam spot formed when the objective lens is close to the optical disk, FIG. 25B shows a beam spot formed when the objective lens is in the in-focus position and FIG. 25C shows a beam spot formed when the objective lens is apart from the optical disk.

FIGS. 34A to 34C show together diffracted lights incident upon the beam-splitting prism included in the composite optical element in the optical pickup in FIG. 29, in which FIG. 34A shows an incident diffracted light when the objective lens is close to the optical disk, FIG. 34B shows an incident diffracted light when the objective lens is in the in-focus position and FIG. 34C shows an incident diffracted light when the objective lens is apart from the optical disk.

FIGS. 35A to 35C show together a beam spot in each light-detecting surface of the main-beam photodetector provided in the optical system of the optical pickup in FIG. 29, in which FIG. 35A shows a beam spot formed when the objective lens is close to the optical disk, FIG. 35B shows a beam spot formed when the objective lens is in the in-focus position and FIG. 35C shows a beam spot formed when the objective lens is apart from the optical disk.

DETAIL DESCRIPTION OF THE INVENTION

The present invention will be described in detail concerning the optical disk drive as an embodiment thereof with reference to the accompanying drawings.

Figure 1:
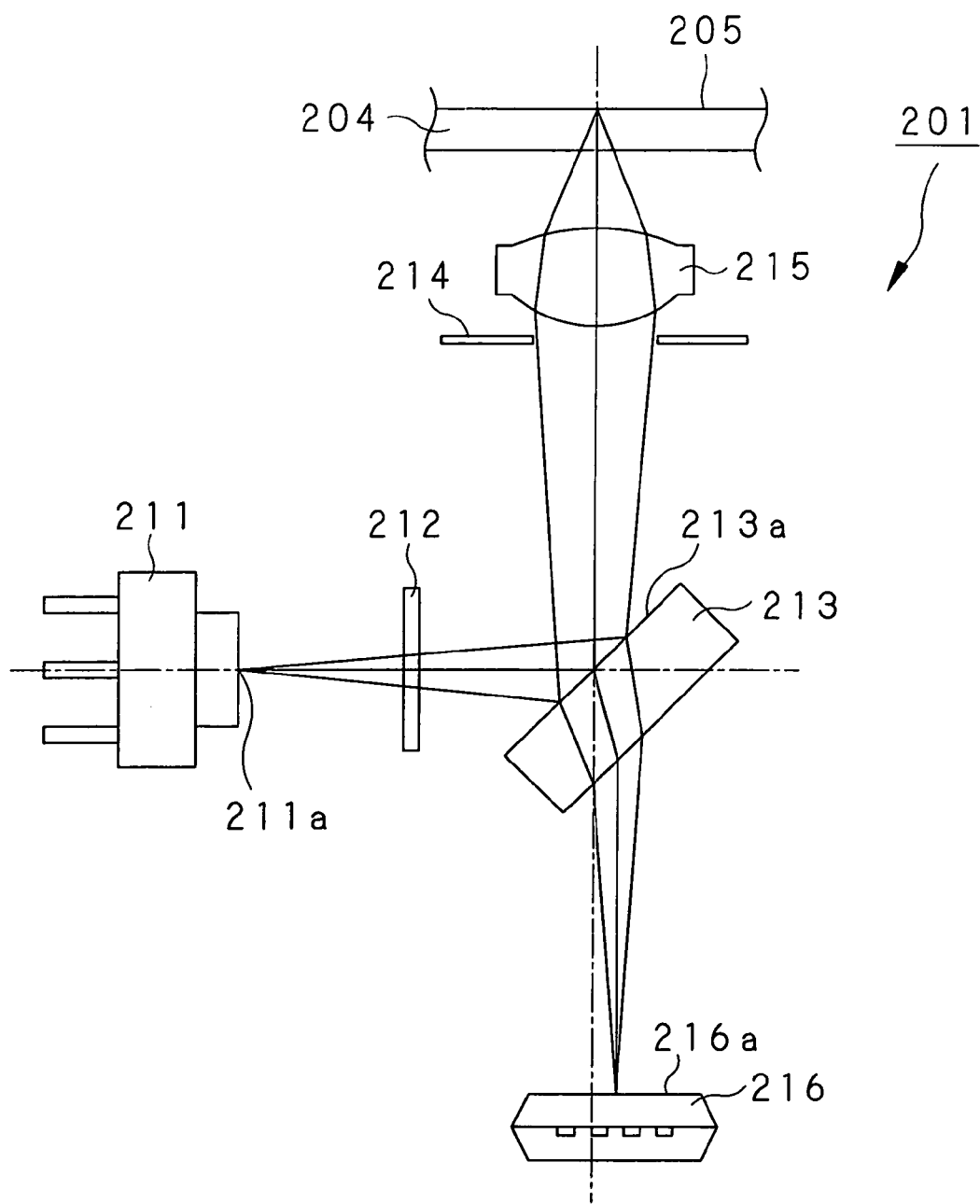
FIG. 1 is a schematic side elevation of the optical system included in the conventional optical pickup device.
Figure 2A:
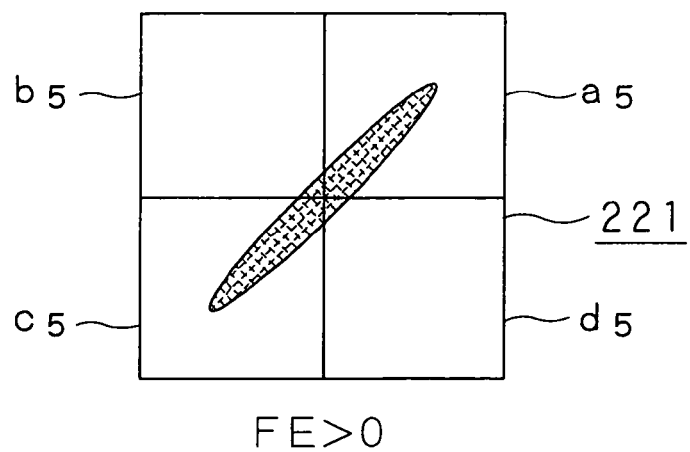
Figure 2B:
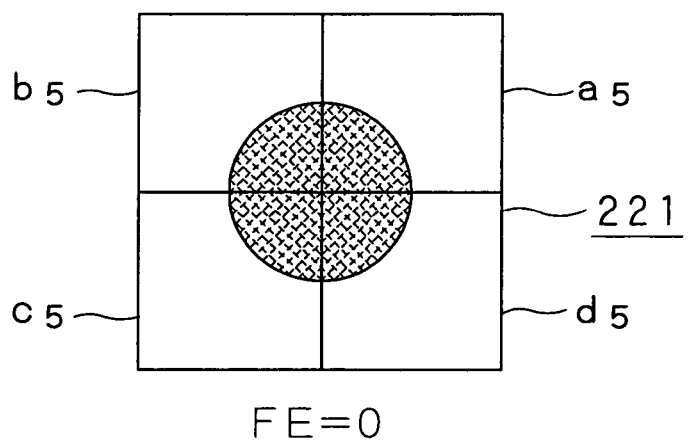
Figure 2C:
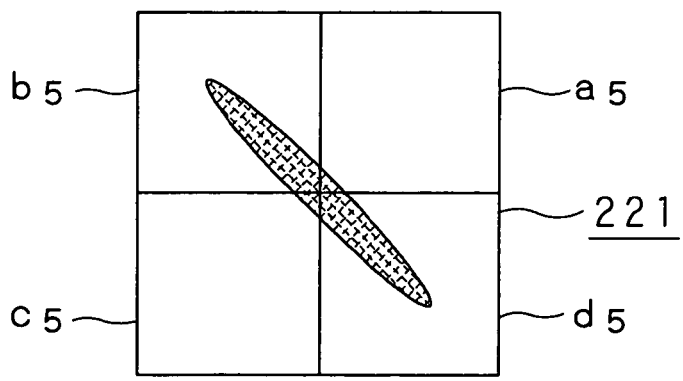
Figure 3:
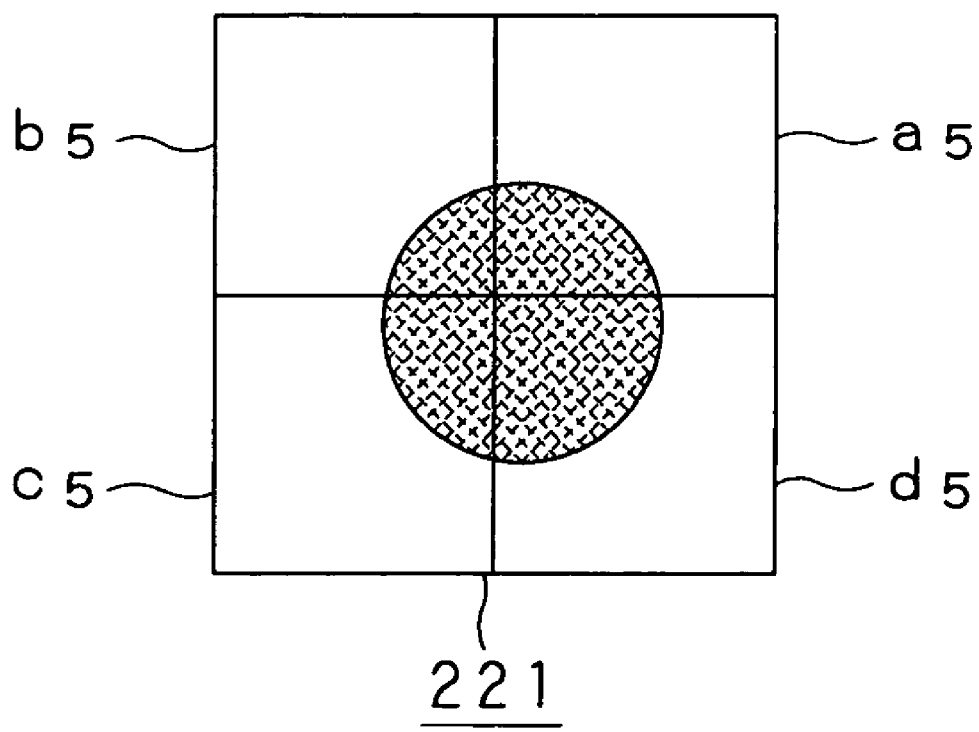
FIG. 3 illustrates a beam spot whose center is off that of the light-detecting surface of the main-beam photodetector in the conventional optical system in FIG. 1.
Figure 4:
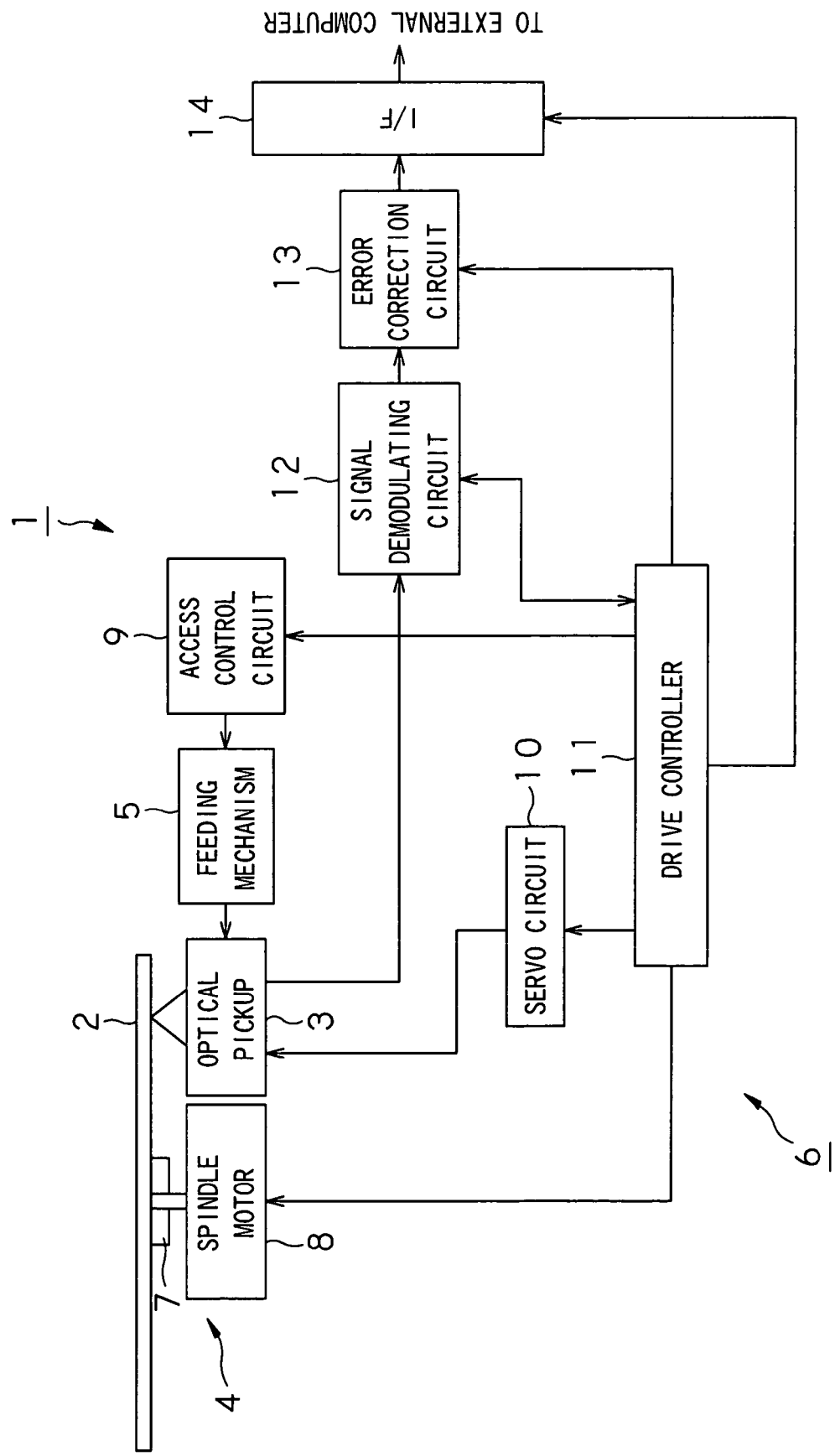
FIG. 4 is a schematic block diagram of an optical disk drive according to the present invention.

Referring now to FIG. 4, there is schematically illustrated in the form of a block diagram the optical disk drive according to the present invention. The optical disk drive is generally indicated with a reference 1. The optical disk drive 1 writes and/or reads information to and from an optical disk 2 such as CD (compact disk), a DVD (digital versatile disk), a CD-R (recordable CD), CD-RW (rewritable CD), magneto-optical disk or the like. The optical disk drive 1 will be explained below as a device to read or write information from or to the optical disk 2 which is a CD or DVD.

According to the present invention, the optical disk drive 1 includes an optical pickup 3 that writes and reads information to and from the optical disk 2, a disk rotation driving mechanism 4 that drives to rotate the optical disk 2, a feeding mechanism 5 that moves the optical pickup 3 radially of the optical disk 2, and a controller 6 that controls the optical pickup 3, of the disk rotation driving mechanism 4, and feeding mechanism 5.

The above disk rotation driving mechanism 4 includes a disk table 7 on which the optical disk 2 is mounted, and a spindle motor 8 to rotate the disk table 7. The feeding mechanism 5 includes a support base (not shown) to support the optical pickup 3, main and sub shafts (not shown) to support the support base movably, and a sled motor (not shown) to move the support base.

As shown in FIG. 4, the controller 6 includes an access control circuit 9 that drives the feeding mechanism 5 to control the position of the optical pickup 3 in the radial direction of the optical disk 2, a servo circuit 10 to control a biaxial actuator of the optical pickup 3, and a drive controller 11 to control these access control circuit 9, servo circuit 10 and optical pickup 3. Also, the controller 6 further includes a signal demodulation circuit 12 that demodulates signals from the optical pickup 3, an error correction circuit 13 that corrects errors of the demodulated signals, and an interface 14 that outputs the error-corrected signals to an external apparatus such as computer or the like.

In the optical disk drive 1 configured as above, the disk table 7 having an optical disk 2 mounted thereon is driven by the spindle motor 8 of the disk rotation driving mechanism 4, the feeding mechanism 5 is driven according to a control signal supplied from the access control circuit 9 in the controller 6, and the optical pickup 3 is moved to a position corresponding to a desired recording track on the optical disk 2, to thereby write or read information to or from the optical disk 2.

Figure 5:
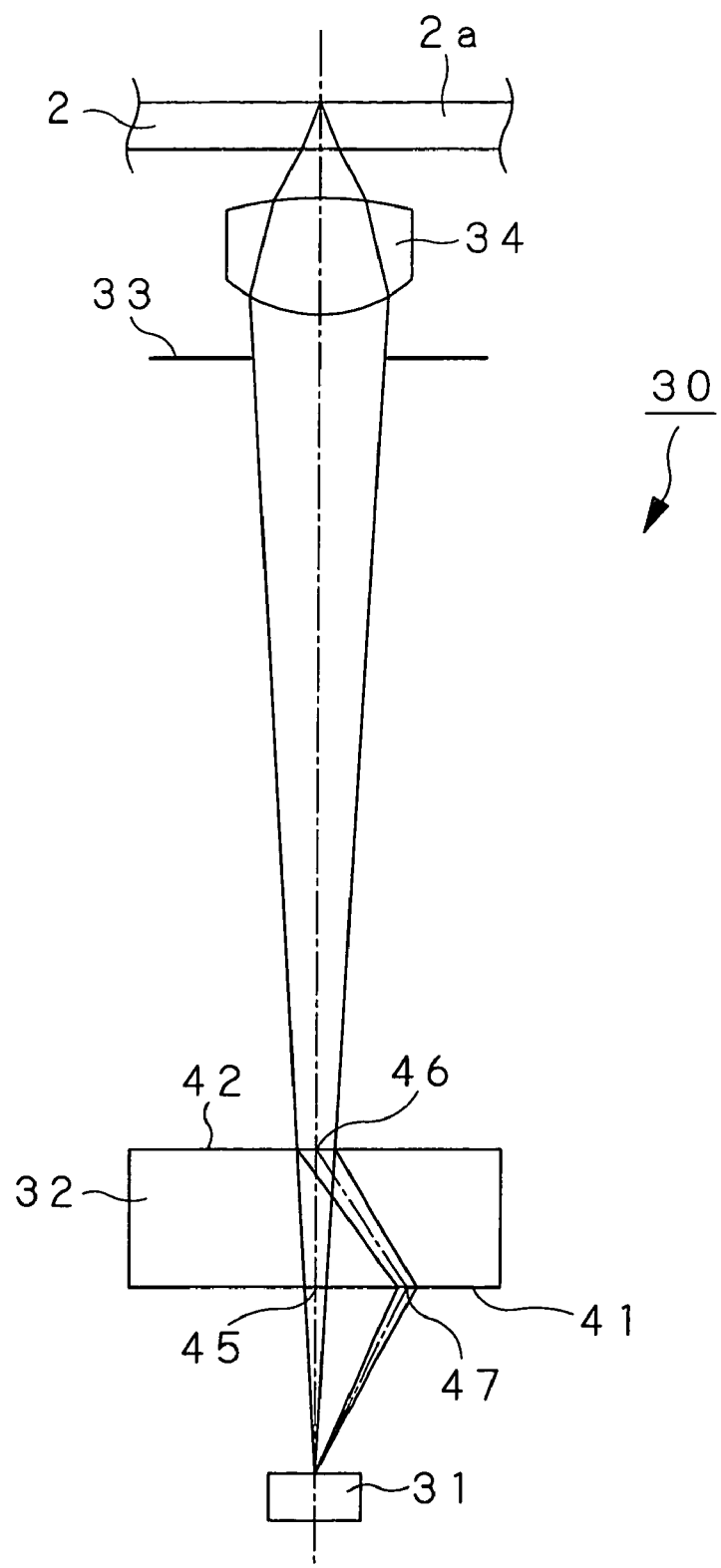
FIG. 5 is a schematic side elevation of an optical system in an optical pickup provided in the optical disk drive according to the present invention.

The above optical pickup 3 will be described in detail herebelow:

As shown in FIG. 5 for example, the optical pickup 3 includes an optical system 30 that reads information from the optical disk 2, and a lens driving mechanism (not shown) that moves an objective lens (will be described in detail later) included in the optical system 30.

The optical system 30 included in the optical pickup 3 includes, in the order following the light path, a light-emitting/-detecting element 31 which is an integral combination of a light source that emits a light beam and a light-detecting element to detect return light from the optical disk 2, a composite optical element 32 that splits the light beam emitted from the light-emitting/-detecting element 31 and separates the return light from the optical disk 2 from the light beam emitted from the light-emitting/-detecting element 31, a limiting aperture 33 that limits the outgoing light and passing by the composite optical element 32 to a predetermined numerical aperture NA, and a double-wavelength objective lens 34 that focuses the outgoing light limited by the limiting aperture 33 onto a recording layer $2a$ in the optical disk 2. It should be noted that the "laser beam emitted from the light-emitting/-detecting element" or "light beam emitted from the light-emitting/detecting element" will be referred to as "outgoing light" wherever appropriate hereinafter.

The light-emitting element/light-detecting element 31 includes a semiconductor laser that selectively emits a laser beam having a wavelength of about 780 nm or a laser beam having a wavelength of about 650 nm, and a light-detecting element having the light-detecting area thereof divided and which will be described in detail later. The light-emitting/-detecting element 31 can be switched between two modes of light emission. When the optical disk 2 is a CD-format one, the light-emitting/-detecting element 31 is switched to one of the modes to emit the light beam of about 780 nm in wavelength according to a control signal from the drive controller 11. When the optical disk 2 is of a DVD format type, the light-emitting/-detecting element 31 operates in the other mode to emit the light beam having the wavelength of about 650 nm according to a control signal from the drive controller 11.

Figure 6:
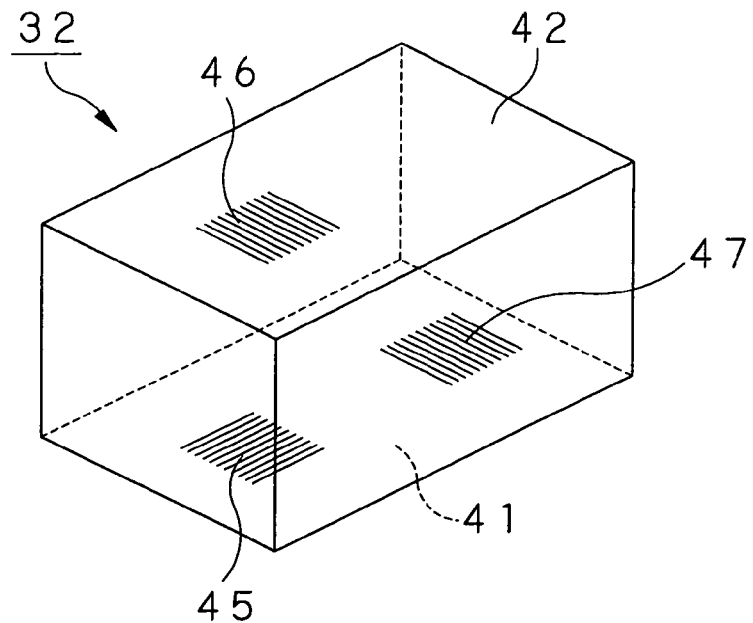
FIG. 6 is a perspective view of a composite optical element provided in the optical system of the optical pickup according to the present invention.
Figure 7:
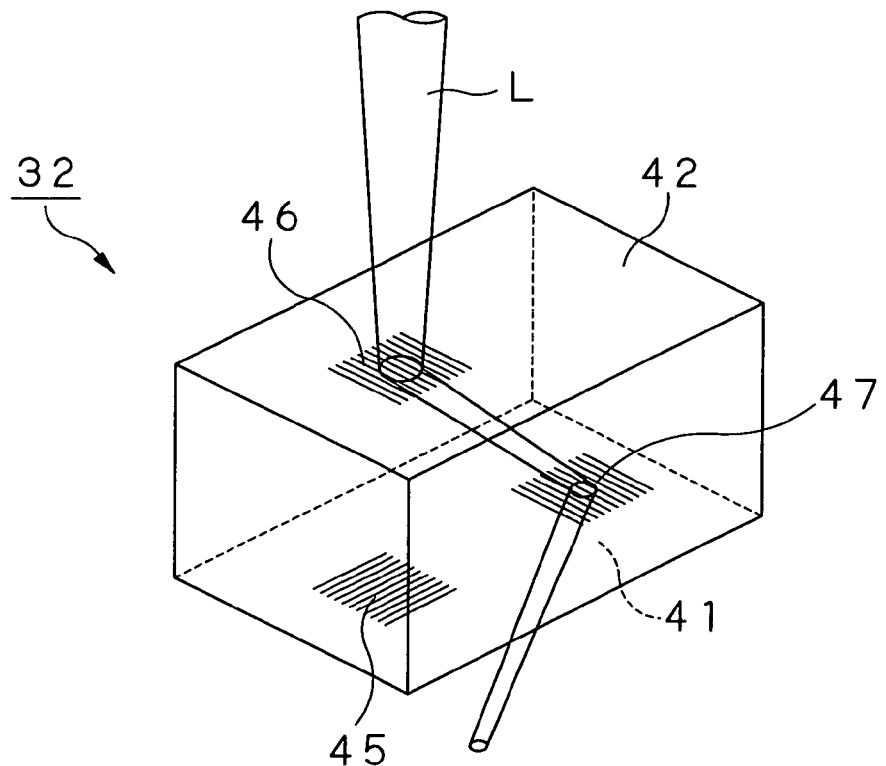
FIG. 7 is a perspective view of the composite optical element provided in the optical system of the optical pickup according to the present invention, showing the light path along which the return light travels in the composite optical element.

The above composite optical element 32 is formed by injection molding of a resin material, for example, to have a block-like shape formed from a first surface 41 that faces the light-emitting/-detecting element 31 and is perpendicular to the optical axis of the light beam emitted from the light-emitting/-detecting element 31, and a second surface 42 parallel to the first surface 41 as shown in FIGS. 5 to 7.

On the first surface 41, there is provided a first diffraction grating 45 that splits the light beam emitted from the light-emitting/-detecting element 31 into three light beam including a zero-order light beam and positive and negative first-order light beams. The optical system 30 adopts the so-called three-spot method (three-beam method) to provide a tracking error signal TE. It provides a tracking servo control by detecting, by the light-emitting/-detecting element 31, the positive and negative first-order light beams resulted from the light splitting by the first diffraction grating 45, and detecting a difference between the positive and negative first-order light beams outputs.

On the second surface 42, there is provided a second diffraction grating 46 that diffracts the zero-order light beam and positive and negative first-order light beams, resulted from splitting of the return light from the optical disk 2 by the first diffraction grating 45, further splits, by diffraction, the zero-order light beam and positive and negative first-order light beams into a zero-order light beam and positive and negative first-order light beams, and makes the positive first-order light beam, for example, as return light travel along a light path separate from that of the outgoing light.

Also on the first surface 41, there is provided a third diffraction grating 47. The third diffraction grating 47 is disposed on the light path of the return light having the light path thereof separated by the second diffraction grating 46 from that of the outgoing light to split, by diffraction, the return light into a zero-order light beam and positive and negative first-order light beams, and direct the negative first-order light beam, for example, to the light-emitting/-detecting element 31. The third diffraction grating 47 is disposed adjacent to one side of the first diffraction grating 45 in the same plane.

The composite optical element 32 imparts a predetermined extent of astigmatism to the return light incident upon the third diffraction grating 47 when the return light having the light path thereof separated by the second diffraction grating 46 from that of the outgoing light passes by the composite optical element 32. The composite optical element 32 can easily adjust defocusing in relation to the optical disk 2 by adjusting the optical-axial position of the light beam emitted from the light-emitting/-detecting element 31.

The composite optical element 32 is formed by injection molding of a resin material as above. Alternatively, it may have the first, second and third diffraction gratings 45, 46 and 47 formed thereon by etching or any other mechanical processing. It should be noted that the material of the composite optical element 32 is not limited to the resin material but may be a transparent optical material such as nitric material. Further, the composite optical element 32 may be formed from a combination of these optical materials so that one part thereof may be different in material from the other part.

The composite optical element 32 may be configured to have an internal reflecting surface. It can be configured with an improved degree of optical design by bending the light path by the reflecting surface.

In the composite optical element 32, the return light from the optical disk 2 has the light path thereof deviated due to a variation in wavelength of the light beam emitted from the light-emitting/-detecting element 31 as will be described herebelow:

The composite optical element 32 is configured such that the return light (as L) from the optical disk 2 is directed to the light-emitting/-detecting element 31 by diffracting it by the second diffraction grating 46 to be a positive first-order light beam which will travel along a light path separate from that of the outgoing light, and diffracting the return light L, made by the second diffraction grating 46 to travel along the separate light path, by the third diffraction grating 47 to be a negative first-order light beam, as shown in FIG. 7.

Figure 8:
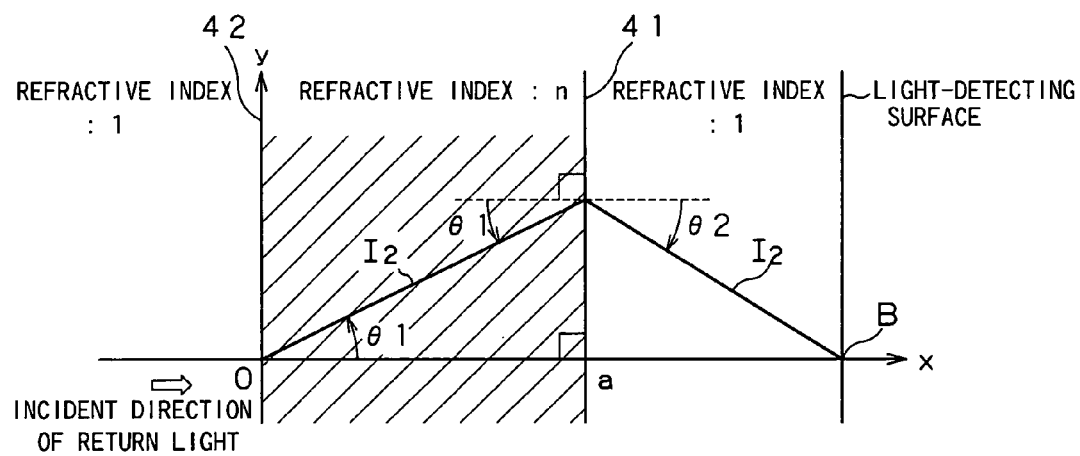
FIG. 8 explains a light-path deviation of the return light in the composite optical element provided in the optical system of the optical pickup according to the present invention.

Given that in the composite optical element 32, the wavelength of the return light is $\lambda$, angle of the diffraction by the second diffraction grating 46 is $\theta_1$, angle of the diffraction by the third diffraction grating 47 is $\theta_2$, grating constant of the second diffraction grating 46 is $d_1$, grating constant of the third diffraction grating 47 is $d_2$, order of the diffraction by the second diffraction grating 46 is +1, order of the diffraction by the third diffraction grating 47 is −1 and the refractive index of a medium between the second and third diffraction gratings 46 and 47 is n, that is, the refractive index of the resin material from which the composite optical element 32 is n, as shown in FIG. 8, the following formulas (8) and (9) are derived from the previously mentioned formula (3):

$$n \cdot \sin \theta_1 = \lambda/d_1 \quad (8)$$

$$\sin \theta_2 - n \cdot \sin \theta_1 = -\lambda/d_2 \quad (9)$$

The "$\sin \theta_1$" and "$\sin \theta_2$" in the above formulas (8) and (9) can be expressed as given by the following formulas (10) and (11) using the aforementioned formulas (1) and (2):

$$\sin \theta_1 = \lambda/(d_1 \cdot n) \quad (10)$$

$$\sin \theta_2 = \lambda \cdot (1/d_1 - 1/d_2) \quad (11)$$

The "$\cos \theta_1$" and "$\cos \theta_2$" can be expressed as given by the following formulas (12) and (13) using the formulas (10) and (11):

$$\cos \theta_1 = (1 \times \lambda^2/(d_1 \cdot n)^2)^{1/2} \quad (12)$$

$$\cos \theta_2 = (1 - \lambda^2 \cdot (1/d_1 - 1/d_2)^2)^{1/2} \quad (13)$$

Given that an x-axis extends horizontally and perpendicularly to the second surface 42 toward the first surface 41 taking the second surface 42 as x=0, a y-axis extends vertically as a deviation from the xaxis, the main beam, diffracted by the first diffraction grating 45 to be a zero-order light beam, of the return light from the optical disk 2 and diffracted by the second diffraction grating 46 to be a positive first-order light beam is a light beam $\mathbf{1}_1$, the light path of the light beam $\mathbf{1}_1$ can be expressed as given by the following formula (14):

$$y = \tan \theta_1 \cdot x \quad (14)$$

Also, given that the space between the first and second surface 41 and 42 is a, the intersection of the light beam $\mathbf{1}_1$ with the first surface 41, that is, a position where the light beam $\mathbf{1}_1$ is incident upon the third diffraction grating 47, can be expressed as given by the following formula (15):

$$x = a, \quad y = a \cdot \tan \theta_1 \quad (15)$$

Therefore, given that the return light, diffracted by the third diffraction grating 47 to be a negative first-order light beam, is a light beam $\mathbf{1}_2$, the light path of the light beam $\mathbf{1}_2$ can be expressed as given by the following formula (16):

$$y = \tan \theta_2 \cdot x + a(\tan \theta_1 - \tan \theta_2) \quad (16)$$

Given that the light beam $\mathbf{1}_2$ intersects the x-axis at a point B, the position B can be expressed as given by the following formula (17):

$$x = a(1 - \tan \theta_1/\tan \theta_2), \quad y = 0 \quad (17)$$

As will be revealed from the formula (17), a position x on the x-axis depends upon a diffraction angle $\theta_1$ of the second diffraction grating 46. The diffraction angle $\theta_1$ is a function of the wavelength $\lambda$ as in the formula (8). So, in the above example, when the wavelength $\lambda$ varies, the diffraction angle $\theta$ will vary correspondingly and the coordinate of the point B will also change, so that a variation in wavelength of the outgoing light will result in a change in position of the beam spot in the light-detecting area of the light-emitting/-detecting element 31.

Therefore, since the position of the beam spot in the light-detecting area of the light-emitting/-detecting element 31 remains unchanged independently of any wavelength variation, so the second term of the right side of the formula (17) expressing the value x can be expressed with the wavelength $\lambda$ with the use of the formulas (17) to (20) as given by the following formula (18):

When $d_2 < d_1$, (18)

$$\tan\theta_1/\tan\theta_2 = (\sin\theta_1/\cos\theta_1)/(\sin\theta_2/\cos\theta_2)$$
$$= -((d_1^2 d_2^2/(d_2-d_1)^2 - \lambda^2)/(n^2 d_1^2 - \lambda^2))^{1/2}$$

Through rearrangement of the above formula (18) by placing a condition given by the following formula (19) in the formula (18), the latter can be expressed by the following formula (20):

$$(n+1)d_2 = nd_1 \quad (19)$$

$$\tan\theta_1/\tan\theta_2 = -1 \quad (20)$$

As will be seen from the above formulas (19) and (20), the x coordinate of the point B of the third diffraction grating 47 remains unchanged independently of the wavelength λ.

That is, by designing the composite optical element 32 for the grating constant $d_1$ of the second diffraction grating 46 and grating constant $d_2$ of the third diffraction grating 47 to meet the condition given by the formula (19), the beam spot in the light-detecting area of the light-emitting/-detecting element 31 can be kept in a fixed position independently of any variation of the wavelength.

The grating constant $d_1$ of the second diffraction grating 46 and grating constant $d_2$ of the third diffraction grating 47 are determined as above. So, even if the return light from the optical disk 2, diffracted as a positive first-order light beam by the second diffraction grating 46, has the light path thereof deviated due to a variation in wavelength of the light beam emitted from the light-emitting/-detecting element 31 when it is separated from the outgoing light, the composite optical element 32 can always direct the return light from the optical disk 2 appropriately to a predetermined position in the light-detecting area of the light-emitting/-detecting element 31 by diffracting the return light by the third diffraction grating 47 to be a negative first-order light beam.

The limiting aperture 33 is disposed on the optical axis of the light beam passing by the second diffraction grating 46 of the composite optical element 32.

The double-wavelength objective lens 34 is a condenser lens adapted for the plurality of light beams different in wavelength from each other, emitted from the light-emitting/-detecting element 31. It is formed from at least one convex lens, and disposed to focus, on the optical disk 2, the light beam emitted from the light-emitting/-detecting element 31 and limited by the limiting aperture 33.

Figure 9:
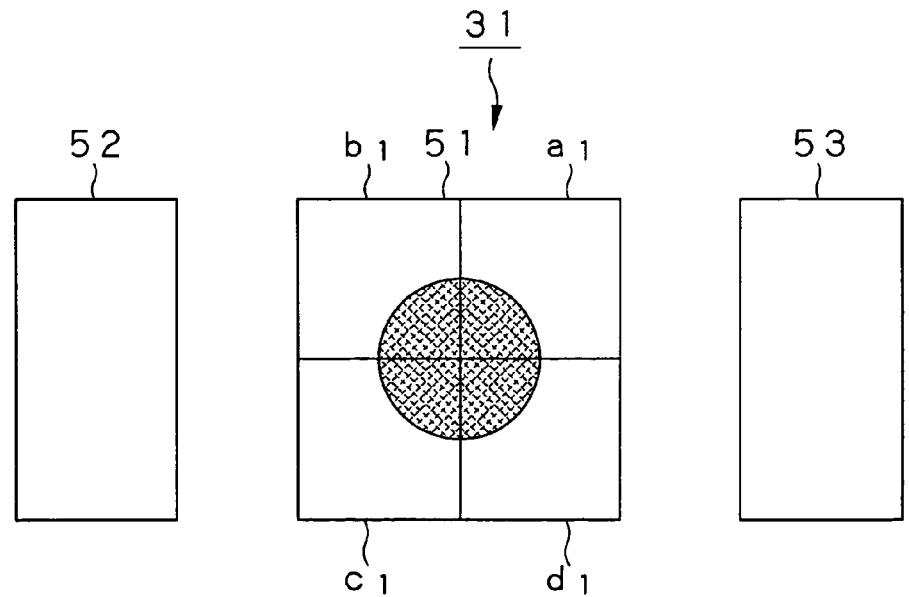
FIG. 9 explains a main-beam photodetector and side-beam photodetectors of a photodetector assembly provided in the optical system of the optical pickup according to the present invention.

As shown in FIG. 9, the light-emitting/-detecting element 31 includes a generally square main-beam photodetector 51 that detects a main beam being a zero-order light beam resulted from splitting by the first diffraction grating 45, and a pair of generally rectangular side-beam photodetectors 52 and 53 that detect two side beams being positive and negative first-order light beams also resulted from splitting by the first diffraction grating 45. The light-emitting/-detecting element 31 is disposed correspondingly to a position where there is incident the return light having the light-path deviation thereof corrected by the third diffraction grating 47 in the composite optical element 32. In the light-emitting/-detecting element 31, the generally square main-beam photodetector 51 is disposed in the center, and the generally rectangular side-beam photodetectors 52 and 53 in a set are disposed across the main-beam photodetector 51.

As shown in FIG. 9, the main-beam photodetector 51 in the light-emitting/-detecting element 31 has a light-detecting surface quadrisected by a set of parting lines perpendicular to each other into light-detecting areas $a_1$, $b_1$, $c_1$ and $d_1$ upon which there will be incident the return light having the light-path deviation thereof corrected by the third diffraction grating 47.

The lens driving mechanism in the optical pickup 3 includes a lens holder to hold the double-wavelength objective lens 34, a lens holder supporting member to support the lens holder to be movable biaxially, namely, in a focusing direction parallel to the optical axis of the double-wavelength objective lens 34 and a tracking direction perpendicular to the optical axis of the double-wavelength objective lens 34, and an electromagnetic drive unit to move the lens holder biaxially under the action of an electromagnetic force (these components are not illustrated).

The above lens driving mechanism moves the double-wavelength objective lens 34 in the focusing and tracking directions according to a focusing error signal provided by the main-beam photodetector 51 in the light-emitting/-detecting element 31 and tracking error signal provided by the side-beam photodetectors 52 and 53, to thereby focus the light beam emitted from the light-emitting/-detecting element 31 onto a recording track on the recording layer 2a in the optical disk 2.

Note that each of the first, second and third diffraction gratings 45, 46 and 47 in the composite optical element 32 may be a hologram element having a predetermined hologram pattern formed by etching. In this case, the hologram should preferably be a surface-relieved one or a brazed hologram, to improve the efficiency of diffraction.

In the optical disk drive 1 configured as above, the servo circuit 10 generates control signals according to the focusing and tracking error signals detected by the optical pickup 3 from the return light from the optical disk 2 and supplies the control signals to the biaxial actuator of the optical pickup 3, the biaxial actuator moves the double-wavelength objective lens 34 in the focusing and tracking directions, and thus the outgoing light is focused by the double-wavelength objective lens 34 onto a desired recording track on the optical disk 2. Then, in the optical disk drive 1, signals read by the optical pickup 3 are demodulated by the signal demodulation circuit 12, error-corrected by the error correction circuit 13, and then delivered as read signal at the interface 14.

In the optical disk drive 1, the outgoing light and return light travel along their respective light paths inside the optical pickup 3 as will be described below:

In the optical disk drive 1, to read information from the recording layer 2a in the optical disk 2, a light beam emitted from the light-emitting/-detecting element 31 is split by the first diffraction grating 45 in the composite optical element 32 into three light beam including a zero-order light beam and positive and negative first-order light beams, as shown in FIG. 5. Each of the three light beam thus resulted from splitting of the outgoing light passes by the second diffraction grating 46 in the composite optical element 32, and is focused by the double-wavelength objective lens 34 onto the recording layer 2a in the optical disk 2.

The return light from the recording layer 2a in the optical disk 2 is split by the second diffraction grating 46 in the composite optical element 32 into three light beam including a zero-order light beam and positive and negative first-order light beams. Of these three light beam, the positive first-order light beam has the light path thereof separated as return light from that of the outgoing light, and is incident upon the third diffraction grating 47. The return light incident upon the third diffraction grating 47 is further split by the latter into three light beam including a zero-order light beam and positive and negative first-order light beams. Of these light beam, the negative first-order light beam is incident as return light upon each of the light-detecting areas $a_1$, $b_1$, $c_1$ and $d_1$ of the main-beam photodetector 51 in the light-emitting/-detecting element 31.

Then in the composite optical element 32, a light-path deviation of the return light, taking place in the second diffraction grating 46, will be corrected by the third diffraction grating 47, and the return light be incident upon the light-detecting areas $a_1$, $b_1$, $c_1$ and $d_1$ of the main-beam photodetector 51 in the light-emitting/-detecting element 31.

Figure 10A:
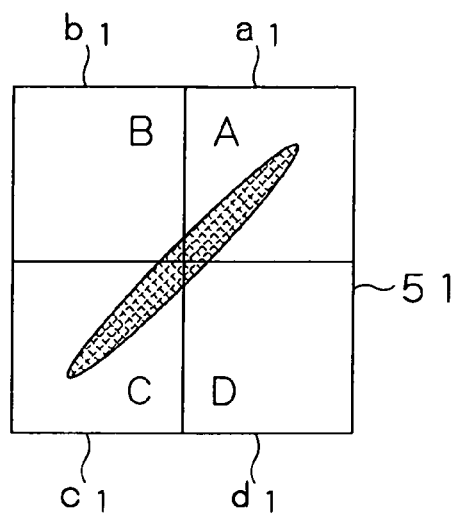
Figure 10B:
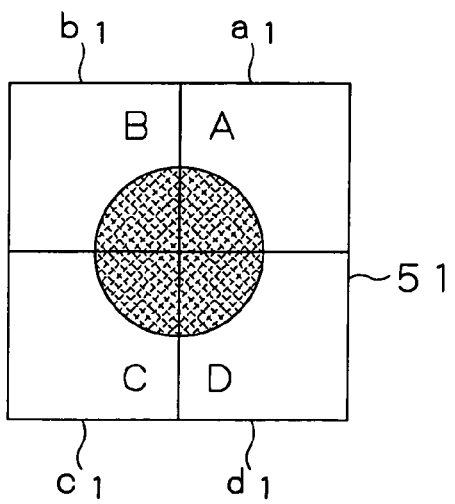

When the double-wavelength objective lens 34 is positioned in relation to the recording layer 2a in the optical disk 2 to just focus the return light on the recording layer 2a, the return light incident upon the light-detecting areas $a_1$, $b_1$, $c_1$ and $d_1$ of the main-beam photodetector 51 will define a circular beam spot as shown in FIG. 10B.

In case th beam spot is circular as shown in FIG. 10B, the light-detecting areas $a_1$ and $c_1$ of the main-beam photodetector 51 will be equal in amount of incident light to the light-detecting areas $b_1$ and $d_1$.

If the double-wavelength objective lens 34 is excessively close to the recording layer 2a in the optical disk 2, it will be off the just-in-focus position, and astigmatism, taking place due to the passage by the composite optical element 32 of the return light having the light path thereof separated by the second diffraction grating 46 from that of the outgoing light, cause the return light incident upon the light-detecting areas $a_1$, $b_1$, $c_1$ and $d_1$ of the main-beam photodetector 51 to define a beam spot which has the form of an ellipse whose major axis extends over the light-detecting areas $a_1$ and $c_1$ as shown in FIG. 10A.

Figure 10C:
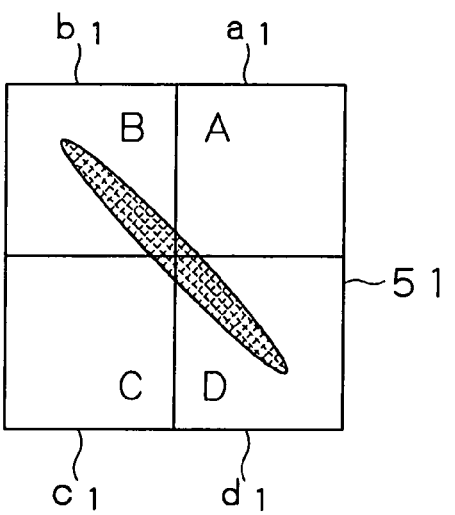

Further, if the double-wavelength objective lens 34 is excessively apart from the recording layer 2a in the optical disk 2, it is off the just-in-focus position, and astigmatism, taking place due to the passage by the composite optical element 32 of the return light having the light path thereof separated by the second diffraction grating 46 from that of the outgoing light, causes the return light incident upon the light-detecting areas $a_1$, $b_1$, $c_1$ and $d_1$ of the main-beam photodetector 51 to define a beam spot which has the form of an ellipse whose major axis extends over the light-detecting areas $b_1$ and $d_1$ as shown in FIG. 10C, namely, an ellipse whose major axis is inclined 90 deg. in relation to that of the beam spot shown in FIG. 10A.

Thus, if the return light defines an elliptic beam spot as shown in FIGS. 10A and 10B, one of the set of light-detecting areas $a_1$ and $c_1$ and set of light-detecting areas $b_1$ and $d_1$ of the main-beam photodetector 51 will be larger or smaller in amount of incident light than the other.

Therefore, given that the light-detecting areas $a_1$, $b_1$, $c_1$ and $d_1$ detects outputs $Sa_1$, $Sb_1$, $Sc_1$ and $Sd_1$, respectively, the main-beam photodetector 51 provides a focusing error signal FE expressed as given by the following formula (21):

$$FE = (Sa_1 + Sc_1) - (Sb_1 + Sd_1) \quad (21)$$

That is, in case the double-wavelength objective lens 34 is positioned in the in-focus position in relation to the recording layer 2a in the optical disk 2, the main-beam photodetector 51 provides a focusing error signal FE which is zero (0), calculated using the formula (21). If the double-wavelength objective lens 34 is excessively close to the recording layer 2a in the optical disk 2, the main-beam photodetector 51 will provide a focusing error signal FE which is positive. On the other hand, if the double-wavelength objective lens 34 is excessively apart from the recording layer 2a in the optical disk 2, the main-beam photodetector 51 will provide a focusing error signal FE which is negative.

As above, the main-beam photodetector 51 in the light-emitting/-detecting element 31 provides a focusing error signal FE and read signal by detecting beam spots on the light-detecting areas $a_1$, $b_1$, $c_1$ and $d_1$ thereof.

The side-beam photodetectors 52 and 53 in a set detect side beams split by the first diffraction grating 45 into the positive and negative first-order light beams, reflected by the optical disk 2 to be return light as the positive first-order light beam, separated by the second diffraction grating 46 from the outgoing light, and having the light-path deviation thereof corrected by the third diffraction grating 47, and then incident upon the light-detecting surfaces of the side-beam photodetectors 52 and 53. The side-beam photodetectors 52 and 53 provide a tracking error signal TE by calculating a difference between the positive and negative first-order light beams outputs.

Figure 11:
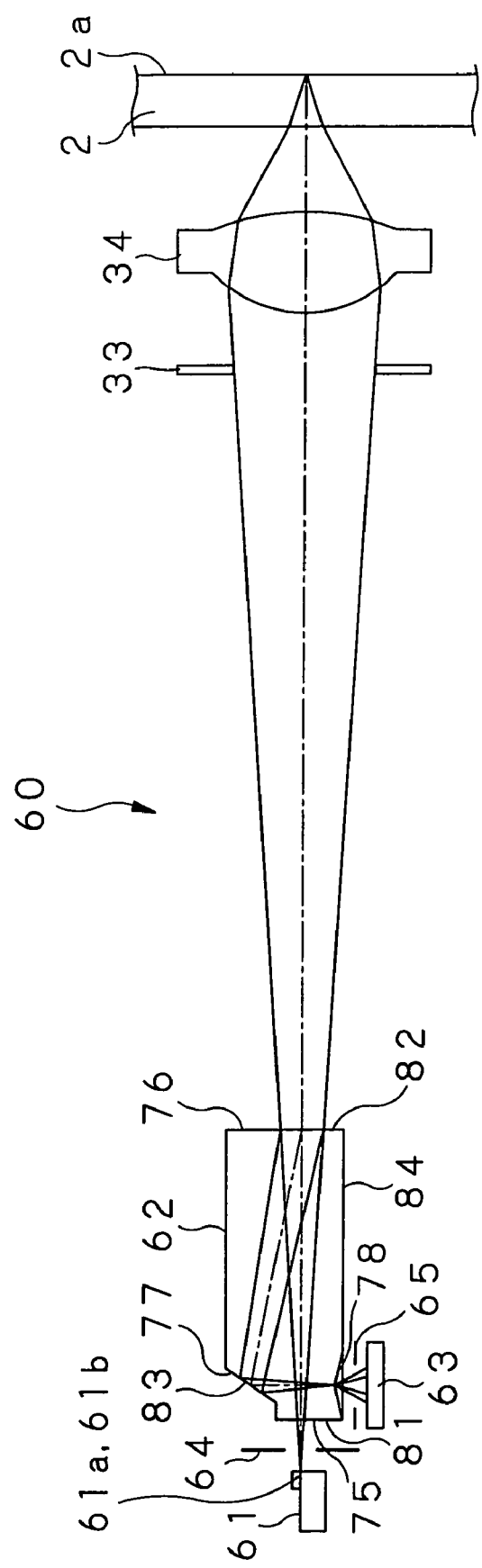
FIG. 11 is a schematic side elevation of a variant of the optical system included in the optical pickup provided in the optical disk drive according to the present invention.

Note that the optical pickup 3 may be configured to include, as shown in FIG. 11 for example, an optical system 60 that reads information from the optical disk 2, and a lens driving mechanism (not shown) that moves the objective lens included in the optical system 60 and will be described in detail later. The optical pickup 3 including the above optical system 60 will be described below. The same or similar components of the optical pickup 3 using the optical system 60 as or to those of the optical pickup 3 including the aforementioned optical system 30 will be indicated with the same or similar references and will not be described in detail any more.

The optical system 60 in the optical pickup 3 includes, in the order following the light path, a double-wavelength light source 61 that selectively emits a plurality of light beams different in wavelength from each other to the optical disk 2, a composite optical element 62 that splits the light beam emitted from the double-wavelength light source 61, separates return light from the optical disk 2 and the light beam (outgoing light) emitted from the double-wavelength light source 61 from each other and further splits the return light separated from the outgoing light, a limiting aperture 33 that limits the light beam emitted from the light source 61 and passing by the composite optical element 62 to a predetermined numerical aperture NA, a double-wavelength objective lens 34 that focuses the outgoing light limited by the limiting aperture 33 onto the recording layer 2a in the optical disk 2, and a photodetector assembly 63 that detects the return light from the optical disk 2. The optical system 60 further includes a first light shielding plate 64 provided between the double-wavelength light source 61 and composite optical element 62 to shield unnecessary light beams other than valid ones of the outgoing light, and a second light shielding plate 65 provided between the composite optical element 62 and photodetector assembly 63 to shield unnecessary light beams other than valid ones of the return light.

The double-wavelength light source 61 is a semiconductor laser that selectively emits a laser beam having a wavelength of about 780 nm for example or a light beam having a wavelength of about 650 nm for example from a light-emitting point 61a or 61b. The double-wavelength light source 61 can be switched between two modes of light emission. When the optical disk 2 is a CD-format one, the double-wavelength light source 61 is switched to one of the modes to emit the light beam of about 780 nm in wavelength according to a control signal from the drive controller 11. When the optical disk 2 is of a DVD format type, the double-wavelength light source 61 operates in the other mode to emit the light beam having the wavelength of about 650 nm according to a control signal from the drive controller 11.

Figure 12:
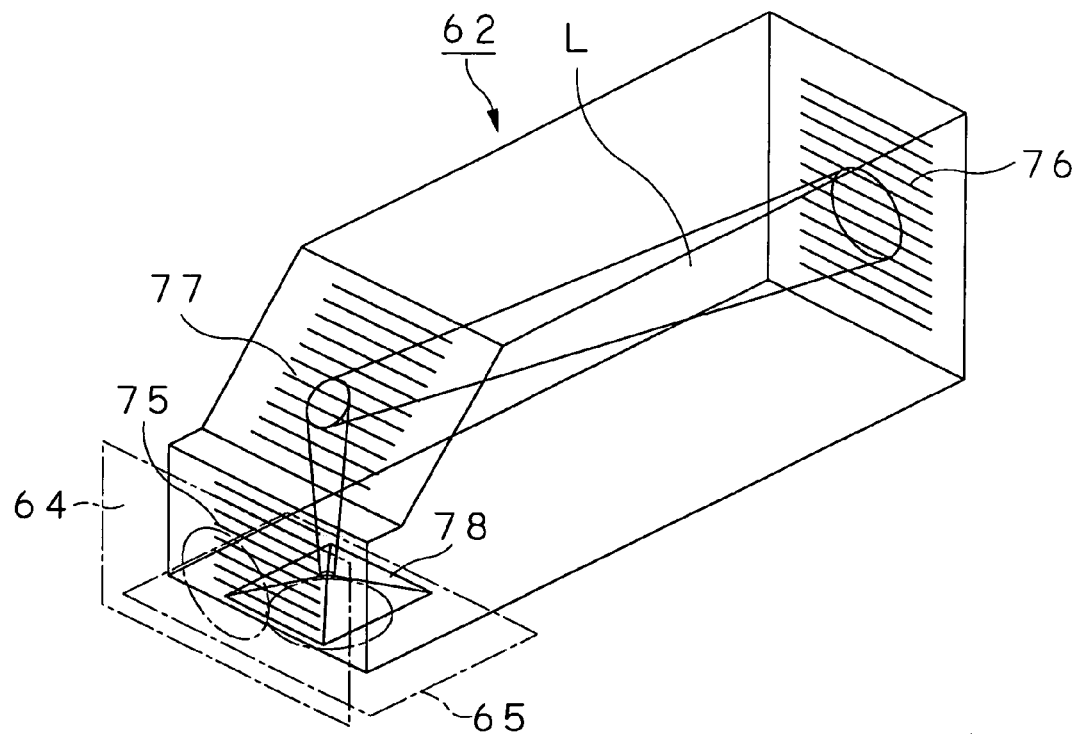
FIG. 12 is a perspective view of a composite optical element provided in the variant of the optical system of the optical pickup in FIG. 11.

As shown in FIGS. 11 and 12, the composite optical element 62 is formed like a block by injection molding of a resin material, for example. It has a first surface 81 facing the double-wavelength light source 61 and perpendicular to the optical axis of the light beam emitted from the light-emitting point 61a or 61b of the double-wavelength light source 61, a second surface 82 parallel and opposite to the first surface 81, a third surface 83 inclined a predetermined angle in relation to the second surface 82 and opposite to the latter, and a fourth surface 84 perpendicular to the first and second surfaces 81 and 82, inclined a predetermined angle in relation to the third surface 83 and opposite to the latter.

On the first surface 81, there is provided a first diffraction grating 75 that splits the light beam emitted from the light-emitting point 61a or 61b of the double-wavelength light source 61 into three light beam including a zero-order light beam and positive and negative first-order light beams. The optical system 60 adopts the so-called three-spot method (three-beam method) to provide a tracking error signal TE. It provides a tracking servo control by detecting, at the photodetector assembly 63, the positive and negative first-order light beams from the first diffraction grating 75 and detecting a difference between the positive and negative first-order light beams outputs.

On the second surface 82, there is provided a second diffraction grating 76 that splits the zero-order light beam and positive and negative first-order light beams, resulted from diffraction by the first diffraction grating 75, of the return light from the optical disk 2, further splits, by diffraction, the zero-order light beam and positive and negative first-order light beams into a zero-order light beam and positive and negative first-order light beams, and makes the positive first-order light beam as return light travel along a light path separate from the light path of the outgoing light.

Further, a third diffraction grating 77 is provided on the above third surface 83. It is disposed on the light path of the return light split by the second diffraction grating 76 to reflect and diffract the return light, further split the return light into a zero-order light beam and positive and negative first-order light beams, and thus correct a light-path deviation, taking place in the second diffraction grating 76, of the negative first-order light beam, for example, as return light.

The third diffraction grating 77 has a specific reflecting film provided on the third surface 83 to totally reflect the incident return light. It functions as a so-called reflective diffraction grating.

Also, a beam-splitting prism 78 is provided on the fourth surface 84. It is disposed on the light path of the return light having the light-path deviation corrected by the third diffraction grating 77 to split the return light into four light beam.

Figure 13:
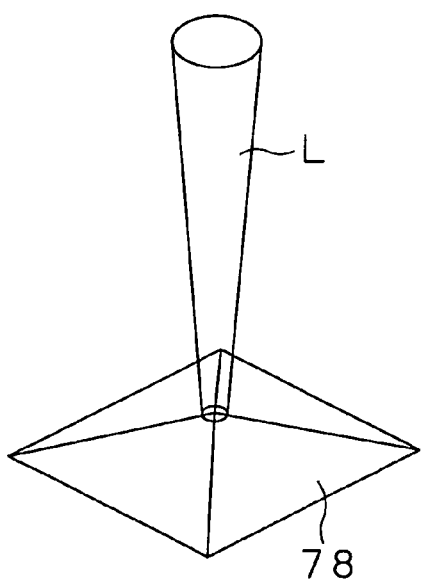
FIG. 13 is a perspective view of a beam-splitting prism included in the composite optical element in the variant of the optical system of the optical pickup in FIG. 11.
Figure 14:
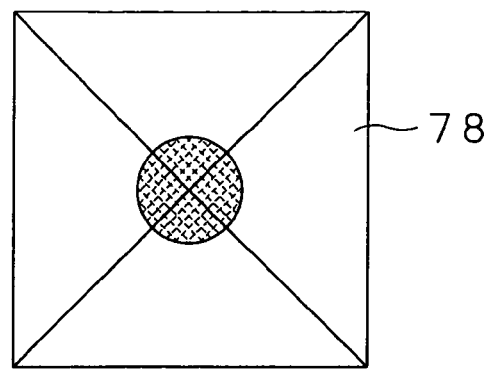
FIG. 14 is a view, from the return light-detecting side, of the beam-splitting prism in the composite optical element provided in the variant of the optical system of the optical pickup in FIG. 11.

As shown in FIGS. 13 and 14, the beam-splitting prism 78 is shaped to have the form of a generally regular-tetragonal pyramid. The beam-splitting prism 78 is disposed in such a manner that the diffracted component of the negative first-order light beam reflected and diffracted by the third diffraction grating 77 will be incident at the center thereof upon the apex of the regular-tetragonal pyramid. The diffracted light is incident, at or close to the focus thereof, upon the apex of the regular-tetragonal pyramid.

Also, the beam-splitting prism 78 is disposed inside the composite optical element 62 with the apex thereof being directed inwardly of the composite optical element 62. That is, the beam-splitting prism 78 is disposed in such a manner that the zero-order light beam of the three light beam from the first diffraction grating 75 will be diffracted by the second diffraction grating 76, and reflected and diffracted by the third diffraction grating 77 for incidence upon the apex of the beam-splitting prism 78. It should be noted that the beam-splitting prism 78 is disposed with the bottom thereof (namely, the bottom of the tetragonal pyramid) being perpendicular to the optical axis of the negative first-order light beam reflected and diffracted by the third diffraction grating 77.

The composite optical element 62 imparts a predetermined degree of astigmatism to the return light incident upon the beam-splitting prism 78 when the return light separated by the second diffraction grating 76 passes by the composite optical element 62. The composite optical element 62 can easily adjust defocusing in relation to the optical disk 2 by adjusting the optical-axial position of the light beam selectively emitted from the double-wavelength light source 61.

The composite optical element 62 is formed from a resin material by injection molding as above. Alternatively, it may have the first, second and third diffraction gratings 75, 76 and 77 and beam-splitting prism 78 formed thereon by etching or any other mechanical processing. It should be noted that the material of the composite optical element 62 is not limited to the resin material but may be a transparent optical material such as nitric material. Further, the composite optical element 62 may be formed from a combination of these optical materials so that one part thereof may be different in material from the other part.

As in the composite optical element 32 having previously been described, the composite optical element 62 designed on the basis of calculated values of the grating constants of the second and third diffraction gratings 76 and 77, an angle defined between the third and second surfaces 83 and 82, etc. can correct a light-path deviation, caused by a wavelength variation, of the return light, and thus direct the return light accurately to the apex of the beam-splitting prism 78.

In the composite optical element 62 thus configured, even if the return light from the optical disk 2, diffracted as a positive first-order light beam by the second diffraction grating 76, has the light path thereof deviated from that of the outgoing light due to a variation in wavelength of the light beam selectively emitted from the double-wavelength light source 61 when it is separated from the outgoing light, reflection and diffraction of the return light, as a negative first-order light beam, by the third diffraction grating 77 permit to direct the return light always to the apex of the beam-splitting prism 78 and accurately direct each return light coming from the optical disk 2 and split by the beam-splitting prism 78 to a predetermined position on the light-detecting area of the photodetector assembly 63.

The limiting aperture 33 is disposed on the optical axis of the outgoing light having passed by the second diffraction grating 76 in the composite optical element 62.

The double-wavelength objective lens 34 is formed from at least one convex lens, and disposed to focus, on the optical disk 2, the light beam emitted from the double-wavelength light source 61 and limited by the limiting aperture 33. The convex lens is a condenser lens to focus the light beam emitted from the double-wavelength light source 61 that selectively emits one of a plurality of light beams different in wavelength from each other.

Figure 15:
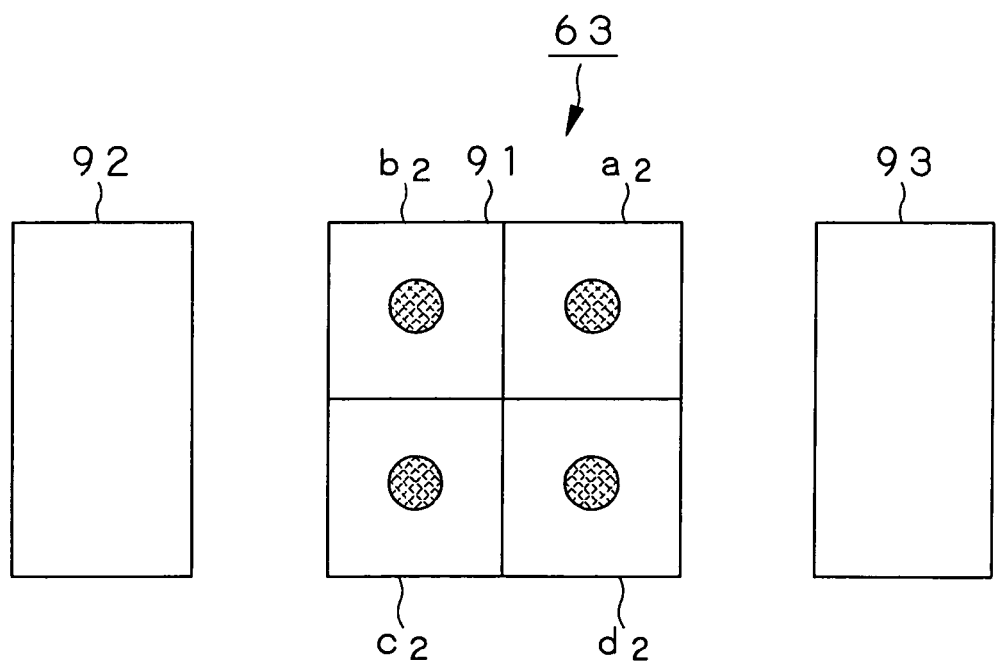
FIG. 15 explains a main-beam photodetector and side-beam photodetectors in the photodetector assembly provided in the variant of the optical system of the optical pickup in FIG. 11.

As shown in FIG. 15, the photodetector assembly 63 includes a generally square main-beam photodetector 91 that detects a main beam being a zero-order light beam from the first diffraction grating 75, and a pair of generally rectangular side-beam photodetectors 92 and 93 that detect two side beams being positive and negative first-order light beams from the first diffraction grating 75. The photodetector assembly 63 is disposed in a position corresponding to each return light split by the beam-splitting prism 78 in the composite optical element 62. In the photodetector assembly 63, the generally square main-beam photodetector 91 is disposed in the center, while the generally rectangular side-beam photodetectors 92 and 93 in a set are disposed across the main-beam photodetector 91.

Also, the main-beam photodetector 91 in the photodetector assembly 63 has the surface thereof quadrisected by a set of parting lines perpendicular to each other into light-detecting areas $a_2$, $b_2$, $c_2$ and $d_2$. The light beams resulted from quadrisection of the return light by the beam-splitting prism 78 are incident upon the light-detecting areas $a_2$, $b_2$, $c_2$ and $d_2$, respectively.

The first light shielding plate 64 has a generally circular opening formed therein between the double-wavelength light source 61 and composite optical element 62 correspondingly to the valid beam of the outgoing light. The opening shields, by aperture limitation, unnecessary light beam other than the valid beam. It can prevent any stray light not passing by the beam-splitting prism 78 in the composite optical element 62 from entering the photodetector assembly 63.

Also, the second light shielding plate 65 has a generally circular opening formed therein between the light source 62 and composite optical element 63 correspondingly to the valid beam of the outgoing light. The opening shields, by aperture limitation, unnecessary light beam other than the valid beam. It can prevent any stray light not passing by the beam-splitting prism 78 in the composite optical element 62 from entering the photodetector assembly 63.

Note that the shape of the openings formed in the first and second light shielding plates 64 and 65, respectively, is not limited to the circular one but may be generally elliptic, polygonal or the like.

As shown in FIGS. 14 and 15, the openings formed in the first and second light shielding plates 64 and 65 are shaped for only the zero-order light beam from the first diffraction grating 75, that is, the main beam. Such openings should be provided also for the positive and negative first-order light beams, namely, the side beams. Alternatively, the opening shape should be altered for the main and side beams, respectively.

The lens driving mechanism in the optical pickup 3 includes a lens holder to hold the double-wavelength objective lens 34, a lens holder support member to support the lens holder to be movable biaxially, namely, in a focusing direction parallel to the optical axis of the double-wavelength objective lens 34 and a tracking direction perpendicular to the optical axis of the double-wavelength objective lens 34, and an electromagnetic drive unit to move the lens holder biaxially under the action of an electromagnetic force (these components are not illustrated).

The above lens driving mechanism moves the double-wavelength objective lens 34 in the focusing and tracking directions according to a focusing error signal detected by the main-beam photodetector 91 in the photodetector assembly 63 and tracking error signal detected by the side-beam photodetectors 92 and 93, to thereby focus the outgoing light on a recording track on the recording layer 2a in the optical disk 2.

Note that the beam-splitting prism 78 included in the aforementioned composite optical element 62 may be shaped to have the form of an octagonal cone, for example.

In this case, the main-beam photodetector 91 in the photodetector assembly 63 may be configured to have the light-detecting surface thereof divided radially from the center into eight areas. In the composite optical element 62, the beam-splitting prism 78 is provided inside the fourth surface 84. Alternatively, however, the beam-splitting prism 78 may be projected to outside the fourth surface 84. The beam-splitting prism 78 in the composite optical element 62 is not limited in shape to the octagonal cone having flat surfaces but may be formed to have a plurality of curved surfaces. In this case, the light-detecting areas of the main-beam photodetector 91 in the photodetector assembly 63 will be formed correspondingly to the curved surfaces. Furthermore, each of the first to third diffraction gratings 75 to 77 in the composite optical element 62 may be a hologram element having a predetermined hologram pattern formed by etching or on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 155 in the focusing and tracking directions, and thus the outgoing light is focused by the double-wavelength objective lens 155 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along their respective light paths in the aforementioned optical system 150 of the optical pickup 3 in the optical disk drive 1 as will be described below.

Figure 29:
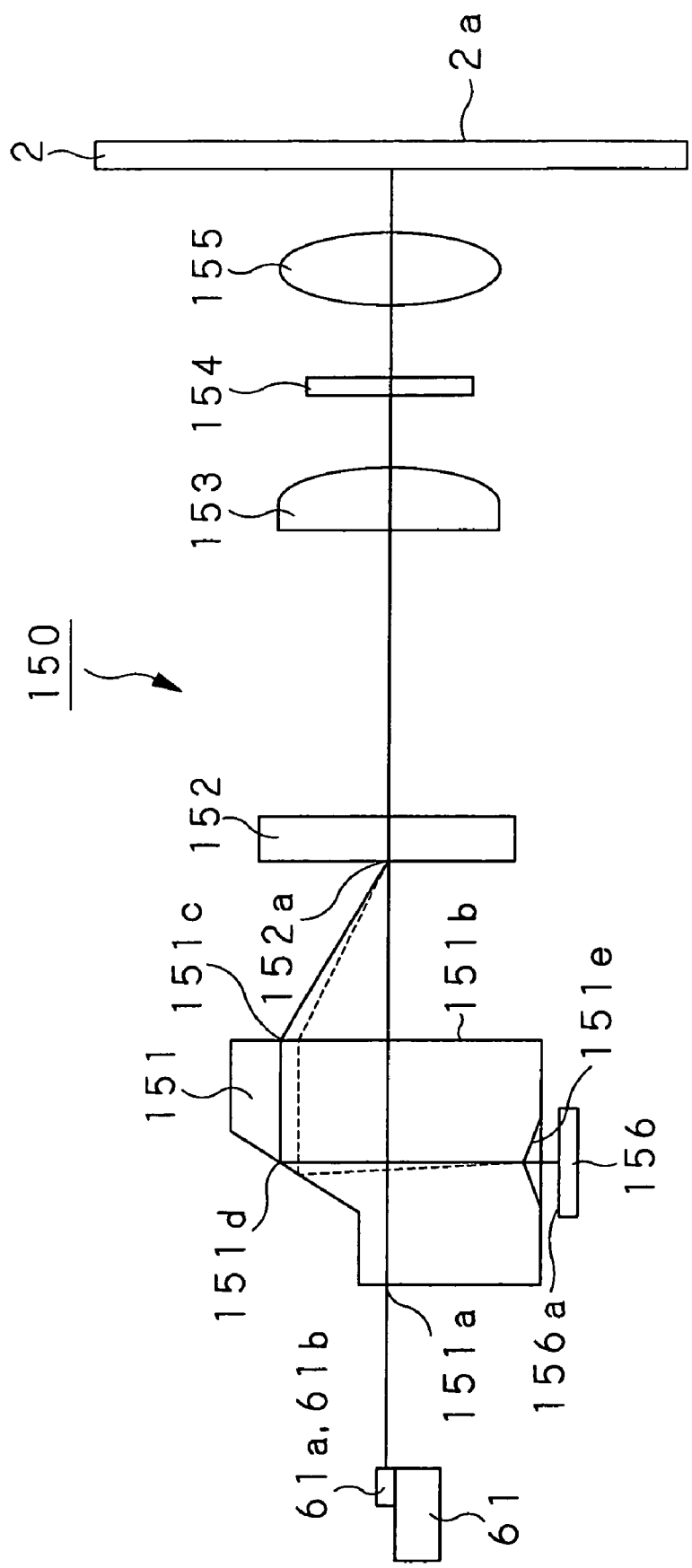
FIG. 29 is a schematic side elevation of a further another variant of the optical system of the optical pickup in the optical disk drive according to the present invention.

When the optical disk drive 1 reads information from the recording layer 2a of the optical disk 2, the light beam selectively emitted from the double-wavelength light source 61 that selectively emits light beams having different wavelengths is split by the three-beam generating diffraction grating 161 in the composite optical element 151 into three beams including a zero-order light beam and positive and negative first-order light beams as shown in FIG. 29. The outgoing light thus split into the three beams has a light-path deviation thereof corrected by the light-path synthesis diffraction grating 162 in the composite optical element 151 to pass similar process, for example. In this case, the hologram element should preferably be a surface-relieved one or a brazed hologram, to improve the efficiency of diffraction.

Figure 16:
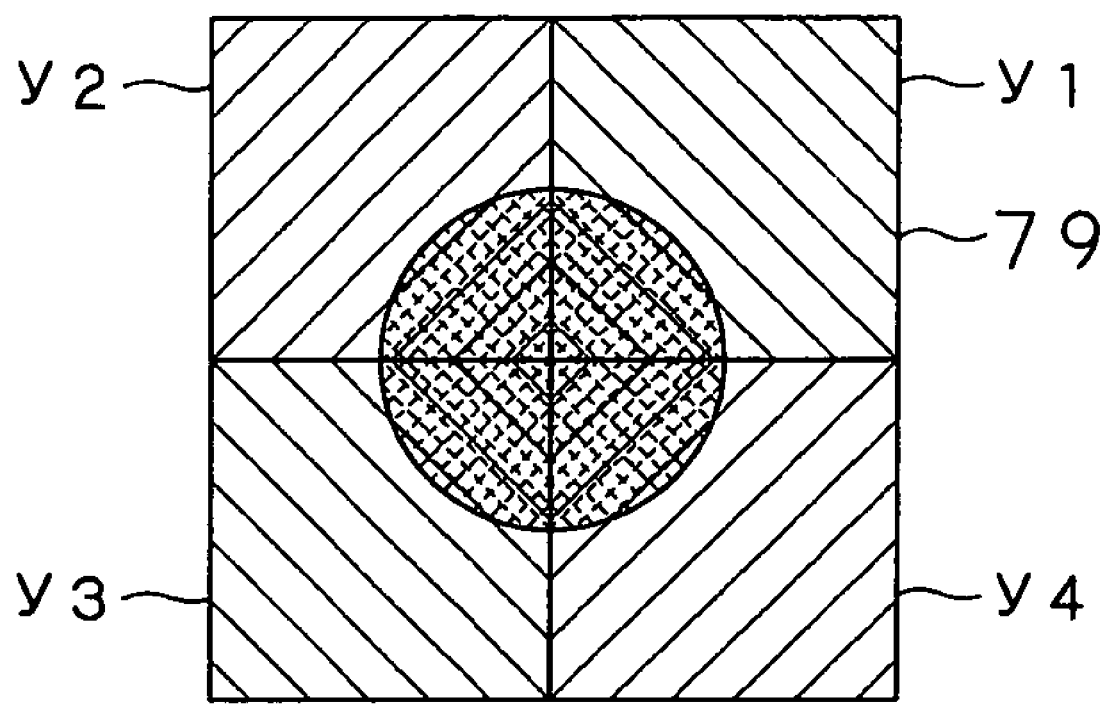
FIG. 16 is a plan view of a grating having a function equivalent to that of the beam-splitting prism included in the composite optical element in the variant of the optical system of the optical pickup in FIG. 11.

The composite optical element 62 may use a grating 79 divided in four areas as shown in FIG. 16 in place of the beam-splitting prism 78. The grating 79 is equal in effect to the beam-splitting prism 78. The grating 79 has divisional areas $y_1$, $y_2$, $y_3$ and $y_4$ to assure the same effect. The divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four light beam to the main-beam photodetector 91 in the photodetector assembly 63. The grating 79 is a hologram element having a predetermined hologram pattern formed by etching or similar process, for example. In this case, the hologram element should preferably be a surface-relieved one or a brazed hologram, to improve the efficiency of diffraction.

Further, the composite optical element 62 may be configured to have an internal reflecting surface which can be used to bend the light path for an improved freedom of the optical design.

Furthermore, the composite optical element 62 may have such an increased angle of refraction that the incident angle of the return light from the optical disk 2, incident upon the beam-splitting prism 78, will form an angle of less than 45 deg. with each surface of the beam-splitting prism 78, that is, each surface of the beam-splitting prism 78 will be inclined less than 45 deg. in order to prevent the incident return light from being totally reflected. Thus, the spots of the split beams of the return light can be separated more from each other, the divisional surface areas of the main-beam photodetector 91 can be separated more from each other, and the main-beam and side-beam photodetectors 91 and 92 and 93 can be separated more from each other. Thus, the optical pickup 3 may be assembled with a precision not so high.

In the optical disk drive 1 incorporating the optical pickup 3 including the aforementioned optical system 60, the servo circuit 10 generates and supplies a control signal to the biaxial actuator of the optical pickup 3 according to the focusing and tracking error signals detected by the optical pickup 3 from the return light from the optical disk 2, and the biaxial actuator moves the double-wavelength objective lens 34 in focusing and tracking directions according to the supplied focusing and tracking error signals to focus the outgoing light onto a desired recording track on the optical disk 2 through the double-wavelength objective lens 34. Then, in the optical disk drive 1, a signal thus read by the optical pickup 3 is demodulated and error-corrected by the signal demodulation circuit 12 and error correction circuit 13, respectively, to output a read signal from the interface 14.

The optical disk drive 1 incorporating the optical pickup 3 including the aforementioned optical system 60 will be described in detail concerning the light paths of the outgoing light and return light in the optical pickup 3 with reference to the accompanying drawings.

In the optical disk drive 1, to read information from the recording layer 2*a* in the optical disk 2, a light beam emitted from the double-wavelength light source 61 has unnecessary component thereof shielded by the first shielding plate 64 for only the valid component to be incident upon the composite optical element 62, and split by the first diffraction grating 75 in the composite optical element 62 into three light beam including a zero-order light beam and positive and negative first-order light beams, as shown in FIG. 11. Each of the three light beam thus resulted from splitting of the outgoing light passes by the second diffraction grating 76 in the composite optical element 62, and is focused by the double-wavelength objective lens 34 onto the recording layer 2*a* in the optical disk 2.

The return light from the recording layer 2*a* in the optical disk 2 is diffracted by the second diffraction grating 76 of the composite optical element 62 and directed to the light path extending toward the third surface 83. The positive first-order light beam is incident upon the third diffraction grating 77. The positive first-order light beam from the second diffraction grating 76, incident upon the third diffraction grating 77, is reflected and diffracted again by the third diffraction grating 77, and the negative first-order light beam from the third diffraction grating 77 is incident upon the apex of the beam-splitting prism 78. The negative first-order light beam incident upon the apex of the regular-tetragonal pyramid shape of the beam-splitting prism 78 is incident upon each of the surfaces of the regular-tetragonal-pyramidal beam-splitting prism 78. The incident light upon the surfaces is refracted in different directions. Namely, the return light is split into four light beams. The return light has unnecessary part thereof shielded by the second light shielding plate 65, and only the valid part of the return light is incident upon the light-detecting areas $a_2$, $b_2$, $c_2$ and $d_2$ of the main-beam photodetector 91 of the photodetector assembly 63.

Figure 17A:
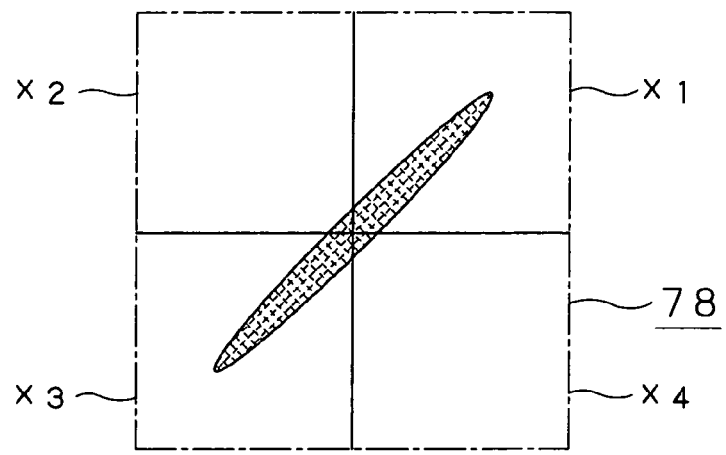
Figure 17B:
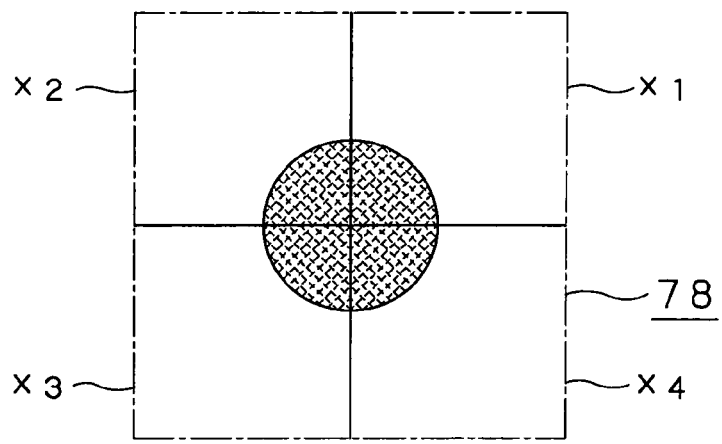

When the double-wavelength objective lens 34 is in the in-focus position in relation to the recording layer 2*a* in the optical disk 2, the return light diffracted by the third diffraction grating 77, incident upon the apex of the beam-splitting prism 78, will have a generally circular form as shown in FIG. 17B.

On the other hand, if the double-wavelength objective lens 34 is excessively close to the recording layer 2*a* in the optical disk 2 when the return light is incident upon the apex of the beam-splitting prism 78, the double-wavelength objective lens 34 will be off the in-focus position as shown in FIG. 17A. Thus, astigmatism will take place because the diffracted light passes by the composite optical element 62. In this case, the incident light upon the apex of the beam-splitting prism 78 will take the form of an ellipse whose major axis extends obliquely to the upper right as shown in FIG. 17A.

Figure 17C:
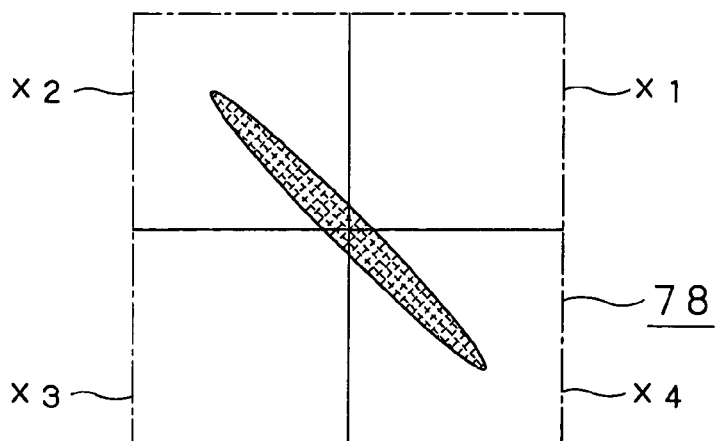

If the double-wavelength objective lens 34 is excessively apart from the recording layer 2*a* in the optical disk 2 when the return light is incident upon the apex of the beam-splitting prism 78, the double-wavelength objective lens 34 will also be off the in-focus position as shown in FIG. 17C. Thus, astigmatism will also take place because the diffracted light passes by the composite optical element 62. In this case, the incident light upon the apex of the beam-splitting prism 78 will have the form of an ellipse whose major axis extends obliquely to the upper left as shown in FIG. 17C.

Therefore, when the diffracted light is incident upon the apex of the beam-splitting prism 78 with the double-wavelength objective lens 34 being off the in-focus position, the majority of the diffracted light is incident upon one of two sets of opposite side faces $x_1$ and $x_3$, and $x_2$ and $x_4$, while an extremely small part of the diffracted light will be incident upon the other set of surfaces.

More specifically, the diffracted light is split so that the majority of the diffracted light having the elliptical shape as shown in FIG. 17A will be incident upon one set of opposite side faces $x_1$ and $x_3$ of the beam-splitting prism 78, while the extremely small part of the diffracted light will be incident upon the other set of opposite side faces $x_2$ and $x_4$. Also, the majority of the diffracted light having the elliptical shape as shown in FIG. 17C will be incident upon the other set of opposite side faces $x_2$ and $x_4$ of the beam-splitting prism 78, while an extremely small part of the diffracted light will be incident upon the one set of opposite side faces $x_1$ and $x_3$.

The return light from the optical disk 2, which is a part of the zero-order light beam from the first diffraction grating 75, is diffracted by the second diffraction grating 76 to be a negative first-order light beam. This negative first-order light beam is incident upon each of the opposite side faces $x_1$, $x_2$, $x_3$ and $x_4$ of the beam-splitting prism 78 and diffracted in different directions. Thus, the return light is split into four return light beams which will be incident upon the light-detecting areas $a_2$, $b_2$, $c_2$ and $d_2$, respectively, of the main-beam photodetector 91 of the photodetector assembly 63.

Figure 18A:
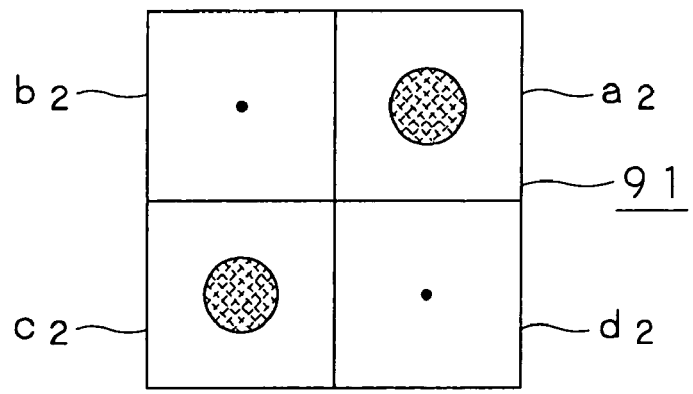
Figure 18B:
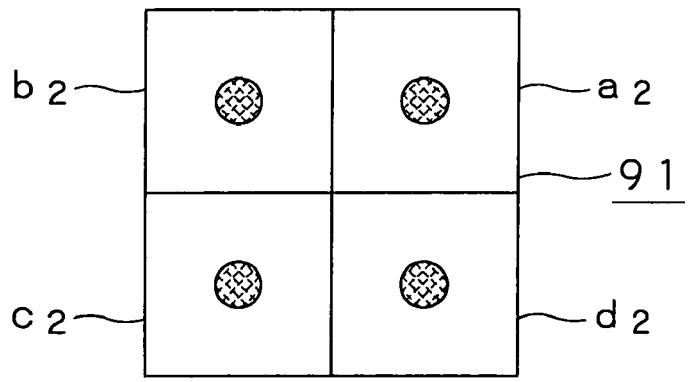
Figure 18C:
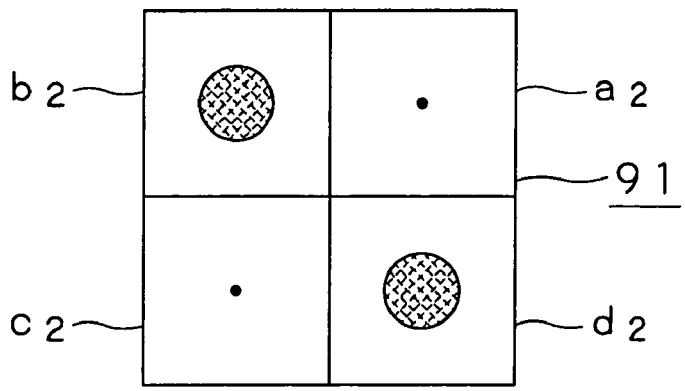

Thus, one of the two sets of opposite light-detecting areas $a_2$ and $c_2$, and $b_2$ and $d_2$, of the main-beam photodetector 91 will detect a larger amount of light, while the other set of opposite light-detecting areas will detect a smaller amount of light, as shown in FIGS. 18A and 18C.

More particularly, when the diffracted light having the elliptic shape as shown in FIG. 17A is incident upon the beam-splitting prism 78, the set of opposite light-detecting areas $a_2$ and $c_2$ of the main-beam photodetector 91 will detect a larger amount of light, while the other set of opposite light-detecting areas $b_2$ and $d_2$ will detect a smaller amount of light, as shown in FIG. 18A. Also, when the diffracted light having the elliptic shape as shown in FIG. 17C is incident upon the beam-splitting prism 78, the set of opposite light-detecting areas $b_2$ and $d_2$ of the main-beam photodetector 91 will detect a larger amount of light, while the other set of opposite light-detecting areas $a_2$ and $c_2$ will detect a smaller amount of light, as shown in FIG. 18C.

When the circular diffracted light as shown in FIG. 17B is incident upon the apex of the beam-splitting prism 78, both the sets of opposite light-detecting areas $a_2$ and $c_2$, and $b_2$ and $d_2$, of the main-beam photodetector 91 will detect an equal amount of light, as shown in FIG. 18B.

Therefore, given that outputs from the light-detecting areas $a_2$, $b_2$, $c_2$ and $d_2$ are $Sa_2$, $Sb_2$, $Sc_2$ and $Sd_2$, respectively, the main-beam photodetector 91 can calculate a focusing error signal FE by the following formula (22):

$$FE=(Sa_2+Sc_2)-(Sb_2+Sd_2) \quad (22)$$

More specifically, when the double-wavelength objective lens 34 is set in the in-focus position in relation to the recording layer 2a in the optical disk 2, the main-beam photodetector 91 calculates the formula (22) to provide a zero focusing error signal FE. When the double-wavelength objective lens 34 is excessively close to the recording layer 2a in the optical disk 2, the main-beam photodetector 91 calculates the formula (22) to provide a positive focusing error signal FE. Also, when the double-wavelength objective lens 34 is excessively apart from the recording layer 2a in the optical disk 2, the main-beam photodetector 91 calculates the formula (22) to provide a negative focusing error signal FE.

The main-beam photodetector 91 in the photodetector assembly 63 calculates a focusing error signal FE from outputs from the light-detecting areas $a_2$, $b_2$, $c_2$ and $d_2$ on each of which the incident light defines a beam spot, and provides a read signal.

Also, the set of side-beam photodetectors 92 and 93 detects an amount of a return part, from the optical disk 2, of the positive and negative first-order light beams resulted from splitting of the outgoing light by the first diffraction grating 75 and incident upon the optical disk 2, and calculates a difference between the positive and negative first-order light beams to provide a tracking error signal TE.

In the optical disk drive 1, the servo circuit 10 controls the lens driving mechanism according to the focusing error signal FE and tracking error signal TE detected by the optical pickup 3 including the aforementioned optical system 30 or 60 to move the double-wavelength objective lens 34 in focusing and tracking directions. Thus, the outgoing light is focused on the recording layer 2a in the optical disk 2 to read information from the optical disk 2.

Since the second diffraction grating 46 in the composite optical element 32 included in the optical system 30 provided in the optical pickup 3 of the optical disk drive 1 according to the present invention diffracts the return light from the optical disk 2 and the third diffraction grating 47 also in the composite optical element 32 further diffracts the return light which is the positive first-order light beam from the second diffraction grating 46, the return light can be directed to an appropriate position even if the light beam selectively emitted from the light-emitting/-detecting element 31 is varied in wavelength due to a variation of the ambient temperature.

Therefore, using the optical pickup simplified in structure with no increased number of parts in comparison with the conventional composite optical element, the optical disk drive 1 can operate with an improved reliability on the focusing error signal FE provided in the optical pickup 3.

Also, since the second diffraction grating 76 in the composite optical element 62 included in the optical system 60 in the optical pickup 3 of the optical disk drive 1 diffracts the return light from the optical disk 2, the third diffraction grating 77 also in the composite optical element 62 further diffracts the return light which is the positive first-order light beam from the second diffraction grating 76 and the beam-splitting prism 78 splits, into four light beam, the return light which is the negative first-order light beam from the third diffraction grating 77, the return light can be directed to an appropriate position even if the light beam selectively emitted from the double-wavelength light source 61 is varied in wavelength due to a variation of the ambient temperature.

Therefore, using the optical pickup simplified in structure with no increased number of parts in comparison with the conventional optical system, the optical disk drive 1 can operate with an improved reliability on the focusing error signal FE provided in the optical pickup 3.

Also, since the composite optical element 32 in the optical system 30 of the optical pickup 3 can separate the outgoing light and return light from each other and correct a light-path deviation caused by a variation in wavelength of the light beam emitted from the light-emitting/-detecting element 31, the optical system 30 can be configured to be simpler and smaller with a minimum necessary number of optical parts and thus the optical disk drive 1 can be produced with a reduced cost.

Therefore, because of the composite optical element 32 provided in the optical system 30 used in the optical pickup 3, the optical disk drive 1 can be produced with a higher productivity, less cost and higher reliability.

Since the composite optical element 62 in the optical system 60 of the optical pickup 3 included in the optical disk drive 1 can separate the outgoing light and return light from each other and correct a light-path deviation caused by a variation in wavelength of the light beam emitted from the double-wavelength light source 61, the optical system 60 can be configured to be simpler and smaller with a minimum necessary number of optical parts and thus can be produced with a reduced cost.

Therefore, because of the composite optical element 62 provided in the optical system 60 used in the optical pickup 3, the optical disk drive 1 can be produced with a higher productivity and reduced cost and have an improved reliability.

In case the optical disk drive 1 uses the optical pickup 3 including the optical system 30, a light source and a photodetector are formed integrally with each other as a single optical unit, namely, the light-emitting/-detecting element 31. Thus, the optical disk drive 1 can be formed from a further reduced number of parts and thus produced with a reduced cost.

In the aforementioned main-beam photodetector, the beam spot is divided by the parting lines. In the optical system 60 of the optical pickup 3 in the optical disk drive 1, however, the beam-splitting prism 78 provided in the composite optical element 62 splits, on the light path, the return light from the optical disk 2. So, by designing the main-beam photodetector 91 for a predetermined size of each of the light-detecting areas $a_2$, $b_2$, $c_2$ and $d_2$ upon which the four return light beams from the beam-splitting prism 78 are incident, respectively, the main-beam photodetector may not have the light-detecting surface thereof divided into the light-detecting areas with a high precision.

Thus, the main-beam photodetector 91 in the optical pickup 3 included in the optical disk drive 1 can be produced with a reduced cost, the position of the main-beam photodetector 91 can easily be adjusted in the process of producing the optical pickup 3, and the focusing error signal FE provided in the optical pickup 3 is more reliable.

Further, the optical system 60 used in the optical pickup 3 of the optical disk drive 1 has the first light shielding plate 64 provided therein. The first light shielding plate 64 can direct only the valid beam of the light beam emitted from the double-wavelength light source 61 to the composite optical element 62 to shield unnecessary incident light upon the composite optical element 62 and reduce irregular reflection of the stray light inside the composite optical element 62. Also in the optical disk drive 1, the second light shielding plate 65 is also provided in the optical system 60 in the optical pickup 3 to direct only the valid beam of the return light passing by the composite optical element 62 to the photodetector assembly 63. The second light shielding plate 65 can shield unnecessary incident light upon the photodetector assembly 63 and thus improve the reliability on the light-detection level of the photodetector assembly 63.

Note that the optical system 60 in the optical pickup 3 of the optical disk drive 1 is not limited to the aforementioned example including the first and second light shielding plates 64 and 65 but the composite optical element 62 may have a light-absorbing paint applied on the surface thereof or a light-opaque film formed, by evaporation, on the surface thereof or have the surface thereof roughed, for example, to shield unnecessary light.

In the optical disk drive 1, the so-called astigmatism is adopted in the aforementioned optical pickup 3 to provide a focusing error signal FE but any other light-detecting method such as the Foucault process or the like may be adopted for this purpose.

In the optical disk drive 1, if it is difficult to form a single element such as the aforementioned composite optical element 32 or 63 in the optical system 30 or 60, an optical system in which the optical elements are disposed separately as above may of course be formed to assure the same function as that of such a composite optical element.

On this account, there will be described below configuration examples of the optical pickup 3, not formed from a single element such as the composite optical element 32 or 62 but in which the optical elements are disposed as above. It should be noted that the aforementioned optical pickup 3 including the composite optical element 32 or 62 has the optical system configured to correct a light-path deviation but the optical pickup 3. If the light-emitting points 61a and 61b of the double-wavelength light source 61, from which laser beams different in wavelength from each other are emitted, respectively, are apart from each other, the deviation between the light paths of the laser beams will be larger. On this account, there will be described below examples of the optical pickup including an optical system in which a light-path deviation between the laser beams different in wavelength from each other, caused by the displacement between the light-emitting points of the double-wavelength light source.

Figure 19:
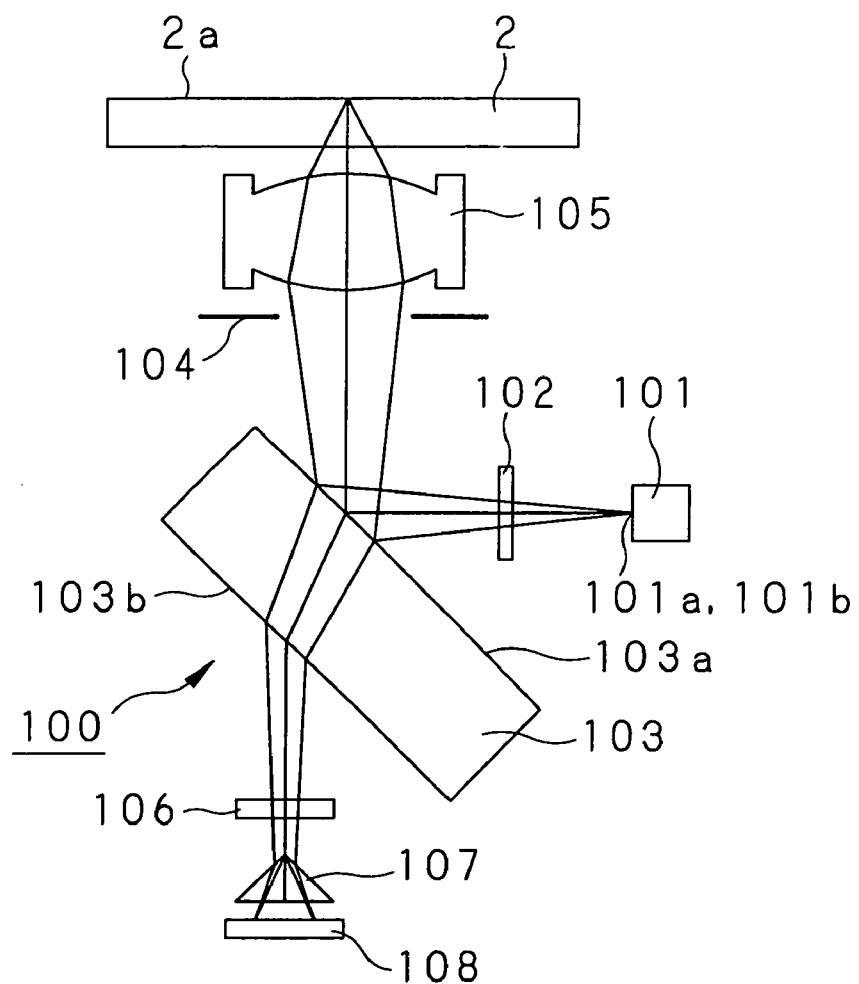
FIG. 19 is a schematic side elevation of another variant of the optical system of the optical pickup according to the present invention.

In a first example, the optical pickup 3 includes an optical system 100 that reads information from the optical disk 2, and a lens driving mechanism (not shown) that moves an objective lens included in the optical system 100 and which will be described in detail later, as shown in FIG. 19 for example. The optical pickup 3 including the optical system 100 will be described below, but the same or similar elements of the optical pickup 3 including the optical system 100 as or to those of the optical pickup 3 including the optical system 30 or 60 will be indicated with the same or similar references as or to those of the elements in the latter optical pickup 3 and will not be described in detail any more.

As shown in FIG. 19, the optical system 100 of the optical pickup 3 includes, in the order following the light beam part, a double-wavelength light source 101 that selectively emits a plurality of light beams different in wavelength from each other toward the optical disk 2, a diffraction grating 102 that splits the light beam selectively emitted from the double-wavelength light source 101 into three beams, a beam splitter 103 that reflects the outgoing three beams from the diffraction grating 102, while allowing the return light from the optical disk 2 to pass through, a limiting aperture 104 that limits the outgoing light reflected by the beam splitter 103 to a predetermined numerical aperture NA, a double-wavelength objective lens 105 that focuses the outgoing light limited by the limiting aperture 104 onto the recording layer 2a of the optical disk 2, a light-path synthesis diffraction grating 106 that corrects a light-path variation, caused by a displacement between the light-emitting points, of the return light reflected from the optical disk 2 and passing by the beam splitter 103, a beam-splitting prism 107 that splits, into four beams, the return light having the light-path deviation thereof corrected by the light-path synthesis diffraction grating 106, and a photodetector assembly 108 that detects the return light split by the beam-splitting prism 107.

Figure 20:
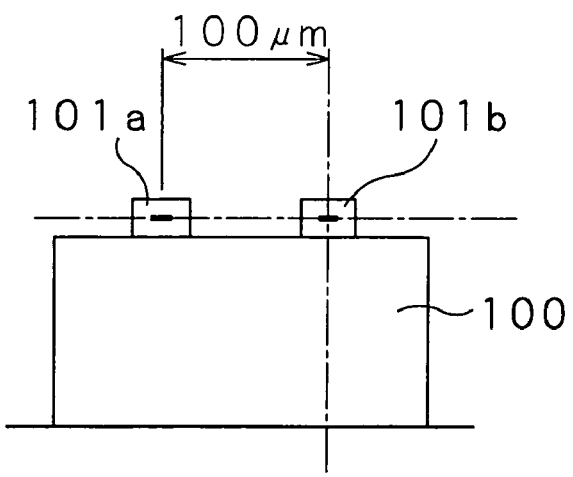
FIG. 20 is a perspective view of a double-wavelength light source provided in the variant of the optical system of the optical pickup in FIG. 19, showing light-emitting points of the double-wavelength light source.

As shown in FIG. 20, the double-wavelength light source 101 is a semiconductor laser that selectively emits a laser beam having a wavelength of about 780 nm for example or a laser beam having a wavelength of about 650 nm for example from a light-emitting point 101a or 111b, respectively. Either of the light-emitting points 101a and 101b is selected for emission of a light beam having a desired wavelength according to a control signal from the drive controller 11 adaptively to the format of the optical disk 2 used. The double-wavelength light source 101 is disposed in such a manner that the light-emitting point 101b from which a light beam having the shorter wavelength is emitted will be on the optical-axial center.

The diffraction grating 102 is to diffract the light beam selectively emitted from the double-wavelength light source 101 into three beams including a zero-order light beam and positive and negative first-order light beams. It diverges the outgoing light in the direction of the recording track on the optical disk 2. The optical system 100 adopts the so-called DPP (differential push-pull) method to provide a tracking error signal TE, and it provides a tracking servo control by detecting, by the photodetector assembly 108, the positive and negative first-order light beams from the diffraction grating 102.

The beam splitter 103 is a flat transparent plate having first and second surfaces 103a and 103b parallel to each other. The first and second surfaces 103a and 103b are disposed each at a predetermined angle in relation to the light beam emitted from the double-wavelength light source 101. The beam splitter 103 reflects the light beam selectively emitted from the double-wavelength light source 101 at the first surface 103a toward the optical disk 2, while allowing the return light from the optical disk 2 to pass through the first and second surfaces 103*a* and 103*b* and travel toward the beam-splitting prism 107.

The beam splitter 103 imparts a predetermined extent of astigmatism to the return light coming from the optical disk 2, passing by the beam splitter 103 and incident upon the beam-splitting prism 107. The beam splitter 103 can easily adjust the defocusing of the light beam in relation to the optical disk 2 by adjusting the optical-axial position of the light beam selectively emitted from the double-wavelength light source 101.

On the first surface 103*a* of the beam splitter 103, there is provided a half mirror that reflects the light beam selectively emitted from the double-wavelength light source 101 while allowing the return light from the optical disk 2 to pass through.

The limiting aperture 104 is disposed on the optical axis of the outgoing light reflected at the first surface 103*a* of the beam splitter 103 to limit the outgoing light to a predetermined numerical aperture.

The double-wavelength objective lens 105 is a condenser lens adapted for the plurality of light beams different in wavelength from each other, emitted from the double-wavelength light source 101. It is formed from at least one convex lens, and disposed to focus, on the optical disk 2, the light beam emitted from the double-wavelength light source 101 and limited by the limiting aperture 104.

The light-path synthesis diffraction grating 106 is a diffraction element to correct a light-path deviation caused by a displacement between the light-emitting points of the double-wavelength light source 101. It should be noted here that when the optical disk 2 is of a format for a CD, the a light beam of about 780 nm in wavelength is emitted from the light-emitting point 101*a* of the double-wavelength light source 101. Since the light-emitting point 101*a* is off the optical-axial center, however, the return light from the optical disk 2 will not be focused on a predetermined position. Namely, the return light from the optical disk 2 will not appropriately be incident upon the apex of the beam-splitting prism 107. The light-path synthesis diffraction grating 106 synthesizes a light path by correcting the deviation between the light path of the a light beam having the wavelength of about 780 nm and that of the a light beam having the wavelength of about 650 nm. The theory of the light-path deviation correction in the light-path synthesis diffraction grating 106 is similar to that of the aforementioned correction of a light-path deviation caused by a wavelength variation, and so will not be explained.

The light-path synthesis diffraction grating 106 may be a hologram element formed having a predetermined hologram pattern formed on a generally flat light-transparent material by etching or similar process. Also, the hologram element should preferably be a surface-relieved one or a brazed hologram, to improve the efficiency of diffraction.

Figure 21:
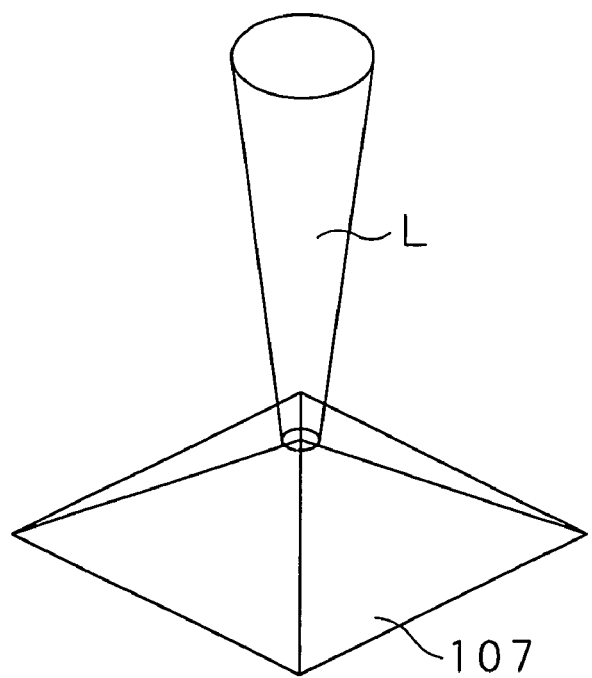
FIG. 21 is a perspective view of a beam-splitting prism provided in the variant of the optical system of the optical pickup in FIG. 19.
Figure 22:
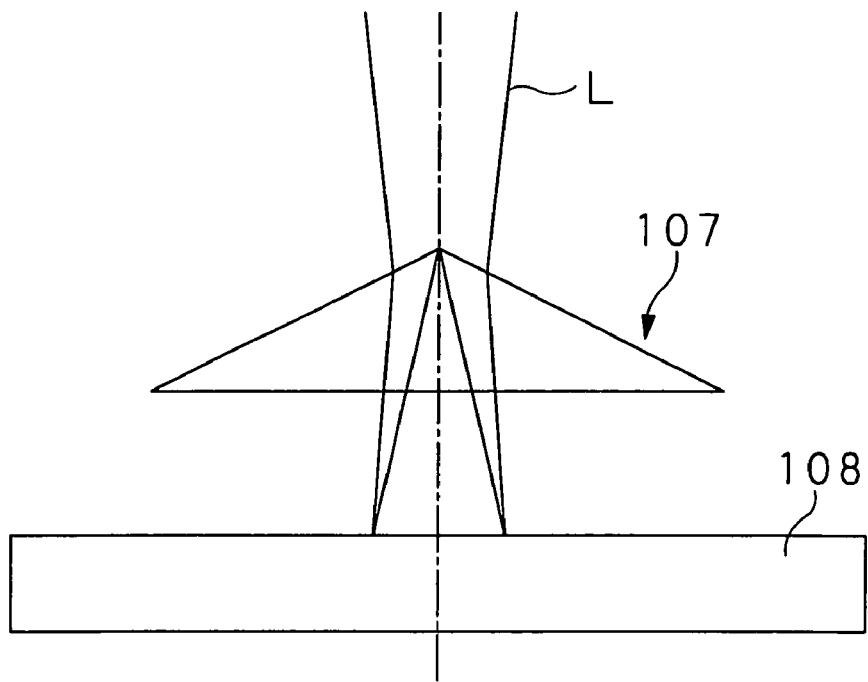
FIG. 22 explains the beam-splitting prism provided in the variant of the optical system of the optical pickup in FIG. 19.

As shown in FIGS. 21 and 22, the beam-splitting prism 107 is shaped to have the form of a generally regular-tetragonal pyramid and disposed for the center of the return light having passed by the beam splitter 103 to fall, at or close to the focus of the return light, on that of the apex of the tetragonal pyramid. The beam-splitting prism 107 is positioned on the light path of the return light having passed by the beam splitter 103 to split the return light into four beams.

The beam-splitting prism 107 is disposed for the zero-order one of the three beams from the diffraction grating 102 to be incident upon the apex of the prism 107. It should be noted that the beam-splitting prism 107 has the regular-tetragonal pyramid bottom thereof disposed perpendicular to the optical axis of the zero-order one of the three beams from the diffraction grating 102.

The beam-splitting prism 107 is formed from a resin material by injection molding. It should be noted that the material of the beam-splitting prism 107 is not limited to the resin material but may be a transparent optical material such as nitric material. Further, the beam-splitting prism 107 may be formed from a combination of these optical materials so that one part thereof may be different in material from the other part.

Figure 23:
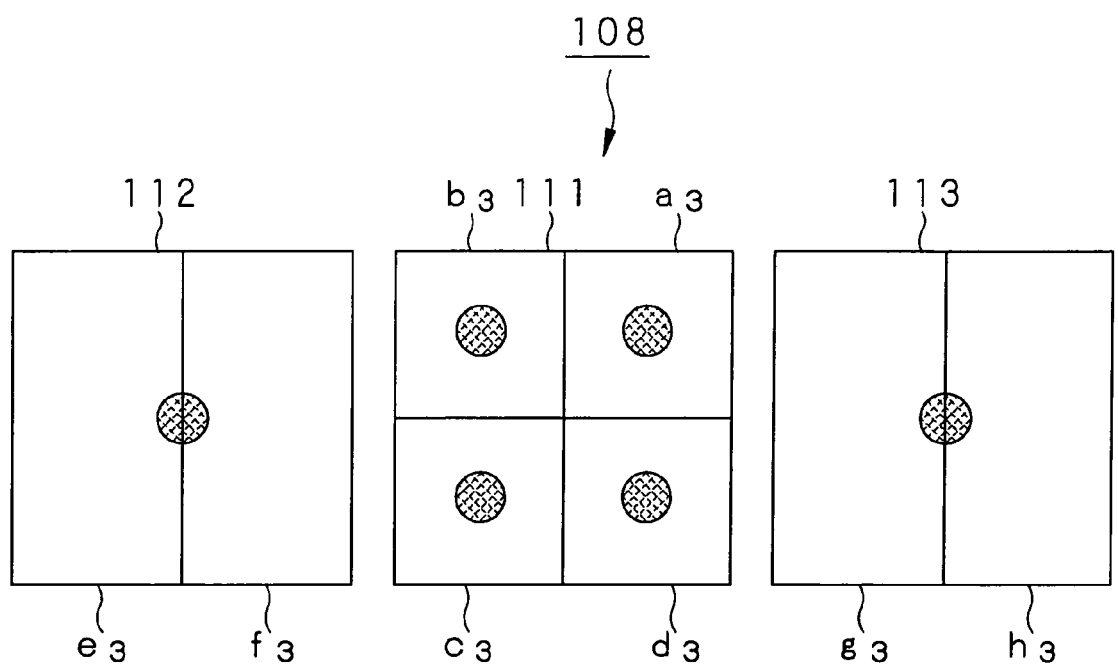
FIGS. 23 explains a main-beam photodetector and side-beam photodetectors in the photodetector assembly provided in the variant of the optical system of the optical pickup shown in FIG. 19.

As shown in FIG. 23, the photodetector assembly 108 includes a generally square main-beam photodetector 111 that detects a main beam which is the zero-order light beam from the diffraction grating 102, and a pair of generally square side-beam photodetectors 112 and 113 each formed from a pair of generally rectangular areas and that detect two side beams, respectively, which are positive and negative first-order light beams from the diffraction grating 102. The photodetector assembly 108 is disposed correspondingly to the return light split by the beam-splitting prism 107. That is, in the photodetector assembly 108, the generally square main-beam photodetector 111 is disposed in the center, and the pair of generally square side-beam photodetectors 112 and 113 is disposed across the main-beam photodetector 111.

The main-beam photodetector 111 in the photodetector assembly 108 is quadrisected into light-detecting areas $a_3$, $b_3$, $c_3$ and $d_3$ by a pair of parting lines perpendicular to each other. The return light beams resulted from quadrisection of the return light by the beam-splitting prism 107 are incident upon the light-detecting areas $a_3$, $b_3$, $c_3$ and $d_3$, respectively.

The side-beam photodetectors 112 and 113 of the photodetector assembly 108 are bisected by a set of parting lines into light-detecting areas $e_3$ and $f_3$, and $g_3$ and $h_3$, respectively. One of the return light beams from the optical disk 2, corresponding to the positive and negative first-order light beams from the diffraction grating 102, is incident upon the light-detecting areas $e_3$ and $f_3$, while the other return light beam from the optical disk 2, corresponding to the positive and negative first-order light beams from the diffraction grating 102, is incident upon the light-detecting areas $g_3$ and $h_3$.

The lens driving mechanism in the optical pickup 3 includes a lens holder to hold the double-wavelength objective lens 105, a holding support member to support the lens holder to be movable biaxially, namely, in a focusing direction parallel to the optical axis of the double-wavelength objective lens 105 and a tracking direction perpendicular to the optical axis of the double-wavelength objective lens 105, and an electromagnetic drive unit to move the lens holder biaxially under the action of an electromagnetic force (these components are not illustrated).

The above lens driving mechanism moves the double-wavelength objective lens 105 in a focusing direction according to a focusing error signal detected by the main-beam photodetector 111 in the photodetector assembly 108 and a tracking direction according to a tracking error signal detected by the side-beam photodetectors 112 and 113, to thereby focus the outgoing light on a recording track on the recording layer 2*a* in the optical disk 2.

In the optical disk drive 1 provided with the optical pickup 3 including the aforementioned optical system 100, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 105 in the focusing and tracking directions, and thus the outgoing light is focused by the double-wavelength objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along their respective light paths in the aforementioned optical system 100 of the optical pickup 3 as will be described below.

When the optical disk drive 1 reads information from the recording layer 2a of the optical disk 2, the light beam selectively emitted from the double-wavelength light source 101 and which has a wavelength matching the format of the optical disk 2 is split by the diffraction grating 102 into three beams including a zero-order light beam and positive and negative first-order light beams as shown in FIG. 22. These three beams are reflected at the first surface 103a of the beam splitter 103, limited by the limiting aperture 104 to a predetermined numerical aperture NA, and focused by the double-wavelength objective lens 105 onto the recording layer 2a of the optical disk 2.

The return light from the recording layer 2a of the optical disk 2 is refracted at the first surface 103a of the beam splitter 103, passes by the beam splitter 103, is refracted at the second surface 103b, and travels along a light path synthesized as a result of correction, by the light-path synthesis diffraction grating 106, of a light-path deviation caused by a displacement between the light-emitting points of the light source 101, and the return light corresponding to the zero-order light beam from the diffraction grating 102 is incident upon the apex of the beam-splitting prism 107. The return light incident upon the apex of the beam-splitting prism 107 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 108. Also, one of the return light beams from the optical disk 2, corresponding to the positive and negative first-order light beams coming from the diffraction grating 102 and passing by the beam splitter 103, is incident upon the light-detecting areas $e_3$ and $f_3$ of the side-beam photodetector 112 of the photodetector assembly 108, while the other return light beam is incident upon the light-detecting areas $g_3$ and $h_3$ of the side-beam photodetector 113 of the photodetector assembly 108.

Figure 24A:
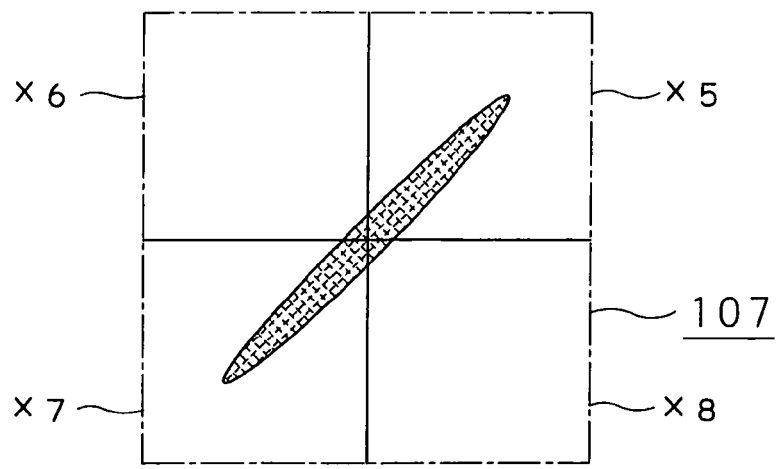
Figure 24B:
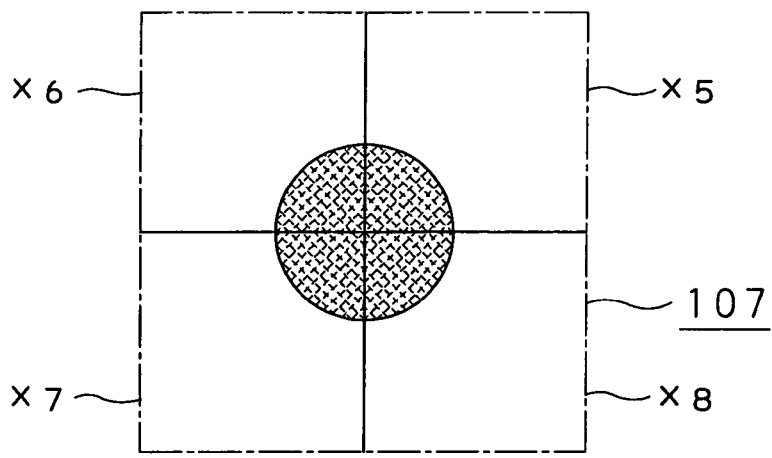

Note here that if the double-wavelength objective lens 105 is positioned in the just-in-focus position in relation to the recording layer 2a of the optical disk 2 as shown in FIG. 24B when the return light having passed by the beam splitter 103 is incident upon the apex of the beam-splitting prism 107, the incident return light will take a generally circular shape.

On the other hand, if the double-wavelength objective lens 105 is excessively close to the recording layer 2a in the optical disk 2 when the return light is incident upon the apex of the beam-splitting prism 107, the double-wavelength objective lens 105 will be off the in-focus position as shown in FIG. 24A. Thus, astigmatism will take place because the return light passes by the beam splitter 103. In this case, the incident light upon the apex of the beam-splitting prism 107 will take the form of an ellipse whose major axis extends obliquely to the upper right as shown in FIG. 24A.

Figure 24C:
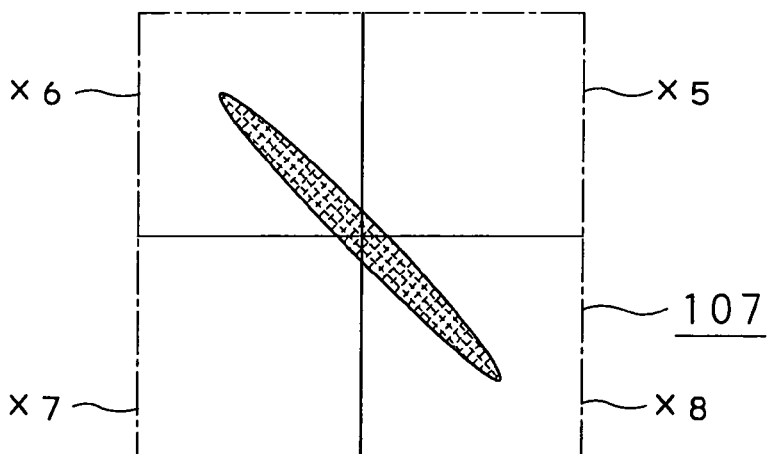

If the double-wavelength objective lens 105 is excessively apart from the recording layer 2a in the optical disk 2 when the return light is incident upon the apex of the beam-splitting prism 107, the double-wavelength objective lens 105 will also be off the in-focus position as shown in FIG. 24C. Thus, astigmatism will take place because the return light passes by the beam splitter 103. In this case, the incident light upon the apex of the beam-splitting prism 107 will also take the form of an ellipse whose major axis extends obliquely to the upper left as shown in FIG. 24C.

Therefore, when the return light is incident upon the apex of the beam-splitting prism 107 with the double-wavelength objective lens 105 being off the in-focus position, the majority of the return light is incident upon one of two sets of opposite side faces $x_5$ and $x_7$, and $x_6$ and $x_8$ of the beam-splitting prism 107, while an extremely small part of the return light will be incident upon the other set of surfaces.

More specifically, the majority of the return light having the elliptical shape as shown in FIG. 24A will be incident upon one set of opposite side faces $x_5$ and $x_7$ of the beam-splitting prism 107, while the extremely small part of the return light will be incident upon the other set of opposite side faces $x_6$ and $x_8$. Also, the majority of the return light having the elliptical shape as shown in FIG. 24C will be incident upon the other set of opposite side faces $x_6$ and $x_8$ of the beam-splitting prism 107, while the extremely small part of the return light will be incident upon the one set of opposite side faces $x_5$ and $x_7$.

The return light from the optical disk 2, which is a part of the zero-order light beam split by the diffraction grating 102, is diffracted by the beam-splitting prism 107 to be a negative first-order light beam. This negative first-order light beam is incident upon each of the opposite side faces $x_5$ and $x_6$, and $x_7$ and $x_8$ and refracted in different directions. Thus, the return light is split into four return light beams which will be incident upon the light-detecting areas $a_3$, $b_3$, $c_3$ and $d_3$, respectively, of the main-beam photodetector 111 of the photodetector assembly 108.

Figure 25A:
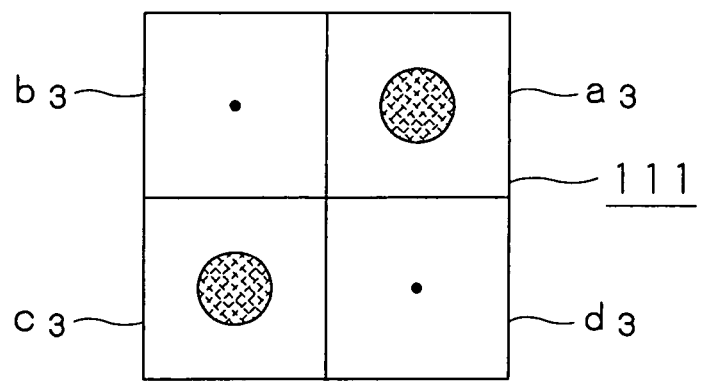
Figure 25B:
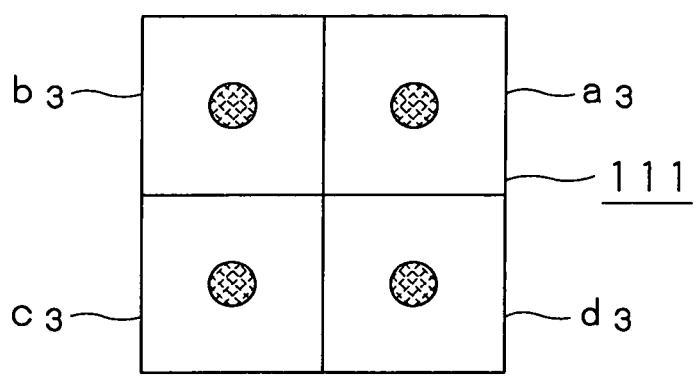
Figure 25C:
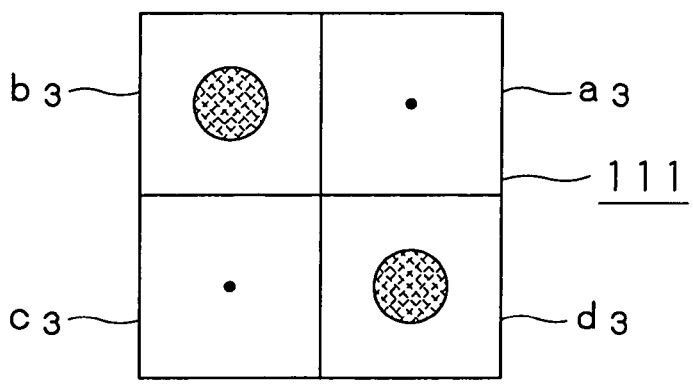

Thus, one of the two sets of opposite light-detecting areas $a_3$ and $c_3$, and $b_3$ and $d_3$, of the main-beam photodetector 111 detects a larger amount of light, while the other set will detect a smaller amount of light, as shown in FIGS. 25A and 25C.

More particularly, when the return light having the elliptic shape as shown in FIG. 24A is incident upon the beam-splitting prism 107, the set of opposite light-detecting areas $a_3$ and $c_3$ of the main-beam photodetector 111 will detect a larger amount of light, while the other set of opposite light-detecting areas $b_3$ and $d_3$ will detect a smaller amount of light, as shown in FIG. 25A. Also, when the return light having the elliptic shape as shown in FIG. 24C is incident upon the beam-splitting prism 107, the set of opposite light-detecting areas $b_3$ and $d_3$ of the main-beam photodetector 111 will detect a larger amount of light, while the other set of opposite light-detecting areas $a_3$ and $c_3$ will detect a smaller amount of light, as shown in FIG. 25C.

When the circular return light as shown in FIG. 24B is incident upon the apex of the beam-splitting prism 107, both the sets of opposite light-detecting areas $a_3$ and $c_3$, and $b_3$ and $d_3$, of the main-beam photodetector 111 will detect an equal amount of light, as shown in FIG. 25B.

Therefore, given that outputs from the light-detecting areas $a_3$, $b_3$, $c_3$ and $d_3$ of the main-beam photodetector 111 are $Sa_3$, $Sb_3$, $Sc_3$ and $Sd_3$, respectively, a focusing error signal FE can be calculated as given by the following formula (23):

$$FE=(Sa_3+Sc_3)-(Sb_3+Sd_3) \quad (23)$$

More specifically, when the double-wavelength objective lens 105 is set in the in-focus position in relation to the recording layer 2a in the optical disk 2, the main-beam photodetector 111 calculates the formula (23) to provide a zero focusing error signal FE. When the double-wavelength objective lens 105 is excessively close to the recording layer 2a in the optical disk 2, the main-beam photodetector 111 calculates the formula (23) to provide a positive focusing error signal FE. Also, when the double-wavelength objective lens 105 is excessively apart from the recording layer 2a in the optical disk 2, the main-beam photodetector 111 calculates the formula (23) to provide a negative focusing error signal FE.

The main-beam photodetector 111 in the photodetector assembly 108 calculates a focusing error signal FE on the basis of outputs from the light-detecting areas $a_3$, $b_3$, $c_3$ and $d_3$ on each of which the incident light defines a beam spot, and provides a read signal.

The positive and negative first-order light beams, resulted from splitting by the diffraction grating 102, of the return light from the optical disk 2, are incident upon the light-detecting areas $e_3$ and $f_3$, and $g_3$ and $h_3$, respectively, of the pair of side-beam photodetectors 112 and 113.

Therefore, given that outputs from the light-detecting areas $e_3$ and $f_3$, and $g_3$ and $h_3$ of the pair of side-beam photodetectors 112 and 113 are $Se_3$ and $Sf_3$, and $Sg_3$ and $Sh_3$, respectively, a tracking error signal TE can be calculated as given by the following formula (24):

$$TE=(Sa_3+Sc_3)-(Sb_3+Sd_3)-\alpha((Se_3-Sf_3)+((Sg_3-Sh_3)) \quad (24)$$

In the optical pickup 3 including the optical system 100 configured as above, the light-path synthesis diffraction grating 106 can correct a light-path deviation caused by a displacement between the light-emitting points, caused by a difference in wavelength between light beams selectively emitted by the double-wavelength light source 101, and the return light can be directed to the apex of the beam-splitting prism 107 and thus split into four beams. So, the return light can appropriately be directed to each of the light-detecting areas of the photodetector assembly 108.

Figure 26:
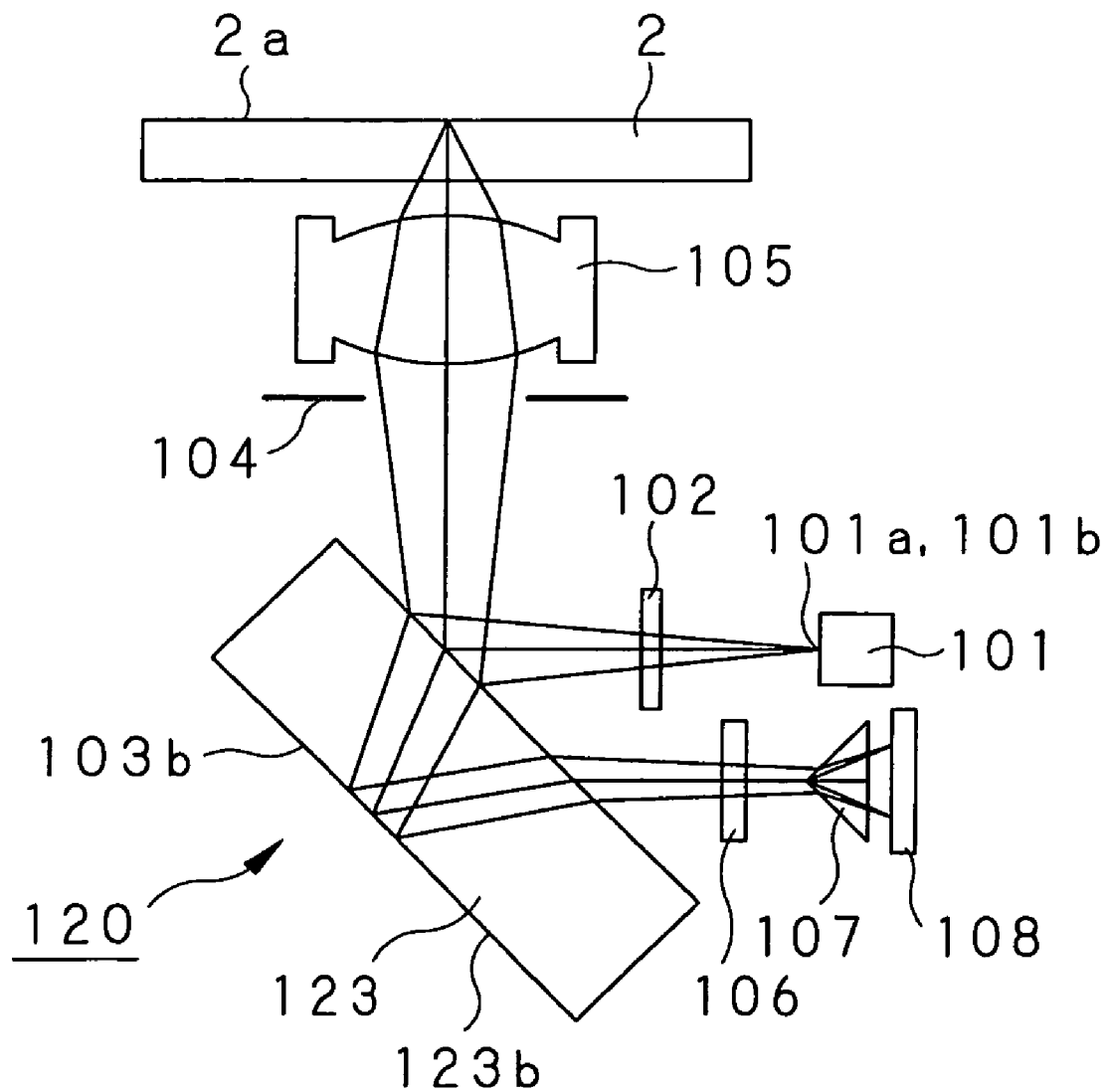
FIG. 26 is a schematic side elevation of a still another variant of the optical system in the optical pickup provided in the optical disk drive according to the present invention.

In a second example, the optical pickup 3 includes an optical system 120 that reproduces information for the optical disk 2, and a lens driving mechanism (not shown) that moves an objective lens included in the optical system 120 and which will be described in detail later, as shown in FIG. 26 for example. The optical pickup 3 including the optical system 120 will be described below, but it should be noted that the same or similar elements of this optical pickup 3 as or to those of the optical pickup 3 using the optical system 100 will be indicated with the same or similar references as or to those of the elements in the latter optical pickup 3 and will not be described in detail any more.

The optical system 120 of the optical pickup 3 includes, in the order following the light beam part, a double-wavelength light source 101 that emits a light beam toward the optical disk 2, a diffraction grating 102 that splits the light beam emitted from the double-wavelength light source 101 into three beams, a beam splitter 123 that makes the outgoing three beams from the diffraction grating 102 and the return light from the optical disk 2 travel along different light paths, respectively, a limiting aperture 104 that limits the outgoing light split by the beam splitter 123 to a predetermined numerical aperture NA, a double-wavelength objective lens 105 that focuses the outgoing light limited by the limiting aperture 104 onto the recording layer 2a of the optical disk 2, a light-path synthesis diffraction grating 106 that corrects a light-path deviation, due to a displacement between the light-emitting points, of the return light from the optical disk 2, having passed by the beam splitter 123, a beam-splitting prism 107 that splits, into four beams, the return light having the light-path deviation thereof corrected by the light-path synthesis diffraction grating 106, and a photodetector assembly 108 that detects the return light split by the beam-splitting prism 107.

The beam splitter 123 is a flat transparent plate having first and second surfaces 123a and 123b parallel to each other. The first and second surfaces 123a and 123b are disposed each at a predetermined angle in relation to the light beam emitted from the double-wavelength light source 101. The light beam selectively emitted from the double-wavelength light source 101 is reflected at the first surface 123a toward the optical disk 2, and the return light from the optical disk 2 is allowed to pass through the first surface 123a, is reflected at the second surface 123b toward the beam-splitting prism 107.

In the beam splitter 123, the first surface 123a has an incident area formed from a half mirror. The second surface 123b is a reflecting film formed by evaporation or a similar process to provide a total reflection of the return light.

The beam splitter 123 imparts a predetermined extent of astigmatism to the return light coming from the optical disk 2 for incidence upon the beam-splitting prism 107. The beam splitter 123 can easily adjust the defocusing of the light in relation to the optical disk 2 by adjusting the optical-axial position of the light beam selectively emitted from the double-wavelength light source 101.

As shown in FIGS. 21 and 22, the beam-splitting prism 107 is shaped to have the form of a generally regular-tetragonal pyramid and disposed for the center of the return light having passed by the beam splitter 123 to fall, at or close to the focus of the return light, on that of the apex of the tetragonal pyramid. The beam-splitting prism 107 is positioned on the light path of the return light having passed by the beam splitter 123 to split the return light into four beams.

In the optical disk drive 1 provided with the optical pickup 3 including the aforementioned optical system 120, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 105 in the focusing and tracking directions, and thus the outgoing light is focused by the double-wavelength objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along the light paths in the aforementioned optical system 120 of the optical pickup 3 as will be described below.

When the optical disk drive 1 reads information from the recording layer 2a of the optical disk 2, the light beam selectively emitted from the double-wavelength light source 101 and which has a wavelength matching the format of the optical disk 2 is split by the diffraction grating 102 into three beams including a zero-order light beam and positive and negative first-order light beams as shown in FIG. 26. These three beams are reflected at the first surface 123a of the beam splitter 123, limited by the limiting aperture 104 to a predetermined numerical aperture, and focused by the double-wavelength objective lens 105 onto the recording layer 2a of the optical disk 2.

The return light from the recording layer 2a of the optical disk 2 passes by the first surface 123a of the beam splitter 123, is reflected at the second surface 123b, passes by the first surface 123a, and travels along a light path synthesized as a result of correction, by the light-path synthesis diffraction grating 106, of a light-path deviation caused by a displacement between the light-emitting points of the light source 101, and the return light corresponding to the zero-order light beam from the diffraction grating 102 is incident upon the apex of the beam-splitting prism 107. The return light incident upon the apex of the beam-splitting prism 107 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 108. Also, one of the return light beams from the optical disk 2, corresponding to the positive and negative first-order light beams coming from the diffraction grating 102 and passing by the beam splitter 123, is incident upon the light-detecting areas $e_3$ and $f_3$ of the side-beam photodetector 112 of the photodetector assembly 108, while the other return light beam is incident upon the light-detecting areas $g_3$ and $h_3$ of the side-beam photodetector 113 of the photodetector assembly 108.

In the optical pickup 3 including the optical system 120 configured as above, the light-path synthesis diffraction grating 106 can correct a light-path deviation caused by a displacement between the light-emitting points, caused by a difference in wavelength between light beams selectively emitted by the double-wavelength light source 101, and the return light can be directed to the apex of the beam-splitting prism 107 and thus split into four beams. So, the return light can appropriately be directed to each of the light-detecting areas of the photodetector assembly 108.

Figure 27:
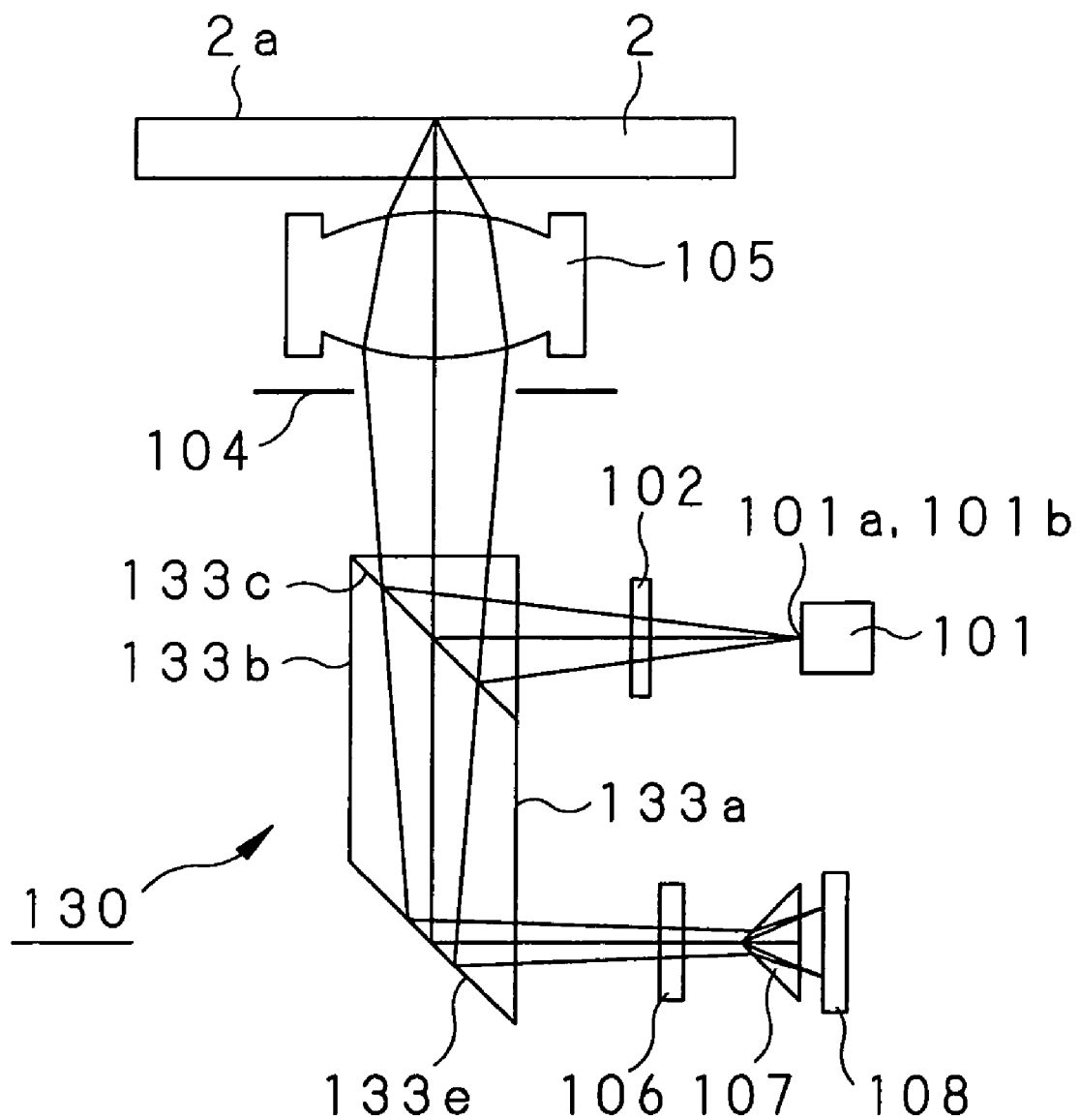
FIG. 27 is a schematic side elevation of a yet another variant of the optical system of the optical pickup in the optical disk drive according to the present invention.

In a third example, the optical pickup 3 includes an optical system 130 that reproduces information for the optical disk 2, and a lens driving mechanism (not shown) that moves an objective lens included in the optical system 130 and which will be described in detail later, as shown in FIG. 27 for example. The optical pickup 3 including the optical system 130 will be described below, but the same or similar elements of this optical pickup 3 as or to those of the optical pickup 3 using the optical system 130 will be indicated with the same or similar references as or to those of the elements in the latter optical pickup 3 and will not be described in detail.

The optical system 130 of the optical pickup 3 includes, in the order following the light beam part, a double-wavelength light source 101 that emits a light beam toward the optical disk 2, a diffraction grating 102 that splits the light beam selectively emitted from the double-wavelength light source 101 into three beams, a beam splitter 133 that makes the outgoing three beams from the diffraction grating 102 and the return light from the optical disk 2 travel along different light paths, respectively, a limiting aperture 104 that limits the outgoing light split by the beam splitter 133 to a predetermined numerical aperture NA, a double-wavelength objective lens 105 that focuses the outgoing light limited by the limiting aperture 104 onto the recording layer 2a of the optical disk 2, a light-path synthesis diffraction grating 106 that corrects a light-path deviation, due to a displacement between the light-emitting points, of the return light from the optical disk 2, having passed by the beam splitter 133, a beam-splitting prism 107 that splits, into four beams, the return light having the light-path deviation thereof corrected by the light-path synthesis diffraction grating 106, and a photodetector assembly 108 that detects the return light split by the beam-splitting prism 107.

The beam splitter 133 is a transparent member having a first surface 133a, second surface 133b parallel to the first surface 133a, third surface 133c positioned between the first and second surfaces 133a and 133b and inclined a predetermined angle in relation to the optical axis of the outgoing light, fourth surface 133d perpendicular to the first and second surfaces 133a and 133b, and a fifth surface 133e generally parallel to the third surface 133c. In the beam splitter 133, the first and second surfaces 133a and 133b are disposed generally perpendicularly to the light beam emitted from the double-wavelength light source 101, the light beam selectively emitted from the double-wavelength light source 101 passes by the first surface 133a, is reflected at the third surface 133c and passes by the fourth surface 133d toward the optical disk 2. The return light from the optical disk 2 passes by the fourth and third surfaces 133d and 133c, is reflected at the fifth surface 133e and passes by the first surface 133a toward the light-path synthesis diffraction grating 106.

In the beam splitter 133, the third surface 133c is a half mirror. The fifth surface 133e is a total-reflection surface formed by evaporation or a similar process to provide a total reflection of the return light.

The beam splitter 133 imparts a predetermined extent of astigmatism to the return light incident upon the light-path synthesis diffraction grating 106 when the return light from the optical disk 2 passes by the beam splitter 133. The beam splitter 133 can easily adjust the defocusing of the light beam in relation to the optical disk 2 by adjusting the optical-axial position of the light beam selectively emitted from the double-wavelength light source 101.

As shown in FIGS. 21 and 22, the beam-splitting prism 107 is shaped to have the form of a generally regular-tetragonal pyramid and disposed for the center of the return light having passed by the beam splitter 133 to fall, at or close to the focus of the return light, on that of the apex of the tetragonal pyramid. The beam-splitting prism 107 is positioned on the light path of the return light having passed by the beam splitter 133 to split the return light into four beams.

In the optical disk drive 1 provided with the optical pickup 3 including the aforementioned optical system 130, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 105 in the focusing and tracking directions, and thus the outgoing light is focused by the double-wavelength objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along the light paths in the aforementioned optical system 130 of the optical pickup 3 as will be described below.

When the optical disk drive 1 reads information from the recording layer 2a of the optical disk 2, the light beam selectively emitted from the double-wavelength light source 101 and whose wavelength matches the format of the optical disk 2 is split by the diffraction grating 102 into three beams including a zero-order light beam and positive and negative first-order light beams as shown in FIG. 27. These three beams pass through the beam splitter 133 at the first surface 113a, are reflected at the third surface 133c, pass through the beam splitter 133 at the fourth surface 133d, are limited by the limiting aperture 104 to a predetermined numerical aperture, and focused by the double-wavelength objective lens 105 onto the recording layer 2a of the optical disk 2.

The return light from the recording layer 2a of the optical disk 2 passes by the fourth and third surfaces 133d and 133c of the beam splitter 133, is reflected at the fifth surface 133e, passes by an outgoing area different from the incident area of the first surface 133a, and travels along a light path synthesized as a result of correction, by the light-path synthesis diffraction grating 106, of a light-path deviation caused by a displacement between the light-emitting points of the light source 101, and the return light corresponding to the zero-order light beam from the diffraction grating 102 is incident upon the apex of the beam-splitting prism 107. The return light incident upon the apex of the beam-splitting prism 107 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 108. Also, one of the return light beams from the optical disk 2, corresponding to the positive and negative first-order light beams coming from the diffraction grating 102 and passing by the beam splitter 133, is incident upon the light-detecting areas $e_3$ and $f_3$ of the side-beam photodetector 112 of the photodetector assembly 108, while the other return light beam is incident upon the light-detecting areas $g_3$ and $h_3$ of the side-beam photodetector 113 of the photodetector assembly 108.

In the optical pickup 3 including the optical system 130 configured as above, the light-path synthesis diffraction grating 106 can correct a light-path deviation caused by a displacement between the light-emitting points, caused by a difference in wavelength between light beams selectively emitted by the double-wavelength light source 101, and the return light can be directed to the apex of the beam-splitting prism 107 and thus split into four beams. So, the return light can appropriately be directed to each of the light-detecting areas of the photodetector assembly 108.

Figure 28:
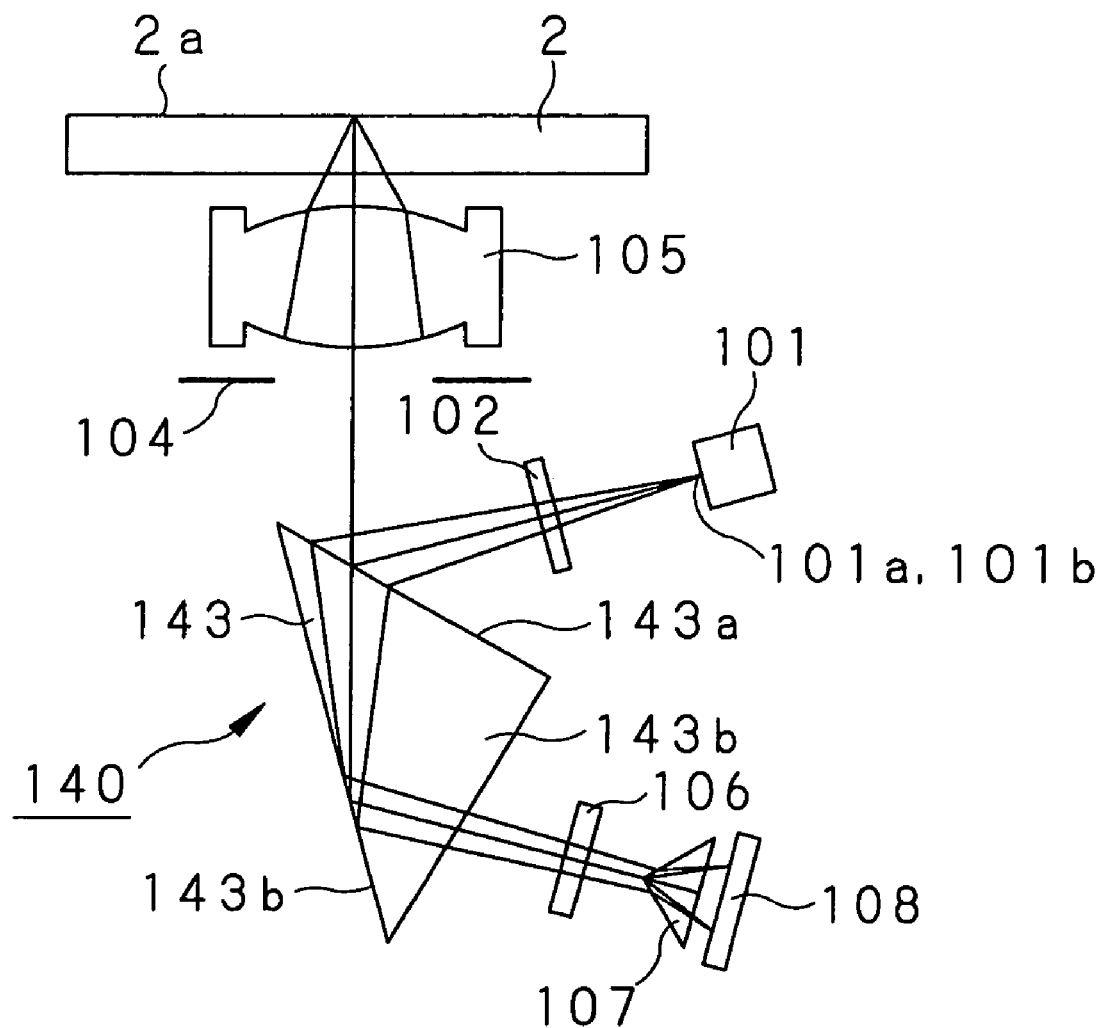
FIG. 28 is a schematic side elevation of a still yet another variant of the optical system of the optical pickup in the optical disk drive according to the present invention.

In a fourth example, the optical pickup 3 includes an optical system 140 that reproduces information for the optical disk 2, and a lens driving mechanism (not shown) that moves an objective lens included in the optical system 140 and which will be described in detail later, as shown in FIG. 28 for example. The optical pickup 3 including the optical system 140 will be described below, but the same or similar elements of this optical pickup 3 as or to those of the optical pickup 3 using the optical system 140 will be indicated with the same or similar references as or to those of the elements in the latter optical pickup 3 and will not be described in detail.

The optical system 140 of the optical pickup 3 includes, in the order following the light beam part, a light source 101 that emits a light beam toward the optical disk 2, a diffraction grating 102 that splits the light beam selectively emitted from the double-wavelength light source 101 into three beams, a beam splitter 143 that makes the outgoing three beams from the diffraction grating 102 and the return light from the optical disk 2 travel along different light paths, respectively, a limiting aperture 104 that limits the outgoing light split by the beam splitter 143 to a predetermined numerical aperture NA, a double-wavelength objective lens 105 that focuses the outgoing light limited by the limiting aperture 104 onto the recording layer 2a of the optical disk 2, a light-path synthesis diffraction grating 106 that corrects a light-path deviation, due to a displacement between the light-emitting points, of the return light from the optical disk 2, having passed by the beam splitter 143, a beam-splitting prism 107 that splits, into four beams, the return light having the light-path deviation thereof corrected by the light-path synthesis diffraction grating 106, and a photodetector assembly 108 that detects the return light split by the beam-splitting prism 107.

The beam splitter 143 is a transparent member shaped to have a generally isosceles-triangular form having a first surface 143a, second surface 143b perpendicular to the first surface 143a, and a third surface 143c connected to the first and second surfaces 143a and 143b. In the beam splitter 143, the light beam selectively emitted from the double-wavelength light source 101 is reflected at the first surface 143a toward the optical disk 2, and the return light from the optical disk 2 passes by the first surface 143a, is reflected at the third surface 143c and passes by the second surface 143b, and travels to the light-path synthesis diffraction grating 106.

Of the beam splitter 143, the first surface 143a is a half mirror, and the third surface 143c provides a total reflection. The third surface 143c has a reflecting film formed thereon by evaporation or a similar process to provide a total reflection of the return light. The beam splitter 143 imparts a predetermined extent of astigmatism to the return light from the optical disk 2, having passed by the beam splitter 143 and to be incident upon the light-path synthesis diffraction grating 106. The beam splitter 143 can easily adjust the defocusing of the light beam in relation to the optical disk 2 by adjusting the optical-axial position of the light beam from the double-wavelength light source 101.

As shown in FIGS. 21 and 22, the beam-splitting prism 107 is shaped to have the form of a generally regular-tetragonal pyramid and disposed for the center of the return light having passed by the beam splitter 143 to fall, at or close to the focus of the return light, on that of the apex of the tetragonal pyramid. The beam-splitting prism 107 is positioned on the light path of the return light having passed by the light-path synthesis diffraction grating 106 to split the return light into four beams.

In the optical disk drive 1 provided with the optical pickup 3 including the aforementioned optical system 140, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 106 in the focusing and tracking directions, and thus the outgoing light is focused by the double-wavelength objective lens 105 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The outgoing light and return light travel along the light paths in the aforementioned optical system 140 of the optical pickup 3 as will be described below.

When the optical disk drive 1 reads information from the recording layer 2a of the optical disk 2, the light beam selectively emitted from the double-wavelength light source 101 and which has a wavelength matching the format of the optical disk 2 is split by the diffraction grating 102 into three beams including a zero-order light beam and positive and negative first-order light beams as shown in FIG. 26. These three beams are reflected at the first surface 143a of the beam splitter 143, limited by the limiting aperture 104 to a predetermined numerical aperture, and focused by the double-wavelength objective lens 105 onto the recording layer 2a of the optical disk 2.

The return light from the recording layer 2a of the optical disk 2 passes by the first surface 143a of the beam splitter 143, is reflected at the third surface 143c, passes by the second surface 143b, and travels along a light path synthesized as a result of correction, by the light-path synthesis diffraction grating 106, of a light-path deviation caused by a displacement between the light-emitting points of the light source 101, and the return light corresponding to the zero-order light beam from the diffraction grating 102 is incident upon the apex of the beam-splitting prism 107. The return light incident upon the apex of the beam-splitting prism 107 having the form of a regular-tetragonal pyramid is incident upon each of the side faces of the regular-tetragonal pyramid, and thus refracted in different directions to be four return light beams which will be incident upon the light-detecting areas $a_3$, $b_3$, $c_3$ and $d_3$, respectively, of the main-beam photodetector 111 of the photodetector assembly 108. Also, one of the return light beams from the optical disk 2, corresponding to the positive and negative first-order light beams coming from the diffraction grating 102 and passing by the beam splitter 143, is incident upon the light-detecting areas $e_3$ and $f_3$ of the side-beam photodetector 112 of the photodetector assembly 108, while the other return light beam is incident upon the light-detecting areas $g_3$ and $h_3$ of the side-beam photodetector 113 of the photodetector assembly 108.

In the optical pickup 3 including the optical system 140 configured as above, the light-path synthesis diffraction grating 106 can correct a light-path deviation caused by a displacement between the light-emitting points, caused by a difference in wavelength between light beams selectively emitted from the double-wavelength light source 101, and the return light can be directed to the apex of the beam-splitting prism 107 and thus split into four beams. So, the return light can appropriately be directed to each of the light-detecting areas of the photodetector assembly 108.

As having been described in the foregoing, since the beam splitter 103, 123, 133 or 143 in the optical pickup 3 of the optical disk drive 1 can correct a light-path deviation of the return light from the optical disk 2, caused by a displacement between the light-emitting points, that is caused by a difference between light beams selectively emitted from the double-wavelength light source 61, the return light having a wavelength matching the format of the optical disk 2 can be made to be appropriately incident upon the apex of the beam-splitting prism 107, thereby providing a more reliable focusing error signal.

The optical system 100, 120, 130 or 140 included in the optical pickup 3 of the optical disk drive 1 may use the grating 79 divided in four areas as shown in FIG. 16 in place of the beam-splitting prism 107. The grating 79 is equal in effect to the beam-splitting prism 107. For the same effect as that of the beam-splitting prism 107, the grating 79 has divisional areas $y_1$, $y_2$, $y_3$ and $y_4$ to assure the same effect. The divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four beams to the main-beam photodetector 111 of the photodetector assembly 108. The grating 79 is a hologram element having a predetermined hologram pattern formed by etching or similar process, for example. In this case, the hologram element should preferably be a surface-relieved one or a brazed hologram, to improve the efficiency of diffraction.

The aforementioned beam-splitting prism 107 may be shaped to have the form of an octagonal pyramid, for example. In this case, the main-beam photodetector 111 of the photodetector assembly 108 may have the light-detecting surface thereof divided by radial parting lines into eight radial areas extending from the center. Also, the beam-splitting prism 107 is not limited in shape to any pyramid defined by flat surfaces but may be shaped to have a plurality of curved surfaces. In this case, the beam-splitting prism 107 will be provided for the curved surfaces thereof to correspond to the divisional areas, respectively, of the main-beam photodetector 111 of the photodetector assembly 108.

Also, the beam-splitting prism 107 may be a hologram element having a predetermined hologram pattern formed thereon by etching or similar process. Also, in case a hologram element is used, it should preferably be a surface-believed one or a brazed hologram, to improve the efficiency of diffraction.

In the optical disk drive 1, the optical pickup 3 including the optical system 100, 120, 130 or 140 may have the light path configured to have an internal reflecting surface which can be used to bend the light path for an improved freedom of the optical design.

In the optical disk drive 1, the optical pickup 3 including the optical system 100, 120, 130 or 140 may be configured so that the beam-splitting prism 107 may have such an increased angle of refraction that the return light from the optical disk 2, incident upon the beam-splitting prism 107, will form an angle of less than 45 deg. with each surface of the beam-splitting prism 107, that is, each surface of the beam-splitting prism 107 will be inclined less than 45 deg. in order to prevent the incident return light from being totally reflected. Thus, the spots of the split beams of the return light can be separated more from each other, the divisional surface areas of the main-beam photodetector 111 can be separated more from each other, and the main-beam and side-beam photodetectors 111 and 112 and 113 can be separated more from each other. Thus, the optical pickup 3 may be assembled with a precision not so high.

In the optical disk drive 1, the optical pickup 3 including the optical system 100, 120, 130 or 140 can be configured similarly to the conventional optical pickup. Thus, the optical pickup 3 can be produced with a reduced cost, the optical elements can be disposed more freely and the optical system can be configured easily.

In the optical disk drive 1, since the optical pickup 3 including the optical system 100, 120, 130 or 140 has the beam-splitting prism 107 that splits, on the light path, the return light from the optical disk 2, so the main-beam photodetector 111 may have the light-detecting surface thereof divided into light-detecting areas $a_3$, $b_3$, $c_3$ and $d_3$ for detecting four return light beams, respectively, from the beam-splitting prism 107 with a lower precision of positioning than that required for an optical pickup in which a beam spot is divided by the parting lines of the main-beam photodetector 111.

Thus, the main-beam photodetector 111 in the optical pickup 3 of the optical disk drive 1 can be produced with a reduced cost, the position of the main-beam photodetector 111 can easily be adjusted in the process of producing the optical pickup 3, and the focusing error signal FE provided in the optical pickup 3 is more reliable.

In the optical disk drive 1, use of the double-wavelength light source 101 that selectively emits one of a plurality of laser beams different in wavelength from each other from the light-emitting point 101a or 101b leads to a light-path deviation between the outgoing light beams different in wavelength from each other. However, the light-path synthesis diffraction grating 106 permits to synthesize different light paths to align the optical axis of the outgoing light with the apex of the beam splitting prism 107. Thus, in the optical disk drive 1, return light beams different in wavelength from each other can appropriately be directed to the apex of the beam-splitting prism 107 and appropriately split by the latter.

Thus, in the optical disk drive 1, return light can appropriately be directed to each of the light-detecting areas of the photodetector assembly 108 to provide a stable focusing error signal FE.

Note that in the optical disk drive 1, the so-called astigmatism is adopted in the aforementioned optical pickup 3 to detect a focusing error signal FE but any other light-detecting method such as the Foucault process or the like may be adopted for this purpose. In the optical disk drive 1, the optical pickup 3 adopts the so-called DPP (differential push-pull) method to provide a tracking error signal TE, but it should be noted that any other method of detection such as DPD (differential phase detection) may be adopted for this purpose.

In the aforementioned examples, the optical pickups 3 including the optical systems 30 and 60 to correct a light-path deviation caused by a difference in wavelength between light beams from the light-emitting/detecting element 31 or double-wavelength light source 61, and those with the optical systems 100, 120, 130 and 140 to correct a light-path deviation caused by a displacement between light beams, caused by a difference between the light beams from the double-wavelength light source 61, have been illustrated and described concerning their configuration and operation. However, the optical pickup 3 may use an optical system which corrects both a light-path deviation due to a difference in wavelength between outgoing light beams and a light-path deviation due to a displacement between the light-emitting points, caused by a difference in wavelength between the outgoing light beams.

There will be illustrated and described by way of example herebelow the optical pickup 3 including an optical system configured to correct both a light-path deviation due to a difference in wavelength between outgoing light beams and a light-path deviation due to a displacement between the light-emitting points, caused by a difference in wavelength between the outgoing light beams. It should be noted that the same or similar elements in this optical system in the optical pickup 3 as or to those in the optical system of the optical pickup 3 including the optical system 30 or 60 will be indicated with the same or similar references as or to those for the elements in the optical pickup 3 using the optical system 30 or 60 and will not be described in detail any more.

In a fifth example of the optical pickup 3, the optical system, generally indicated with a reference 150, includes, in the order following the light path as in FIG. 29, a double-wavelength light source 61 that selectively emits one of a plurality of light beams different in wavelength from each other to the optical disk 2, a composite optical element 151 that allows the light beam emitted from the double-wavelength light source 61 to pass through, while directing the return light from the optical disk 2 to a photodetector assembly 156 which will be described in detail later, a plate-shaped optical element 152 that makes the outgoing light having passed by the composite optical element 151 and return light from the optical disk 2 travel along different light paths, respectively, a collimator lens 153 that parallelizes the outgoing light passing by the plate-shaped optical element 152, a quarter wave plate 154 that changes the polarized state of the outgoing light parallelized by the collimator lens 153, a double-wavelength objective lens 155 that focuses the outgoing light having passed by the quarter wave plate 154 onto the recording layer 2a of the optical disk 2, and a photodetector assembly 156 that detects the return light from the optical disk 2.

The double-wavelength light source 61 is a semiconductor laser that selectively emits a laser beam having a wavelength of about 780 nm for example or a laser beam having a wavelength of about 650 nm for example from a light-emitting point 61a or 61b. The double-wavelength light source 61 can be switched between two modes of light emission. When the optical disk 2 is a CD-format one, the double-wavelength light source 61 is switched to one of the modes to emit the a light beam of about 780 nm in wavelength from the light-emitting point 61a according to a control signal from the drive controller 11. When the optical disk 2 is of a DVD format type, the double-wavelength light source 61 operates in the other mode to emit the a light beam having the wavelength of about 650 nm from the light-emitting point 61b according to a control signal from the drive controller 11. Also, the double-wavelength light source 61 is disposed for the light-emitting point 61b thereof to be at the optical-axial center of the double-wavelength objective lens 155.

Figure 30:
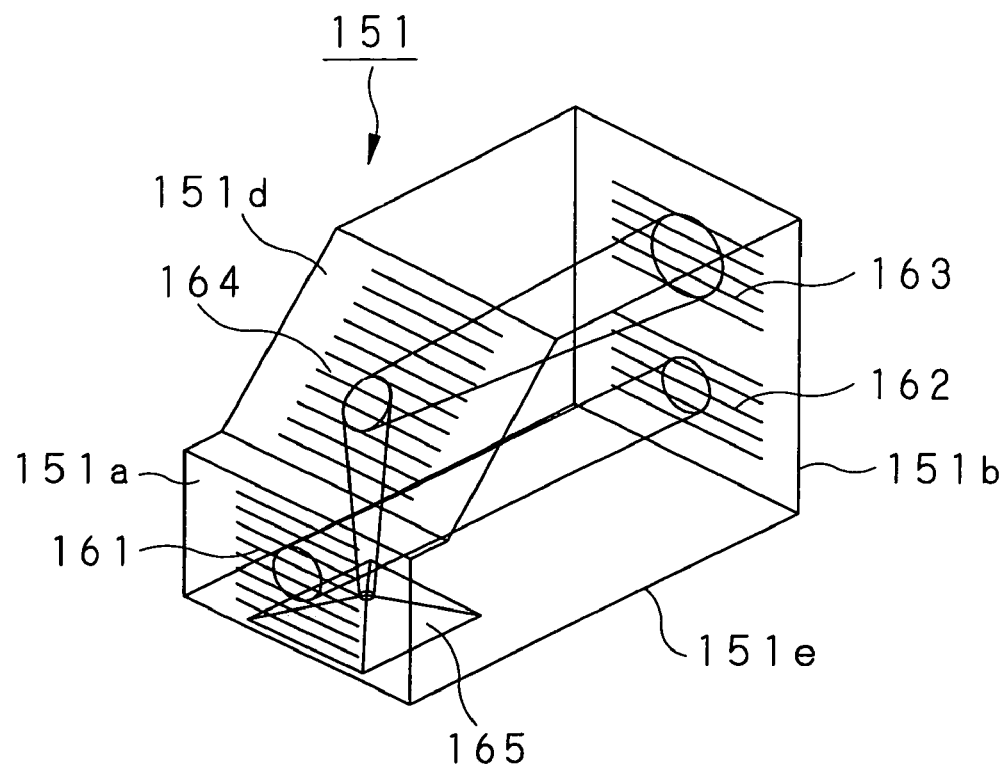
FIG. 30 is a perspective view of a composite optical element provided in the variant of the optical system of the optical pickup in FIG. 29.

As shown in FIG. 30, the composite optical element 151 is formed like a block by injection molding of a resin material, for example. It has a first surface 151a facing the double-wavelength light source 61 and perpendicular to the optical axis of the light beam emitted from the light-emitting point 61b of the double-wavelength light source 61, a second surface 151b generally parallel and opposite to the first surface 151a, a third surface 151d inclined a predetermined angle in relation to the second surface 151b and opposite to the latter, and a fourth surface 151e perpendicular to the first and second surfaces 151a and 151b, inclined a predetermined angle in relation to the third surface 151d and opposite to the latter.

On the first surface 151a, there is provided a three-beam generating diffraction grating 161 that splits the light beam emitted from the light-emitting point 61a or 61b of the double-wavelength light source 61 into three beams including a zero-order light beam and positive and negative first-order light beams. The optical system 150 adopts the so-called DPP method (differential phase detection) to provide a tracking error signal TE. It is configured to provide a tracking servo control by detecting, at the photodetector assembly 156, the positive and negative first-order light beams from the three-beam generating diffraction grating 161.

On the second surface 151b, there is provided on the light path of the light beam selectively emitted from the double-wavelength light source 61 a light-path synthesis diffraction element 162 that corrects a light-path deviation due to a displacement between light-emitting points of the double-wavelength light source 61. Also, on this light path of the return light, there is provided a first color compensation diffraction grating 163 that diffracts the return light on the return-light light path and splits the return light into three beams including a zero-order light beam and positive and negative first-order light beams to correct a light-path deviation of the negative first-order light beam as the return light, taking place in a light-path blanching diffraction grating 152a. Since the optical axis of the outgoing light having a wavelength of about 650 nm, emitted from the light-emitting point 61b, is aligned with the optical-coaxial center of the objective lens 155, the light-path synthesis diffraction element 162 can align the light beam having a wavelength of about 780 nm, emitted from the light-emitting point 61a, with the optical-axis of the light beam emitted from the light-emitting point 61b.

On the third surface 151d, there is provided on the light path of the return light having been corrected by the first color compensation diffraction grating 163 a second color compensation diffraction grating 164 that reflects and diffracts the return light and splits the return light into a zero-order light beam and positive and negative first-order light beams to correct, along with the first color compensation diffraction grating 163, a light-path deviation of the negative first-order light beam, for example, as the return light, taking place in a light-path branching diffraction grating 152a which will be described in detail later. The second color compensation diffraction grating 164 has a specific reflecting film provided on the third surface 151d to totally reflect the incident return light. That is, the second color compensation diffraction grating 164 will work as a so-called reflective diffraction grating.

On the fourth surface 151e, there is provided a beam-splitting prism 165 disposed on the return-light light path, of which the deviation has been corrected by the second color compensation diffraction grating 164, to split the return light into four beams.

Figure 31:
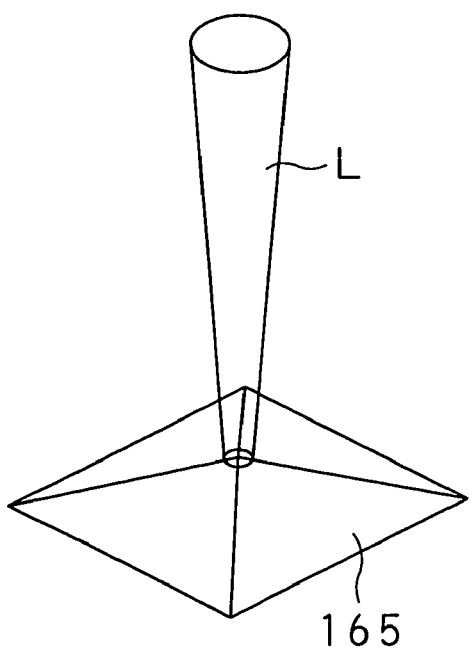
FIG. 31 is a perspective view of a beam-splitting prism in the composite optical element provided in the variant of the optical system of the optical pickup in FIG. 29
Figure 32:
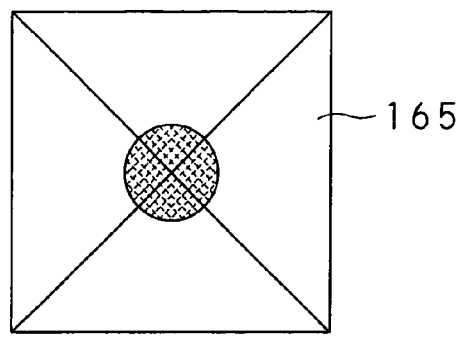
FIG. 32 is a view, from the return light-detecting side, of the beam-splitting prism provided in the composite optical element provided in the variant of the optical system of the optical pickup in FIG. 29.

As shown in FIGS. 31 and 32, the beam-splitting prism 165 is shaped to have the form of a generally regular-tetragonal pyramid, and disposed for the center of the negative first-order light beam reflected and diffracted by the second color compensation diffraction grating 164 to fall, at or close to the focus of the diffracted light, on that of the apex of the regular-tetragonal pyramid.

Also, the beam-splitting prism 165 is disposed inside the composite optical element 151 with the apex thereof being directed inwardly of the composite optical element 151. That is, the beam-splitting prism 165 is disposed in such a manner that the zero-order light beam of the three beams from the three-beam generating diffraction grating 161 will be diffracted by the first color compensation diffraction grating 163, and reflected and diffracted by the second color compensation diffraction grating 164 for incidence upon the apex of the beam-splitting prism 165. It should be noted that the beam-splitting prism 165 is disposed with the bottom thereof (namely, the bottom of the tetragonal pyramid) being perpendicular to the optical axis of the negative first-order light beam reflected and diffracted by the second color compensation diffraction grating 164.

The composite optical element 151 imparts a predetermined degree of astigmatism to the return light incident upon the beam-splitting prism 165 when the return light separated by the light-path branching diffraction grating 152a passes by the composite optical element 151. The composite optical element 151 can easily adjust defocusing in relation to the optical disk 2 by adjusting the optical-axial position of the light beam selectively emitted from the double-wavelength light source 61.

The composite optical element 151 is formed from a resin material by injection molding as above. Alternatively, it may have the three-beam generating diffraction grating 161, light-path synthesis diffraction grating 162, first color compensation diffraction grating 163, second color compensation diffraction grating 164 and beam-splitting prism 165 formed thereon by etching or any other mechanical processing. It should be noted that the material of the composite optical element 151 is not limited to the resin material but may be a transparent optical material such as nitric material. Further, the composite optical element 151 may be formed from a combination of these optical materials so that one part thereof may be different in material from the other part.

The composite optical element 151 may include the three-beam generating diffraction grating 161, light-path synthesis diffraction grating 162, first color compensation diffraction grating 163 and second color compensation diffraction grating 164, each as a hologram element having a predetermined hologram pattern formed thereon by etching or any other processing. In this case, the hologram element should preferably be a surface-relieved one or a brazed hologram, to improve the efficiency of diffraction.

As in the composite optical element 32 having previously been described, the composite optical element 151 designed on the basis of calculated values of the grating constants of the first and second color compensation diffraction gratings 163 and 164, an angle defined between the third and second surfaces 151d and 151b, etc. can correct a light-path deviation, caused by a wavelength variation, of the return light, and thus direct the return light accurately to the apex of the beam-splitting prism 165.

In the composite optical element 151 thus designed, even if the return light from the optical disk 2, diffracted as a positive first-order light beam by the light-path branching diffraction grating 152a, has the light path thereof deviated from that of the outgoing light due to a variation in wavelength of the light beam selectively emitted from the double-wavelength light source 61 when it is separated from the outgoing light, refraction of the return light, as a negative first-order light beam, by the first color compensation diffraction grating 163 and reflection and diffraction of the return light, as a negative first-order light beam, by the second color compensation diffraction grating 164 permit to direct the return light always to the apex of the beam-splitting prism 165 and accurately direct each return light coming from the optical disk 2 and split by the beam-splitting prism 165 to a predetermined position on the light-detecting area of the photodetector assembly 156.

The plate-shaped optical element 152 is transparent, for example. On the light-incident surface thereof upon which the outgoing light has passed by the composite optical element 151 is incident, there is provided the light-path branching diffraction grating 152a that diffracts the zero-order light beam and positive and negative first-order light beams, resulted from splitting of the return light from the optical disk 2 by the three-beam generating diffraction grating 161, further splits the light beam into a zero-order light beam and positive and negative first-order light beams, and makes the positive first-order light beam, for example, travel along a light path separate from that of the outgoing light. The light-path branching diffraction grating 152a is designed to diffract only a light component polarized in a specific direction. It diffracts only the return light from the optical disk 2 in this embodiment.

The plate-shaped optical element 152 is formed from a resin material by injection molding. It may also be formed otherwise. That is, the aforementioned light-path branching diffraction grating 152a may be formed by etching or any other mechanical processing. It should be noted that the material of the plate-shaped optical element 152 is not limited to the resin material but may be a transparent optical material such as nitric material. Further, the plate-shaped optical element 152 may be formed from a combination of these optical materials so that one part thereof may be different in material from the other part.

The light-path branching diffraction grating 152a of the plate-shaped optical element 152 may be a hologram element having a predetermined hologram pattern formed by etching or similar process. In this case, the hologram element should preferably be a surface-believed one or a brazed hologram, to improve the efficiency of diffraction.

The collimator lens 153 is a lens to provide a parallel light beam. It allows the outgoing light passing by the plate-shaped optical element 152 to pass through as a parallel beam for incidence upon the quarter wave plate 154, and also allows the return light from the optical disk 2 to pass through for incidence upon the plate-shaped optical element 152.

The quarter wave plate 154 is to change the polarized state of light. It allows both the outgoing light parallelized by the collimator lens 153 and return light from the optical disk 2 so that the polarized direction of the return light in relation to the outgoing light is rotated 90 deg.

The double-wavelength objective lens 155 is a condenser lens formed from at least one convex lens to focus one of light beams emitted from the double-wavelength light source 61 and having different wavelengths. It is disposed to focus, on the optical disk 2, the outgoing light having the polarized state thereof changed by the quarter wave plate 154.

Figure 33:
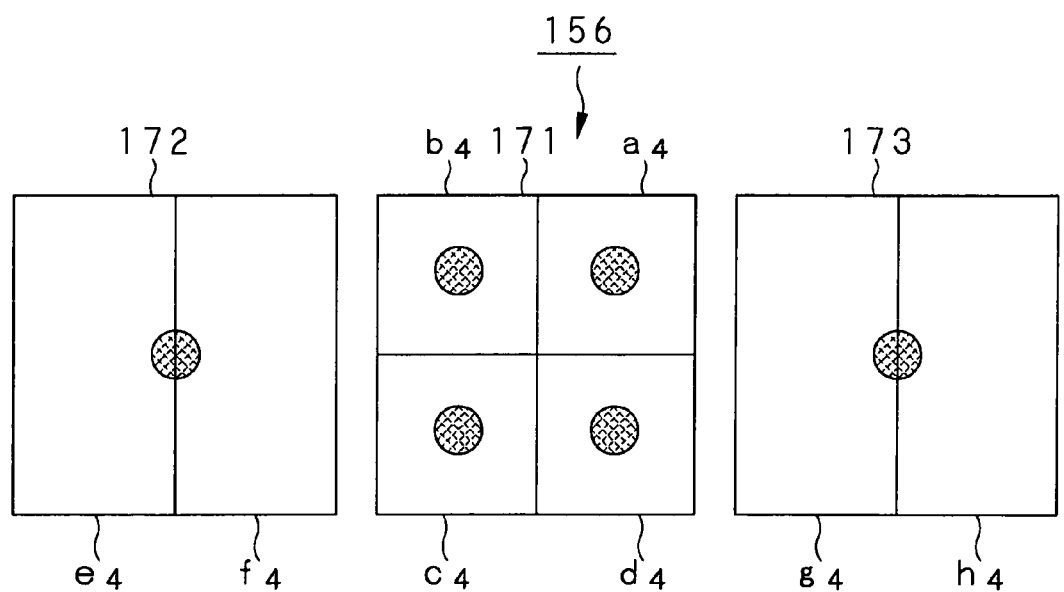
FIG. 33 explains a main-beam photodetector and side-beam photodetectors of a photodetector assembly provided in the variant of the optical system of the optical pickup in FIG. 29.

As shown in FIG. 33, the photodetector assembly 156 includes a generally square main-beam photodetector 171 that detects a main beam which is the zero-order light beam from the three-beam generating diffraction grating 161, and a pair of generally square side-beam photodetectors 172 and 173 each formed from a pair of generally rectangular areas and that detect two side beams, respectively, which are positive and negative first-order light beams from the three-beam generating diffraction grating 161. The photodetector assembly 156 is disposed correspondingly to the return light split by the beam-splitting prism 165 in the composite optical element 151. In the photodetector assembly 156, the generally square main-beam photodetector 171 is disposed in the center, and the pair of generally square side-beam photodetectors 172 and 173 is disposed across the main-beam photodetector 171.

The main-beam photodetector 171 in the photodetector assembly 156 is quadrisected into light-detecting areas $a_4$, $b_4$, $c_4$ and $d_4$ by a pair of parting lines perpendicular to each other. The return light beams resulted from quadrisection of the return light by the beam-splitting prism 165 are incident upon the light-detecting areas $a_4$, $b_4$, $c_4$ and $d_4$, respectively.

The side-beam photodetectors 172 and 173 of the photodetector assembly 156 are bisected by a set of parting lines into light-detecting areas $e_4$ and $f_4$, and $g_4$ and $h_4$, respectively. One of the return light beams from the optical disk 2, corresponding to the positive and negative first-order light beams from the light-path branching diffraction grating 152a, is incident upon the light-detecting areas $e_4$ and $f_4$, while the other return light beam from the optical disk 2, corresponding to the positive and negative first-order light beams from the light-path branching diffraction grating 152a, is incident upon the light-detecting areas $g_4$ and $h_4$.

The lens driving mechanism in the optical pickup 3 includes a lens holder to hold the double-wavelength objective lens 155, a holding support member to support the lens holder to be movable biaxially, namely, in a focusing direction parallel to the optical axis of the double-wavelength objective lens 155 and a tracking direction perpendicular to the optical axis of the double-wavelength objective lens 155, and an electromagnetic drive unit to move the lens holder biaxially under the action of an electromagnetic force (these components are not illustrated).

The above lens driving mechanism moves the double-wavelength objective lens 155 in a focusing direction according to a focusing error signal detected by the main-beam photodetector 171 in the photodetector assembly 156 and a tracking direction according to a tracking error signal detected by the side-beam photodetectors 172 and 173, to thereby focus the outgoing light on a recording track on the recording layer 2a in the optical disk 2.

In the optical disk drive 1 provided with the optical pickup 3 including the aforementioned optical system 150, the servo circuit 10 generates control signals through the light-path branching diffraction grating 152a of the plate-shaped optical element 152. The outgoing light passing by the light-path branching diffraction grating 152a is parallelized by the collimator lens 153, has the polarized state thereof changed by the quarter wave plate 154, and is focused by the double-wavelength objective lens 155 onto the recording layer 2a of the optical disk 2.

The return light from the recording layer 2a of the optical disk 2 passes by the double-wavelength objective lens 155, has the polarized state thereof changed by the quarter wave plate 154, and passes by the collimator lens 153. Only the return light having the polarized direction thereof rotated 90 deg. in relation to the outgoing light in the light-path branching diffraction grating 152a of the plate-shaped optical element 152 is diffracted and directed to the light path going toward the first color compensation diffraction grating 163 on the second surface 151b of the composite optical element 151. The positive first-order light beam coming from the light-path branching diffraction grating 152a and incident upon the first color compensation diffraction grating 163 is diffracted by the first color compensation diffraction grating 163, and the negative first-order light beam is incident as return light upon the second color compensation diffraction grating 164, and reflected and diffracted by the second color compensation diffraction grating 164. The negative first-order light beam is incident as return light upon the apex of the beam-splitting prism 165. The return light incident upon the apex of the regular-tetragonal pyramid of the beam-splitting prism 165 is incident upon each side face, and also the apex, of the regular-tetragonal pyramid. Thus, the return light beams are refracted in different directions into four return light beams, and incident upon the light-detecting areas $a_4$, $b_4$, $c_4$ and $d_4$, respectively, of the main-beam photodetector 171 of the photodetector assembly 156. Also, one of the return light beams having passed by the composite optical element 151, corresponding to the positive and negative first-order light beams coming from the light-path branching diffraction grating 151a, is incident upon the light-detecting areas $e_4$ and $f_4$ of the side-beam photodetector 172 of the photodetector assembly 156, while the other return light beam is incident upon the light-detecting areas $g_4$ and $h_4$ of the side-beam photodetector 173 of the photodetector assembly 156.

Figure 34A:
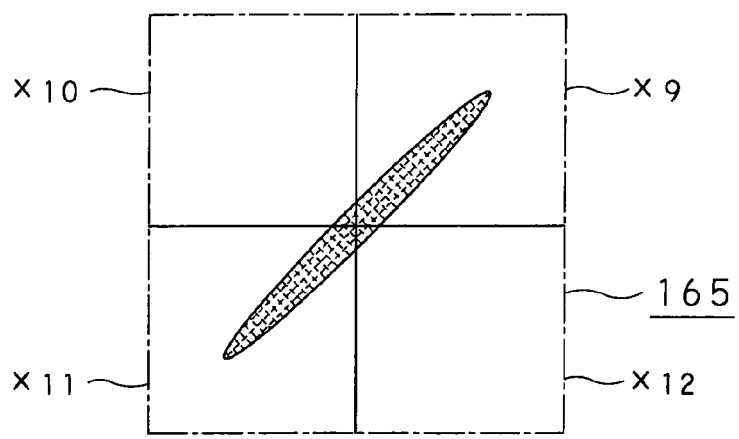
Figure 34B:
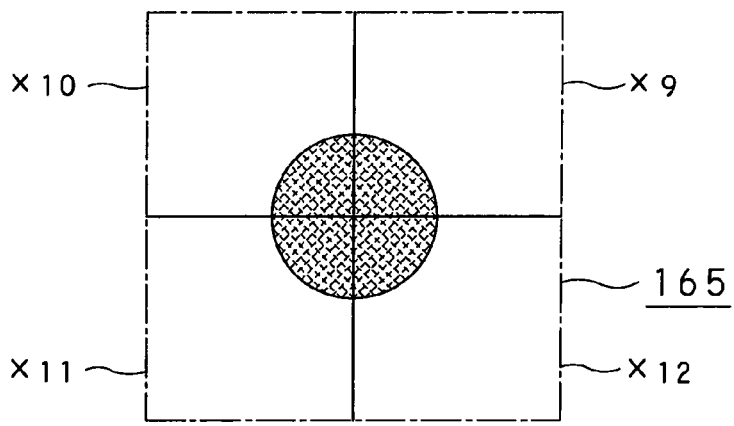

Note here that if the double-wavelength objective lens 155 is positioned in the just-in-focus position in relation to the recording layer 2a of the optical disk 2 as shown in FIG. 34B when the return light reflected and diffracted by the second color compensation diffraction grating 164 is incident upon the apex of the beam-splitting prism 165, the incident diffracted light will take a generally circular shape.

On the other hand, if the double-wavelength objective lens 155 is excessively close to the recording layer 2a in the optical disk 2 when the return light is incident upon the apex of the beam-splitting prism 165, the double-wavelength objective lens 155 will be off the in-focus position as shown in FIG. 34A. Thus, astigmatism will take place because the diffracted light passes by the composite optical element 151. In this case, the incident diffracted light upon the apex of the beam-splitting prism 165 will take the form of an ellipse whose major axis extends obliquely to the upper right as shown in FIG. 34A.

Figure 34C:
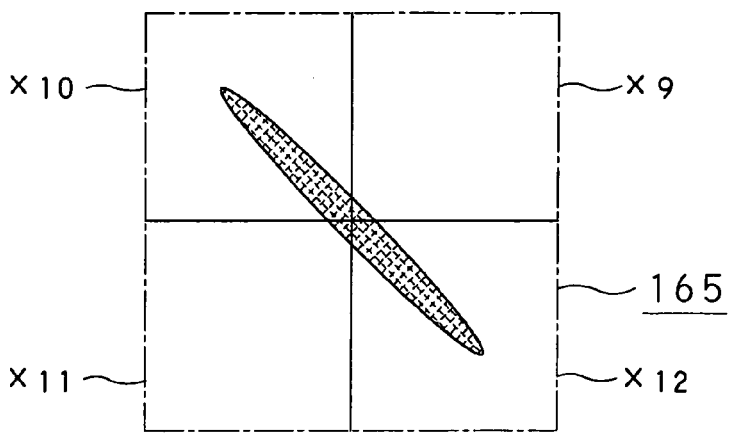

If the double-wavelength objective lens 155 is excessively apart from the recording layer 2a in the optical disk 2 when the diffracted light is incident upon the apex of the beam-splitting prism 165, the double-wavelength objective lens 155 will also be off the in-focus position as shown in FIG. 34C. Thus, astigmatism will take place because the diffracted light passes by the composite optical element 151. In this case, the incident diffracted light upon the apex of the beam-splitting prism 165 will also take the form of an ellipse whose major axis extends obliquely to the upper left as shown in FIG. 34C.

Therefore, when the diffracted light is incident upon the apex of the beam-splitting prism 165 with the double-wavelength objective lens 155 being off the in-focus position, the majority of the diffracted light is incident upon one of two sets of opposite side faces $x_9$ and $x_{11}$, and $x_{10}$ and $x_{12}$ of the beam-splitting prism 165, while an extremely small part of the diffracted light will be incident upon the other set of surfaces.

More specifically, the majority of the diffracted light having the elliptical shape as shown in FIG. 34A will be incident upon one set of opposite side faces $x_9$ and $x_{11}$ of the beam-splitting prism 165, while the extremely small part of the diffracted light will be incident upon the other set of opposite side faces $x_{10}$ and $x_{12}$. Also, the majority of the diffracted light having the elliptical shape as shown in FIG. 34C will be incident upon the other set of opposite side faces $x_{10}$ and $x_{12}$ of the beam-splitting prism 165, while the extremely small part of the diffracted light will be incident upon the one set of opposite side faces $x_9$ and $x_{11}$.

The return light from the optical disk 2, which is a part of the zero-order light beam split by the three-beam generating diffraction grating 161, is reflected and diffracted by the second color compensation diffraction grating 164 to be a negative first-order light beam. This negative first-order light beam is incident upon each of the opposite side faces $x_9$ and $x_{10}$, and $x_{11}$ and $x_{12}$, and also the apex, of the beam-splitting prism 165, and refracted in different directions. Thus, the return light is split into four return light beams which will be incident upon the light-detecting areas $a_4$, $b_4$, $c_4$ and $d_4$, respectively, of the main-beam photodetector 171 of the photodetector assembly 156.

Figure 35A:
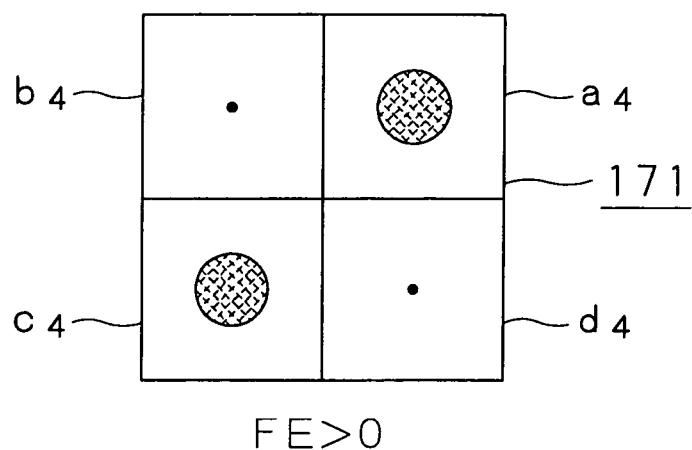
Figure 35B:
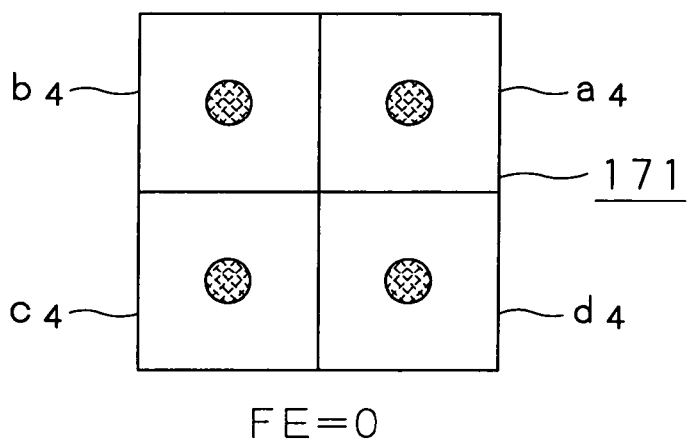
Figure 35C:
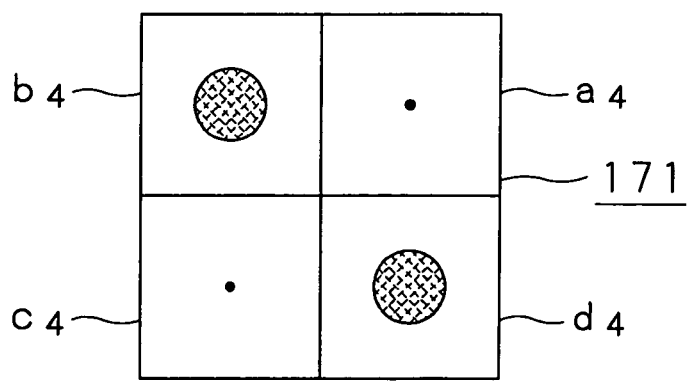

Thus, one of the two sets of opposite light-detecting areas $a_4$ and $c_4$, and $b_4$ and $d_4$, of the main-beam photodetector 171 detects a larger amount of light, while the other set will detect a smaller amount of light, as shown in FIGS. 35A and 35C.

More particularly, when the diffracted light having the elliptic shape as shown in FIG. 34A is incident upon the beam-splitting prism 165, the set of opposite light-detecting areas $a_4$ and $c_4$ of the main-beam photodetector 171 will detect a larger amount of light, while the other set of opposite light-detecting areas $b_4$ and $d_4$ will detect a smaller amount of light, as shown in FIG. 35A. Also, when the diffracted light having the elliptic shape as shown in FIG. 34C is incident upon the beam-splitting prism 165, the set of opposite light-detecting areas $b_4$ and $d_4$ of the main-beam photodetector 171 will detect a larger amount of light, while the other set of opposite light-detecting areas $a_4$ and $c_4$ will detect a smaller amount of light, as shown in FIG. 35C.

When the circular diffracted light as shown in FIG. 34B is incident upon the apex of the beam-splitting prism 165, both the sets of opposite light-detecting areas $a_4$ and $c_4$, and $b_4$ and $d_4$, of the main-beam photodetector 171 will detect an equal amount of light, as shown in FIG. 35B.

Therefore, given that outputs from the light-detecting areas $a_4$, $b_4$, $c_4$ and $d_4$ of the main-beam photodetector 171 are $Sa_4$, $Sb_4$, $Sc_4$ and $Sd_4$, respectively, a focusing error signal FE can be calculated as given by the following formula (25):

$$FE=(Sa_4+Sc_4)-(Sb_4+Sd_4) \qquad (25)$$

More specifically, when the double-wavelength objective lens 155 is set in the in-focus position in relation to the recording layer 2a in the optical disk 2, the main-beam photodetector 171 calculates the formula (25) to provide a zero focusing error signal FE. When the double-wavelength objective lens 155 is excessively close to the recording layer 2a in the optical disk 2, the main-beam photodetector 171 calculates the formula (25) to provide a positive focusing error signal FE. Also, when the double-wavelength objective lens 155 is excessively apart from the recording layer 2a in the optical disk 2, the main-beam photodetector 171 calculates the formula (25) to provide a negative focusing error signal FE.

The main-beam photodetector 171 in the photodetector assembly 156 calculates a focusing error signal FE on the basis of outputs from the light-detecting areas $a_4$, $b_4$, $c_4$ and $d_4$ on each of which the incident light defines a beam spot, and provides a read signal.

The positive and negative first-order light beams, resulted from splitting by the diffraction grating 152a, of the return light from the optical disk 2, are incident upon the light-detecting areas $e_4$ and $f_4$, and $g_4$ and $h_4$, respectively, of the pair of side-beam photodetectors 172 and 173.

Also, given that outputs from the light-detecting areas $e_4$ and $f_4$, and $g_4$ and $h_4$ of the pair of side-beam photodetectors 172 and 173 are $Se_4$ and $Sf_4$, and $Sg_4$ and $Sh_4$, respectively, a tracking error signal TE can be calculated as given by the following formula (26):

$$FE=(Sa_4+Sc_4)-(Sb_4+Sd_4)-\alpha((Se_4-Sf_4)+((Sg_4-Sh_4)) \qquad (26)$$

In the optical disk drive 1 configured as above, the servo circuit 10 controls the lens driving mechanism according to the focusing error signal FE and tracking error signal TE provided in the optical pickup 3 including the optical system 150 to move the double-wavelength objective lens 155 in focusing and tracking directions. The double-wavelength objective lens 155 focuses the outgoing light on the recording layer 2a of the optical disk 2 to read information from the optical disk 2.

Figure 36:
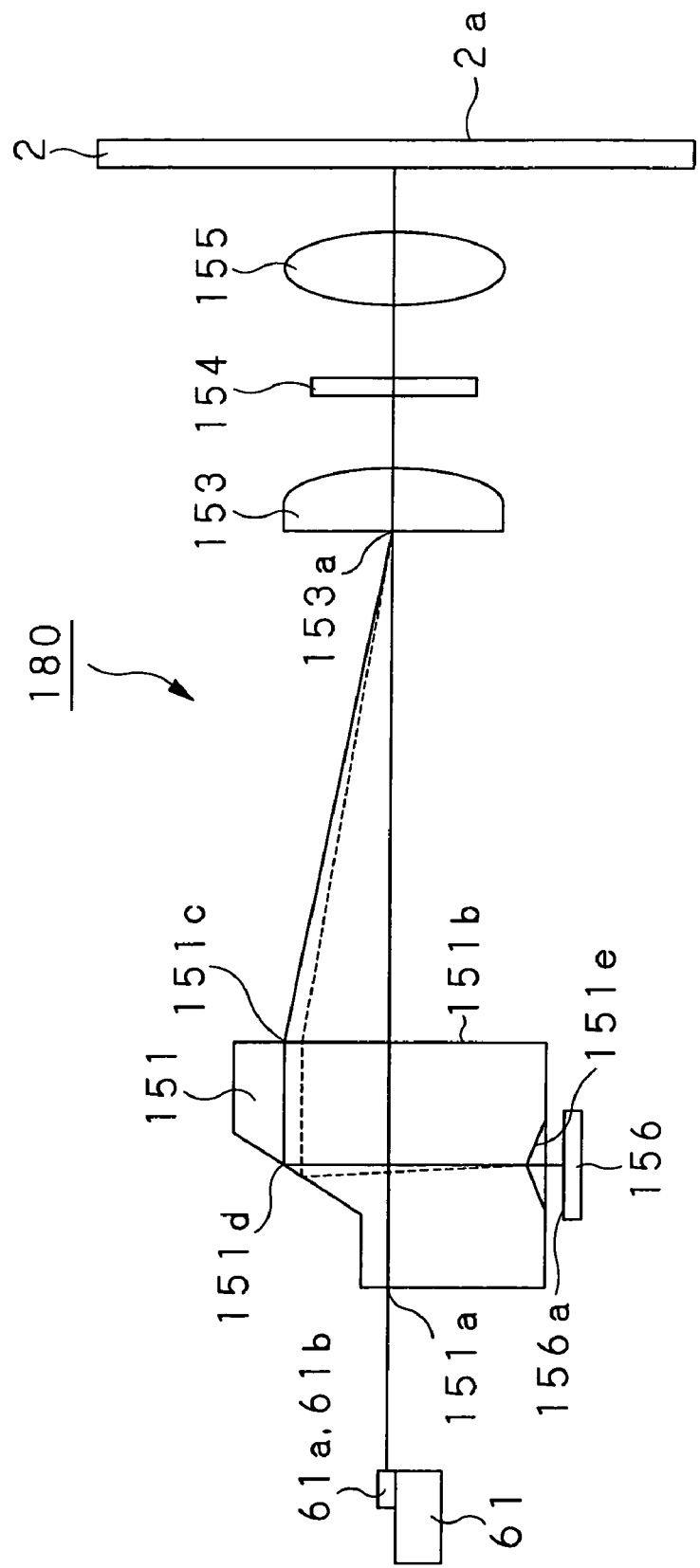
FIG. 36 schematically illustrates a variant of the optical system in the optical pickup provided in the optical disk drive according to the present invention.

As shown in FIG. 36, the optical system, generally indicated with a reference 180, used in a sixth example of the optical pickup 3 includes, in the order following the light path, a double-wavelength light source 61 that selectively emits one of a plurality of light beams different in wavelength from each other, a composite optical element 151 that allows the light beam emitted from the double-wavelength light source 61 to pass through, while directing the return light from the optical disk 2 to a photodetector assembly 156 which will be described in detail later, a collimator lens 153 that parallelizes the outgoing light passing by the composite optical element 151 and makes the outgoing light passing by the composite optical element 151 and return light from the optical disk 2 travel along different light paths, respectively, a quarter wave plate 154 that changes the polarized state of the outgoing light parallelized by the collimator lens 153, a double-wavelength objective lens 155 that focuses the outgoing light having passed by the quarter wave plate 154 onto the recording layer 2a of the optical disk 2, and a photodetector assembly 156 that detects the return light from the optical disk 2.

The above collimator lens 153 is to produce a parallel light beam. It has provided thereon a light-path branching diffraction grating 153a that parallelizes the outgoing light passing by the composite optical element 151 and allows it to pass through to the quarter wave plate 154 while diffracting the zero-order light beam and positive and negative first-order light beams, resulted from splitting of the return light from the optical disk 2 by a three-beam generating diffraction grating 161. The light-path branching diffraction grating 153a further splits the diffracted light into a zero-order light beam and positive and negative first-order light beams, and makes the positive first-order light beam, for example, as return light, travel along a light path separate from that of the outgoing light. The light-path branching diffraction grating 153a is provided on the surface of the collimator lens 153 where the outgoing light is incident. It diffracts only a light component polarized in a specific direction. Thus, it allows the outgoing light to pass through while diffracting only the return light from the optical disk 2.

The collimator lens 153 is formed by injection molding of a resin material, for example. Alternatively, it may have the light-path branching diffraction grating 153a formed thereon by etching or any other mechanical processing. It should be noted that the material of the collimator lens 153 is not limited to the resin material but may be a transparent optical material such as nitric material. Further, the collimator lens 153 may be formed from a combination of these optical materials so that one part thereof may be different in material from the other part.

The collimator lens 153 may have the light-path branching diffraction grating 153a thereof formed as a hologram element having a predetermined hologram pattern formed by etching or similar process, for example. In this case, the hologram element should preferably be a surface-believed one or a brazed hologram, to improve the efficiency of diffraction.

In the optical disk drive 1 provided with the optical pickup 3 including the aforementioned optical system 180, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 105 in the focusing and tracking directions, and thus the outgoing light is focused by the double-wavelength objective lens 155 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The optical disk drive 1 incorporating the optical pickup 3 including the aforementioned optical system 180 will be described in detail concerning the light paths of the outgoing light and return light in the optical pickup 3 with reference to the accompanying drawings.

When the optical disk drive 1 reads information from the recording layer 2a of the optical disk 2, the light beam selectively emitted from the double-wavelength light source 61 that selectively emits light beams different in wavelength from each other is split by the three-beam generating diffraction grating 161 of the composite optical element 151 into three beams including a zero-order light beam and positive and negative first-order light beams as shown in FIG. 36. The outgoing light thus split into the three beams has a light-path deviation thereof corrected by the light-path synthesis diffraction grating 162 in the composite optical element 151, passes, and is parallelized, by the light-path branching diffraction grating 153a of the collimator lens 153, has the polarized state thereof changed by the quarter wave plate 154, and is focused by the double-wavelength objective lens 155 onto the recording layer 2a of the optical disk 2.

The return light from the recording layer 2a of the optical disk 2 passes by the double-wavelength objective lens 155, and has the polarized state thereof changed by the quarter wave plate 154. Only the return light having the polarized direction thereof rotated 90 deg. in relation to the outgoing light in the light-path branching diffraction grating 153a of the collimator lens 153 is diffracted and directed to the light path going toward the first color compensation diffraction grating 163 on the second surface 151b of the composite optical element 151, and thus the positive first-order light beam is incident upon the first color compensation diffraction grating 163. The return light from the light-path branching diffraction grating 153a, incident upon the first color compensation diffraction grating 163, is diffracted by the first color compensation diffraction grating 163, and thus the negative first-order light beam is incident as return light upon the second color compensation diffraction grating 164 where it will be reflected and diffracted and incident upon as return light upon the apex of the beam-splitting prism 165. The return light incident upon the apex of the regular-tetragonal pyramid of the beam-splitting prism 165 is incident upon each side face, and also the apex, of the regular-tetragonal pyramid. Thus, the return light beams are refracted in different directions to be four return light beams, and incident upon the light-detecting areas $a_4$, $b_4$, $c_4$ and $d_4$, respectively, of the main-beam photodetector 171 of the photodetector assembly 156. Also, one of the return light beams, corresponding to the positive and negative first-order light beams from the light-path branching diffraction grating 153a and having passed by the composite optical element 151 is incident upon the light-detecting areas $e_4$ and $f_4$ of the side-beam photodetector 172 of the photodetector assembly 156, while the other return light beam is incident upon the light-detecting areas $g_4$ and $h_4$ of the side-beam photodetector 173 of the photodetector assembly 156.

In the optical disk drive 1 configured as above, the servo circuit 10 controls the lens driving mechanism according to the focusing error signal FE and tracking error signal TE detected by the optical pickup 3 including the optical system 180 to move the double-wavelength objective lens 155 in focusing and tracking directions. The double-wavelength objective lens 155 focuses the outgoing light on the recording layer 2a of the optical disk 2 to read information from the optical disk 2.

Figure 37:
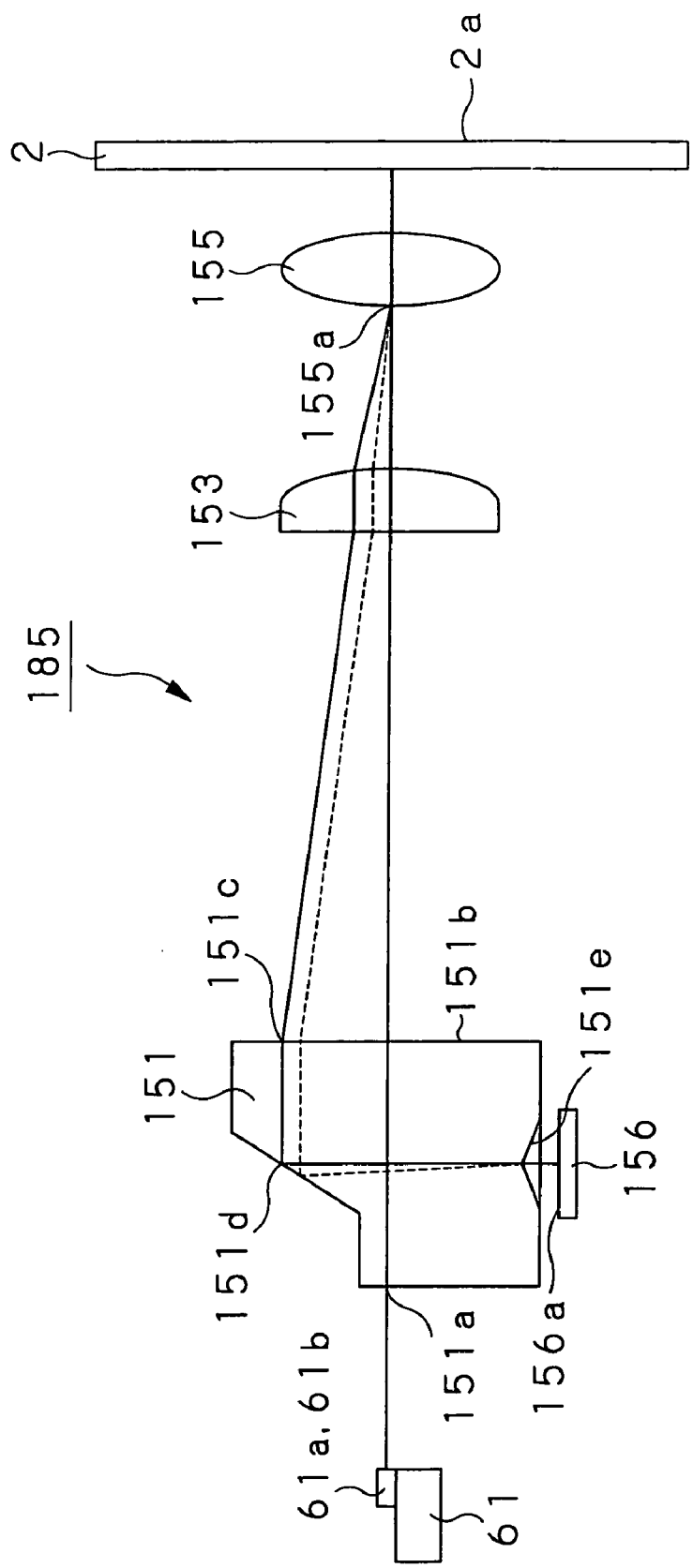
FIG. 37 schematically illustrates another variant of the optical system in the optical pickup provided in the optical disk drive according to the present invention.

As shown in FIG. 37, the optical system, generally indicated with a reference 185, used in a seventh example of the optical pickup 3 includes, in the order following the light path, a double-wavelength light source 61 that selectively emits one of a plurality of light beams different in wavelength from each other, a composite optical element 151 that allows the light beam emitted from the double-wavelength light source 61 to pass through, while directing the return light from the optical disk 2 to a photodetector assembly 156 which will be described in detail later, a collimator lens 153 that parallelizes the outgoing light passing by the composite optical element 151, a double-wavelength objective lens 155 that focuses the outgoing light parallelized by the collimator lens 53 onto the recording layer 2a of the optical disk 2 while making the outgoing light and the return light from the optical disk 2 travel along different light paths, and a photodetector assembly 156 that detects the return light from the optical disk 2.

The double-wavelength objective lens 155 is formed from at least one convex lens, and disposed to focus, on the optical disk 2, the light beam selectively emitted from the double-wavelength light source 61 that emits a plurality of light beams different in wavelength from each other. It has provided on the light-incident side thereof where the outgoing light is incident a light-path branching diffraction grating 155a that diffracts a zero-order light beam and positive and negative first-order light beams resulted from splitting of the return light coming from the optical disk 2 and split by the three-beam generating diffraction grating 161, into these light beams into a zero-order light beam and positive and negative first-order light beams beams, and makes the positive first-order light beam beam, for example, as return light, travel along a light path separate from that of the outgoing light. The light-path branching diffraction grating 155a is provided on the surface of the double-wavelength objective lens 155 where the outgoing light is incident.

The double-wavelength objective lens 155 is formed by injection molding of a resin material, for example. Alternatively, it may have the light-path branching diffraction grating 155a formed thereon by etching or any other mechanical processing. It should be noted that the material of the double-wavelength objective lens 155 is not limited to the resin material but may be a transparent optical material such as nitric material. Further, the collimator lens 153 may be formed from a combination of these optical materials so that one part thereof may be different in material from the other part.

The double-wavelength objective lens 155 may have the light-path branching diffraction grating 155a thereof formed as a hologram element having a predetermined hologram pattern formed by etching or similar process, for example. In this case, the hologram element should preferably be a surface-relieved one or a brazed hologram, to improve the efficiency of diffraction.

In the optical disk drive 1 provided with the optical pickup 3 including the aforementioned optical system 185, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 155 in the focusing and tracking directions, and thus the outgoing light is focused by the double-wavelength objective lens 155 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The optical disk drive 1 incorporating the optical pickup 3 including the aforementioned optical system 185 will be described in detail concerning the light paths of the outgoing light and return light in the optical pickup 3 with reference to the accompanying drawings.

When the optical disk drive 1 reads information from the recording layer 2a of the optical disk 2, a light beam selectively emitted from the double-wavelength light source 61 that selectively emits light beams having different wavelengths is split by the three-beam generating diffraction grating 161 of the composite optical element 151 into three beams including a zero-order light beam and positive and negative first-order light beams as shown in FIG. 37. The outgoing light thus split into the three beams has a light-path deviation thereof corrected by the light-path synthesis diffraction grating 162 in the composite optical element 151, is parallelized by the collimator lens 153, is allowed to pass through the light-path branching diffraction grating 155a of the double-wavelength objective lens 155 while being focused by the double-wavelength objective lens 155 onto the recording layer 2a of the optical disk 2.

The outgoing light is diffracted by the light-path branching diffraction grating 155a of the double-wavelength objective lens 155, the return light from the recording layer 2a in the optical disk 2 passes by the collimator lens 153 and is directed to a light path going toward the first color compensation diffraction grating 163 on the second surface 151b of the composite optical element 151, and the positive first-order light beam is incident upon the first color compensation diffraction grating 163. The return light coming from the light-path branching diffraction grating 155a and incident upon the first color compensation diffraction grating 163 is diffracted by the first color compensation diffraction grating 163, the negative first-order light beam is incident as a return light upon the second color compensation diffraction grating 164, and reflected and diffracted by the second color compensation diffraction grating 164. Thus, the negative first-order light beam is incident as a return light upon the apex of the beam-splitting prism 165. The return light incident upon the apex of the regular-tetragonal pyramid of the beam-splitting prism 165 is incident upon each side face, and also the apex, of the regular-tetragonal pyramid. Thus, the return light beams are refracted in different directions into four return light beams, and incident upon the light-detecting areas $a_4$, $b_4$, $c_4$ and $d_4$, respectively, of the main-beam photodetector 171 of the photodetector assembly 156. One of the return light beams, corresponding to the positive and negative first-order light beams coming from the three-beam generating diffraction grating 161 and having passed by the composite optical element 151, is incident upon the light-detecting areas $e_4$ and $f_4$ of the side-beam photodetector 172 of the photodetector assembly 156, while the other return light beam is incident upon the light-detecting areas $g_4$ and $h_4$ of the side-beam photodetector 173 of the photodetector assembly 156.

In the optical disk drive 1 configured as above, the servo circuit 10 controls the lens driving mechanism according to the focusing error signal FE and tracking error signal TE detected by the optical pickup 3 including the optical system 185 to move the double-wavelength objective lens 155 in focusing and tracking directions. The double-wavelength objective lens 155 focuses the outgoing light on the recording layer 2a of the optical disk 2 to read information from the optical disk 2.

Figure 38:
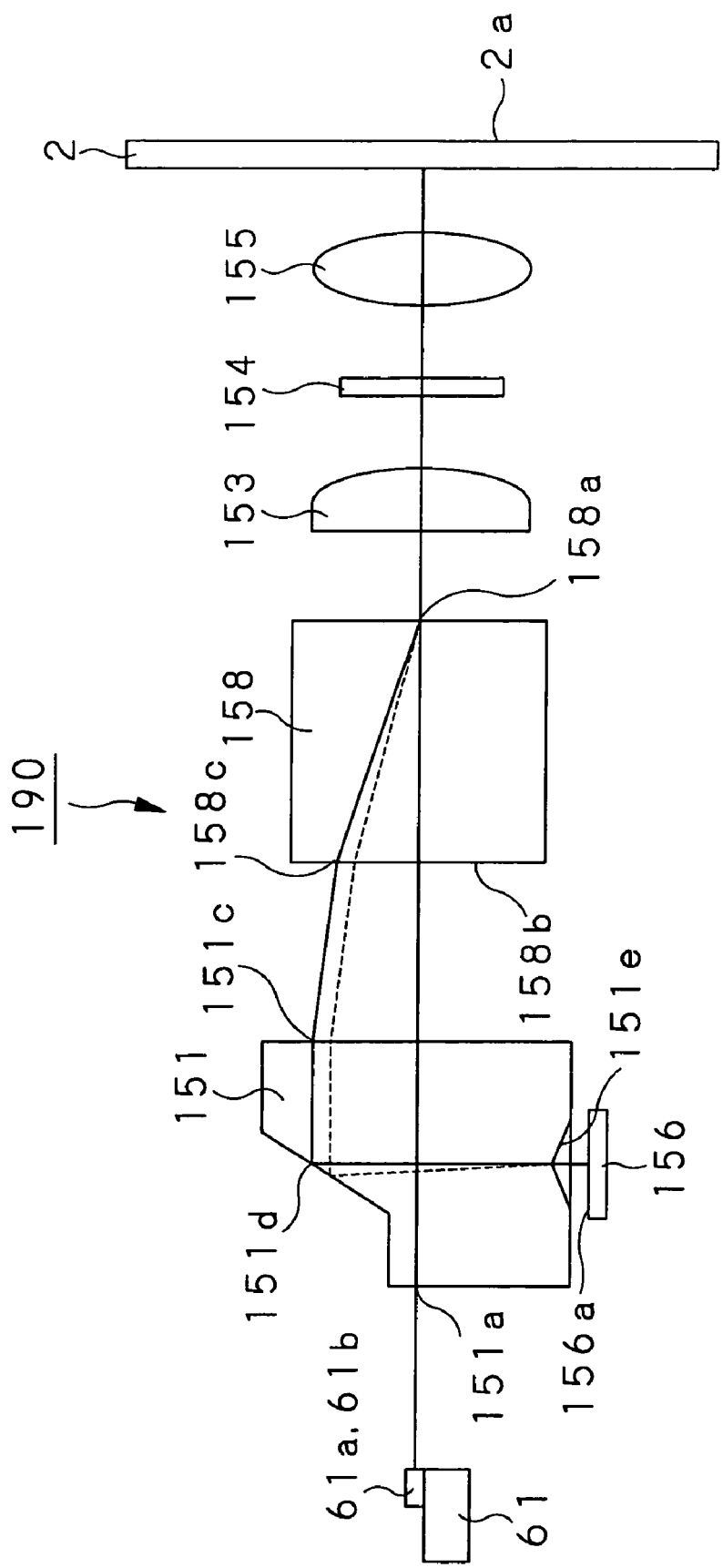
FIG. 38 schematically illustrates a still another variant of the optical system in the optical pickup provided in the optical disk drive according to the present invention.

As shown in FIG. 38, the optical system, generally indicated with a reference 190, used in an eighth example of the optical pickup 3 includes, in the order following the light path, a double-wavelength light source 61 that selectively emits a plurality of light beams different in wavelength from each other, a composite optical element 151 that allows the light beam emitted from the double-wavelength light source 61 to pass through, while directing the return light from the optical disk 2 to a photodetector assembly 156 which will be described in detail later, a plate-shaped optical element 158 that makes the outgoing light having passed by the composite optical element 151 and the return light from the optical disk 2 travel along different light paths, respectively, a collimator lens 153 that parallelizes the outgoing light passing by the composite optical element, a quarter wave plate 154 that changes the polarized state of the outgoing light parallelized by the collimator lens 153, a double-wavelength objective lens 155 that focuses the outgoing light having passed by the quarter wave plate 154 onto the recording layer 2a of the optical disk 2, and a photodetector assembly 156 that detects the return light from the optical disk 2.

The composite optical element 151 has provided on the light path of the return light a first color compensation diffraction grating 163 that diffracts the return light onto the light path of the latter, further splits the return light into a zero-order light beam and positive and negative first-order light beams and corrects a light-path deviation of the negative first-order light beam, for example, as return light, taking place in a light-path branching diffraction grating 158a which will be described in detail later. It should be noted that the composite optical element 151 in the optical system 190 does not include the light-path synthesis diffraction grating 162 as used in the optical systems 150, 180 and 185 having previously been explained.

The plate-shaped optical element 158 is transparent, for example, to allow the outgoing light having passed by the composite optical element 151 to pass through. On the light-incident surface of the plate-shaped optical element 158 upon which the outgoing light has passed by the composite optical element 151 is incident, there is provided the light-path branching diffraction grating 158a that diffracts the zero-order light beam and positive and negative first-order light beams, resulted from splitting of the return light from the optical disk 2 by the three-beam generating diffraction grating 161, further splits the positive first-order light beam, for example, as return light, into a zero-order light beam and positive and negative first-order light beams, and makes the positive first-order light beam, for example, travel along a light path separate from that of the outgoing light. The light-path branching diffraction grating 158a is designed to diffract only a light component polarized in a specific direction. It diffracts only the return light from the optical disk 2 in this embodiment.

Also, the plate-shaped optical element 158 has provided on the light path of the outgoing light on the side thereof where the light beam emitted from the double-wavelength light source 61 is incident a light-path synthesis diffraction grating 158b that corrects a light-path variation caused by a displacement between light-emitting points of the double-wavelength light source 61, and on the light path of the return light on the side thereof where the return light from the optical disk 2 outgoes a third color compensation diffraction grating 158c that corrects a light-path deviation caused by a wavelength variation of the double-wavelength light source 61.

The plate-shaped optical element 158 is formed by injection molding of a transparent resin material, for example. Alternatively, it may have formed thereon the light-path branching diffraction grating 158a, light-path synthesis diffraction grating 158b and third color compensation diffraction grating 158c formed thereon by etching or any other mechanical processing. It should be noted that the material of the plate-shaped optical element 158 is not limited to the resin material but may be a transparent optical material such as nitric material. Further, the plate-shaped optical element 158 may be formed from a combination of these optical materials so that one part thereof may be different in material from the other part.

The plate-shaped optical element 158 may have the light-path branching diffraction grating 158a, light-path synthesis diffraction grating 158b and third color compensation diffraction grating 158c thereof formed each as a hologram element having a predetermined hologram pattern formed by etching or similar process, for example. In this case, the hologram element should preferably be a surface-relieved one or a brazed hologram, to improve the efficiency of diffraction.

In the optical disk drive 1 provided with the optical pickup 3 including the aforementioned optical system 190, the servo circuit 10 generates control signals on the basis of the focusing and tracking error signals detected by the optical pickup 3 from the return light from the optical disk 2 and supplies the control signals to the biaxial actuator of the optical pickup 3, the biaxial actuator moves the double-wavelength objective lens 155 in the focusing and tracking directions, and thus the outgoing light is focused by the double-wavelength objective lens 155 onto a desired recording track on the optical disk 2. Then, in the optical disk drive 1, signals read by the optical pickup 3 are demodulated by the signal demodulation circuit 12 and error-corrected by the error correction circuit 13, and then delivered as read signal at the interface 14.

The optical disk drive 1 incorporating the optical pickup 3 including the aforementioned optical system 190 will be described in detail concerning the light paths of the outgoing light and return light in the optical pickup 3 with reference to the accompanying drawings.

When the optical disk drive 1 reads information from the recording layer 2a of the optical disk 2, a light beam selectively emitted from the double-wavelength light source 61 that selectively emits light beams having different wavelengths is split by the three-beam generating diffraction grating 161 of the composite optical element 151 into three beams including a zero-order light beam and positive and negative first-order light beams as shown in FIG. 38. The outgoing light thus split into the three beams passes by the composite optical element 151, has a light-path deviation thereof corrected by the light-path synthesis diffraction grating 158b in the plate-shaped optical element 158, and passes by the light-path branching diffraction grating 158a. The outgoing light having passed by the light-path branching diffraction grating 158a passes by the plate-shaped optical element 158, is parallelized by the collimator lens 153, has the polarized state thereof changed by the quarter wave plate 154, and is focused by the double-wavelength objective lens 155 onto the recording layer 2a of the optical disk 2.

The return light from the recording layer 2a in the optical disk 2 passes by the double-wavelength objective lens 155, has the polarized state thereof changed by the quarter wave plate 154, and passes by the collimator lens 153. On the return light having the polarized direction thereof rotated 90 deg. in relation to the outgoing light in the light-path branching diffraction grating 158*a* of the plate-shaped optical element 158, diffracted by the third color compensation diffraction grating 158*c*, and directed to a light path going toward the first color compensation diffraction grating 163 on the second surface 151*c* of the composite optical element 151. Thus, the positive first-order light beam is incident upon the first color compensation diffraction grating 163. The return light coming from the third color compensation diffraction grating 158*c*, incident upon the first color compensation diffraction grating 163, is diffracted by the first color compensation diffraction grating 163, the negative first-order light beam is incident as a return light upon the second color compensation diffraction grating 164, and reflected and diffracted by the second color compensation diffraction grating 164. Thus, the negative first-order light beam is incident as a return light upon the apex of the beam-splitting prism 165. The return light incident upon the apex of the regular-tetragonal pyramid of the beam-splitting prism 165 is incident upon each side face, and also the apex, of the regular-tetragonal pyramid. Thus, the return light beams are refracted in different directions into four return light beams, and incident upon the light-detecting areas $a_4$, $b_4$, $c_4$ and $d_4$, respectively, of the main-beam photodetector 171 of the photodetector assembly 156. One of the return light beams, corresponding to the positive and negative first-order light beams coming from the three-beam generating diffraction grating 161 and having passed by the composite optical element 151, is incident upon the light-detecting areas $e_4$ and $f_4$ of the side-beam photodetector 172 of the photodetector assembly 156, while the other return light beam is incident upon the light-detecting areas $g_4$ and $h_4$ of the side-beam photodetector 173 of the photodetector assembly 156.

In the optical disk drive 1 configured as above, the servo circuit 10 controls the lens driving mechanism according to the focusing error signal FE and tracking error signal TE detected by the optical pickup 3 including the optical system 190 to move the double-wavelength objective lens 155 in focusing and tracking directions. The double-wavelength objective lens 155 focuses the outgoing light on the recording layer 2*a* of the optical disk 2 to read information from the optical disk 2.

In the aforementioned optical disk drive 1, the optical pickup 3 adopting the optical system 150, 180 or 185 has the composite optical element 151 including the first color compensation diffraction grating 163 that diffracts the return light from the optical disk 2 and the second color compensation diffraction grating 164 that further diffracts the positive first-order light beam diffracted by the first color compensation diffraction grating 163, as return light. Therefore, it is possible to direct the light beam selectively emitted from the double-wavelength light source 61 to an appropriate position even if the wavelength of the outgoing light is varied as the ambient temperature varies.

Also, in the optical disk drive 1, the optical pickup 3 adopting the optical system 190 has, in addition to the composite optical element 151 including the first color compensation diffraction grating 163 that diffracts the return light from the optical disk 2 and the second color compensation diffraction grating 164 that further diffracts the positive first-order light beam diffracted by the first color compensation diffraction grating 163, as return light, the plate-shaped optical element 158 including the third color compensation diffraction grating 168*c*. Therefore, it is possible to direct the light beam selectively emitted from the double-wavelength light source 61 to an appropriate position even if the wavelength of the outgoing light is varied as the ambient temperature varies.

Thus, using the optical pickup simply configured with no larger number of parts than in the conventional optical disk drive, the focusing error signal FE in the optical disk drive 1 according to the present invention is more reliable.

Therefore, because of the composite optical element 151 provided in the optical system 150, 180 or 185 used in the optical pickup 3, the optical disk drive 1 can be produced with a higher productivity and reduced cost and have an improved reliability.

In the optical disk drive 1 using the optical pickup 3 including the optical system 150, 180, 185 or 190, a light-path deviation taking place due to a wavelength variation of the light beam from the double-wavelength light source 61 can be corrected by the composite optical element 151 alone. Therefore, the optical systems 150, 180 or 185 can be configured to be simple and small with a minimum necessary number of parts and produced with a reduced costs.

In the optical disk drive 1, since the optical pickup 3 including the optical system 150, 180 or 185 has the composite optical element 151 including the beam-splitting prism 165 that splits the return light from the optical disk 2, so the main-beam photodetector 171 may have the light-detecting surface thereof divided into light-detecting areas $a_4$, $b_4$, $c_4$ and $d_4$ for detecting four return light beams, respectively, from the beam-splitting prism 165 with a lower precision of positioning than that required for an optical pickup in which a beam spot is divided by the parting lines of the main-beam photodetector 171.

Thus, the main-beam photodetector 171 in the optical pickup 3 of the optical disk drive 1 can be produced with a reduced cost, the position of the main-beam photodetector 171 can easily be adjusted in the process of producing the optical pickup 3, and the focusing error signal FE provided in the optical pickup 3 is more reliable.

In the optical disk drive 1, use of the double-wavelength light source 61 that selectively emits one of a plurality of laser beams different in wavelength from each other from the light-emitting point 61*a* or 61*b* leads to a light-path deviation between the outgoing light beams different in wavelength from each other. However, the light-path synthesis diffraction grating 151*b* in the composite optical element 151 or the light-path synthesis diffraction grating 158*b* in the plate-shaped optical element 158 permits to synthesize different light paths to align the optical axis of the outgoing light with the center of the optical axis of the double-wavelength light objective lens 155. Thus, in the optical disk drive 1, return light beams different in wavelength from each other can appropriately be directed to the signal recording layer 2*a* in the optical disk 2.

Use of two or more color compensation diffraction gratings in the optical disk drive 1 permits to reduce the amount of light-path deviation correction by each color compensation diffraction grating. Thus, in the optical disk drive 1, since each color compensation diffraction grating can be designed for the grating pitch to be larger, so it can be produced more easily than for an optical disk drive in which the light-path deviation is to be corrected by a single color compensation diffraction grating.

In the optical disk drive 1, the so-called astigmatism is adopted in the aforementioned optical pickup 3 to provide a focusing error signal FE but any other light-detecting method such as the Foucault process or the like may be adopted for this purpose.

In case the optical disk drive 1 is not to control the tracking with three beams but uses only one light beam, the three-beam generating diffraction grating 161 may not be provided in the composite optical element 151. In this case, since the three-beam generating diffraction grating 161 is not provided in the optical disk drive 1, a diffraction grating capable of correcting a light-path deviation, astigmatism, etc. can be disposed on the first surface 151a of the composite optical element 151, and addition of such further functions to the composite optical element 151 will lead to a reduced number of parts. Thus, the optical disk drive 1 can be produced with an improved productivity. The composite optical element 151 should preferably be provided with a diffraction grating to correct the extent of astigmatism. The return light can appropriately be focused for the beam incident upon the apex of the beam-splitting prism 165 to be generally circular.

The beam-splitting prism 165 included in the aforementioned composite optical element 151 may be shaped to have the form of an octagonal cone, for example. In this case, the main-beam photodetector 171 in the photodetector assembly 156 may be configured to have the light-detecting surface thereof divided by radial parting lines from the center into eight areas. In the composite optical element 151, the beam-splitting prism 165 is provided inside the fourth surface 151e. Alternatively, however, the beam-splitting prism 165 may be projected to outside the fourth surface 151e. The beam-splitting prism 165 in the composite optical element 151 is not limited in shape to the octagonal cone having flat surfaces but may be formed to have a plurality of curved surfaces. In this case, the light-detecting areas of the main-beam photodetector 171 in the photodetector assembly 156 will be provided correspondingly to the light-detecting surfaces of the main-beam photodetector 171 of the photodetector assembly 156.

The aforementioned composite optical element 151 may use the grating 79 divided in four areas as shown in FIG. 22 in place of the beam-splitting prism 165. The grating 79 is equal in effect to the beam-splitting prism 165. For the same effect as that of the beam-splitting prism 165, the grating 79 has divisional areas $y_1$, $y_2$, $y_3$ and $y_4$ to assure the same effect. The divisional areas $y_1$, $y_2$, $y_3$ and $y_4$ have formed therein recesses directed differently from one area to another. More specifically, the recesses in the divisional areas $y_1$ and $y_3$ are directed perpendicularly to those in the divisional areas $y_2$ and $y_4$. The grating 79 diffracts the incident return light from the optical disk 2 correspondingly to the directions of the recesses in the divisional areas $y_1$, $y_2$, $y_3$ and $y_4$ and grating constants to provide and direct four beams to the main-beam photodetector 171 of the photodetector assembly 156. The grating 79 is a hologram element having a predetermined hologram pattern formed by etching or similar process, for example. In this case, the hologram element should preferably be a surface-relieved one or a brazed hologram, to improve the efficiency of diffraction.

The composite optical element 151 may be configured to have an internal reflecting surface. It can be configured with an improved degree of optical design by bending the light path by the reflecting surface.

Furthermore, the composite optical element 151 may be configured so that the beam-splitting prism 165 may have such an increased angle of refraction that the return light from the optical disk 2, incident upon the beam-splitting prism 165, will form an angle of less than 45 deg. with each surface of the beam-splitting prism 165, that is, each surface of the beam-splitting prism 165 will be inclined less than 45 deg. in order to prevent the incident return light from being totally reflected. Thus, the spots of the split beams of the return light can be separated more from each other, the divisional surface areas of the main-beam photodetector 171 can be separated more from each other, and the main-beam and side-beam photodetectors 171 and 172 and 173 can be separated more from each other. Thus, the optical pickup 3 may be assembled with a precision not so high.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, in the optical pickup device according to the present invention, use of the aforementioned optical device that corrects a light-path deviation, caused by a wavelength variation of a light beam emitted from the light source when the return light from the optical disk is separated from the outgoing light by the diffraction element, by the wavelength variation correcting means permits to produce the optical disk drive with a higher productivity and a reduced cost, and provide a more reliable focusing error signal.

Further, in the optical device used in the optical disk drive according to the present invention, use of the aforementioned optical device that corrects a light-path deviation, caused by a wavelength variation of a light beam emitted from the light source when the return light from the optical disk is separated from the outgoing light by the diffraction element, by the wavelength variation correcting means permits to provide a more reliable focusing error signal in the optical disk drive.

In the optical device used in the optical pickup according to the present invention, the astigmatism can be corrected to an optimum extent when return light from the optical disk has the light path thereof separated from that of the outgoing light, whereby the return light can be shaped appropriately for guiding to the return-light splitting means. Thus, a more reliable focusing error signal can be provided in the optical disk drive.

The invention claimed is:

1. An optical pickup device comprising: a light source that selectively emits a plurality of light beams different in wavelength from each other; an objective lens that focuses the light beam emitted from the light source onto an optical disk and collects return light from the optical disk; a composite optical element including a first diffraction element that allows the light beam emitted from the light source to pass through, while diffracting the return light from the optical disk, and at least one light-path deviation correcting means disposed in a position where the return light diffracted by the first diffraction element is incident to correct a light-path deviation of the return light, caused in the first diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means,
wherein the composite optical element further includes a return-light splitting means disposed in a position where the return light having a light-path deviation thereof corrected by the light-path deviation correcting means is incident to split the return light into a plurality of beams and direct the plurality of beams to the plurality of light-detecting areas of the light-detecting means.

2. The optical pickup device as set forth in claim 1, wherein the composite optical element is a combination of the first diffraction element and light-path deviation correcting means, formed integrally with each other by molding a resin material.

3. The optical pickup device as set forth in claim 1, wherein the first diffraction element is a hologram.

4. The optical pickup device as set forth in claim 1, wherein the light-path deviation correcting means is a second diffraction element that further diffracts the return light once diffracted by the first diffraction element.

5. The optical pickup device as set forth in claim 4, wherein the second diffraction element is of a reflective type.

6. The optical pickup device as set forth in claim 4, wherein the second diffraction element is a hologram.

7. The optical pickup device as set forth in claim 1, wherein the composite optical element is a combination of the first diffraction element, light-path deviation correcting means and the return-light splitting means, formed integrally with each other by molding a resin material.

8. The optical pickup device as set forth in claim 1, wherein the return-light splitting means is a prism having a plurality of flat or curved surfaces.

9. The optical pickup device as set forth in claim 8, wherein: the prism included in the composite optical element is shaped to have the form of a generally regular-tetragonal pyramid and splits, into four beams, the return light having a light-path deviation thereof corrected by the light-path deviation correcting means; and the light-detecting means has the light-detecting area thereof quartered to detect four return light beams, respectively, from the prism included in the composite optical element.

10. The optical pickup device as set forth in claim 9, wherein the prism is configured so that the return light having a light-path deviation thereof corrected by the light-path deviation correcting means is incident at an angle of less than 45 deg. upon each surface of the prism.

11. The optical pickup device as set forth in claim 1, wherein the composite optical element further includes a reflecting means for reflecting the light beam emitted from the light source on the light path of the light beam toward the first diffraction element and/or the return light diffracted by the first diffraction element on the light path of the light beam toward the predetermined position.

12. The optical pickup device as set forth in claim 11, wherein the composite optical element is a combination of the first diffraction element, light-path deviation correcting means and reflecting means, formed integrally with each other by molding a resin material.

13. The optical pickup device as set forth in claim 1, wherein: the composite optical element further includes a third diffraction element disposed on a light path between the light source and first diffraction element to split the light beam emitted from the light source into three beams including a zero-order light beam and positive and negative first-order light beams; and the light-detecting means detects the zero-order light beam, resulted from splitting, by the third diffraction element, of the return light split by the return-light splitting means to provide a focusing error signal, and also the positive and negative first-order light beams from the third diffraction element to provide a tracking error signal.

14. The optical pickup device as set forth in claim 13, wherein the composite optical element is a combination of the first diffraction element, light-path deviation correcting means and third diffraction element, formed integrally with each other by molding a resin material.

15. The optical pickup device as set forth in claim 13, wherein the third diffraction element is a hologram.

16. The optical pickup device as set forth in claim 1, wherein the composite optical element further includes a light-path synthesis means disposed between the light source and first diffraction element to correct a light-path deviation between an outgoing light having one wavelength and an outgoing light having the other wavelength, caused by a displacement between light-emitting points of the light source for the light beams having the different wavelengths, respectively.

17. The optical pickup device as set forth in claim 16, wherein the composite optical element is a combination of the first diffraction element, light-path deviation correcting means and light-path synthesis means, formed integrally with each other by molding a resin material.

18. The optical pickup device as set forth in claim 16, wherein the light-path synthesis means is a fourth diffraction element that further diffracts the return light once diffracted by the first diffraction element.

19. The optical pickup device as set forth in claim 18, wherein the fourth diffraction element is a hologram.

20. The optical pickup device as set forth in claim 16, wherein the composite optical element has the light-path synthesis means and at least one light-path deviation correcting means formed from a fifth diffraction element in the same plane.

21. The optical pickup device as set forth in claim 20, wherein the fifth diffraction element is a hologram.

22. The optical pickup device as set forth in claim 1, wherein the first diffraction element that diffracts the return light from the optical disk is provided on the surface of the objective lens.

23. The optical pickup device as set forth in claim 1, further comprising a collimator lens that parallelizes the light beam emitted from the light source which selectively emits light beams different in wavelength from each other, the first diffraction element that diffracts the return light from the optical disk being provided on the surface of the collimator lens.

24. The optical pickup device as set forth in claim 1, further comprising a light shielding means provided between the light source and first diffraction element to shield other light beams than valid ones on the light path of the light emitted from the light source.

25. The optical pickup device as set forth in claim 1, further comprising a light shielding means for shielding other light beams than valid ones on the light path of the return light directed by the light-path deviation correcting means to a predetermined position.

26. An optical disk drive including an optical pickup that writes and/or reads information to and/or from an optical disk, and a disk rotation driving means that drives to rotate the optical disk, the optical pickup comprising: a light source that emits a selected one of a plurality of light beams different in wavelength from each other; an objective lens that focuses the light beam emitted from the light source onto an optical disk and collects the return light from the optical disk; a composite optical element including a first diffraction element that allows the light beam emitted from the light to pass through, while diffracting the return light from the optical disk, and at least a light-path deviation correcting means disposed in a position where the return light diffracted by the first diffraction element is incident to correct a light-path deviation of the return light, caused in the first diffraction element by a variation in wavelength of the light beam emitted from the light source and direct the return light to a predetermined position; and a light-detecting means for detecting, at a plurality of light-detecting areas thereof, the return light having the light-path deviation thereof corrected by the light-path deviation correcting means, wherein the composite optical element further includes a return-light splitting means disposed in a position where the return light having a light-path deviation thereof corrected by the light-path deviation correcting means is incident to split the return light into a plurality of beams and direct the plurality of beams to the plurality of light-detecting areas of the light-detecting means.

27. The optical disk drive as set forth in claim 26, wherein the composite optical element is a combination of the first diffraction element and light-path deviation correcting means, formed integrally with each other by molding a resin material.

28. The optical disk drive as set forth in claim 27, wherein the first diffraction element is a hologram.

29. The optical disk drive as set forth in claim 26, wherein the light-path deviation correcting means is a second diffraction element that further diffracts the return light once diffracted by the first diffraction element.

30. The optical disk drive as set forth in claim 29, wherein the second diffraction element is of a reflective type.

31. The optical disk drive as set forth in claim 29, wherein the second diffraction element is a hologram.

32. The optical disk drive as set forth in claim 26, wherein the composite optical element is a combination of the first diffraction element, light-path deviation correcting means and the return-light splitting means, formed integrally with each other by molding a resin material.

33. The optical disk drive as set forth in claim 26, wherein the return-light splitting means is a prism having a plurality of flat or curved surfaces.

34. The optical disk drive as set forth in claim 33, wherein: the prism included in the composite optical element is shaped to have the form of a generally regular-tetragonal pyramid and splits, into four beams, the return light having a light-path deviation thereof corrected by the light-path deviation correcting means; and the light-detecting means has the light-detecting area thereof quartered to detect four return light beams, respectively, from the prism included in the composite optical element.

35. The optical disk drive as set forth in claim 33, wherein the prism is configured so that the return light having a light-path deviation thereof corrected by the light-path deviation correcting means is incident at an angle of less than 45 deg. upon each surface of the prism.

36. The optical disk drive as set forth in claim 26, wherein the composite optical element further includes a reflecting means for reflecting the light beam emitted from the light source on the light path of the light beam toward the first diffraction element and/or the return light diffracted by the first diffraction element on the light path of the light beam toward the predetermined position.

37. The optical disk drive as set forth in claim 36, wherein the composite optical element is a combination of the first diffraction element, light-path deviation correcting means and reflecting means, formed integrally with each other by molding a resin material.

38. The optical disk drive as set forth in claim 26, wherein: the composite optical element further includes a third diffraction element disposed on a light path between the light source and first diffraction element to split the light beam emitted from the light source into three beams including a zero-order light beam and positive and negative first-order light beams; and the light-detecting means detects the zero-order light beam, resulted from splitting, by the third diffraction element, of the return light split by the return-light splitting means to provide a focusing error signal, and also the positive and negative first-order light beams from the third diffraction element to provide a tracking error signal.

39. The optical disk drive as set forth in claim 38, wherein the composite optical element is a combination of the first diffraction element, light-path deviation correcting means and third diffraction element, formed integrally with each other by molding a resin material.

40. The optical disk drive as set forth in claim 38, wherein the third diffraction element is a hologram.

41. The optical disk drive as set forth in claim 26, wherein the composite optical element further includes a light-path synthesis means disposed between the light source and first diffraction element to correct a light-path deviation between an outgoing light having one wavelength and an outgoing light having the other wavelength, caused by a displacement between light-emitting points of the light source for the light beams having the different wavelengths, respectively.

42. The optical disk drive as set forth in claim 41, wherein the composite optical element is a combination of the first diffraction element, light-path deviation correcting means and light-path synthesis means, formed integrally with each other by molding a resin material.

43. The optical disk drive as set forth in claim 41, wherein the light-path synthesis means is a fourth diffraction element that further diffracts the return light once diffracted by the first diffraction element.

44. The optical disk drive as set forth in claim 43, wherein the fourth diffraction element is a hologram.

45. The optical disk drive as set forth in claim 41, wherein the composite optical element has the light-path synthesis means and at least one light-path deviation correcting means formed from a fifth diffraction element in the same plane.

46. The optical disk drive as set forth in claim 45, wherein the fifth diffraction element is a hologram.

47. The optical disk drive as set forth in claim 26, wherein the first diffraction element that diffracts the return light from the optical disk is provided on the surface of the objective lens.

48. The optical disk drive as set forth in claim 26, further comprising a collimator lens that parallelizes the light beam emitted from the light source which selectively emits light beams different in wavelength from each other, the first diffraction element that diffracts the return light from the optical disk being provided on the surface of the collimator lens.

49. The optical disk drive as set forth in claim 26, further comprising a light shielding means provided between the light source and first diffraction element to shield other light beams than valid ones on the light path of the light emitted from the light source.

50. The optical disk drive as set forth in claim 26, further comprising a light shielding means for shielding other light beams than valid ones on the light path of the return light directed by the light-path deviation correcting means to a predetermined position.

* * * * *

UNITED STATES PATENT AND TRADEMARK OFFICE
CERTIFICATE OF CORRECTION

| | |
|---|---|
| PATENT NO. | : 7,345,982 B2 |
| APPLICATION NO. | : 10/494304 |
| DATED | : March 18, 2008 |
| INVENTOR(S) | : Norio Fukasawa et al. |

Page 1 of 1

It is certified that error appears in the above-identified patent and that said Letters Patent is hereby corrected as shown below:

Title Page:
Item (30) should read:
-- Nov. 22, 2001 (JP) ..................................... P2001-358244
   Aug. 2, 2002  (JP) ..................................... P2002-226764 --.

Signed and Sealed this

Seventh Day of October, 2008

JON W. DUDAS
*Director of the United States Patent and Trademark Office*